(12) United States Patent
Lynnworth

(10) Patent No.: US 8,090,131 B2
(45) Date of Patent: Jan. 3, 2012

(54) STEERABLE ACOUSTIC WAVEGUIDE

(75) Inventor: Lawrence C. Lynnworth, Waltham, MA (US)

(73) Assignee: Elster NV/SA, Essen (BE)

( * ) Notice: Subject to any disclaimer, the term of this patent is extended or adjusted under 35 U.S.C. 154(b) by 723 days.

(21) Appl. No.: 12/157,551

(22) Filed: Jun. 11, 2008

(65) Prior Publication Data

US 2009/0016555 A1 Jan. 15, 2009

Related U.S. Application Data

(60) Provisional application No. 60/959,085, filed on Jul. 11, 2007.

(51) Int. Cl.
*H04R 1/02* (2006.01)
*H04R 9/06* (2006.01)
*H04R 1/20* (2006.01)

(52) U.S. Cl. .......................... 381/338; 381/339
(58) Field of Classification Search .................. 381/337, 381/338, 340–343, 345–348; 181/175, 177, 181/179, 196, 198, 199
See application file for complete search history.

(56) References Cited

U.S. PATENT DOCUMENTS

| | | |
|---|---|---|
| 3,584,327 A | 6/1971 | Murray |
| 3,825,887 A | 7/1974 | Murray |
| 3,936,791 A | 2/1976 | Kossoff |
| 3,973,152 A | 8/1976 | Karplus |
| 4,180,792 A | 12/1979 | Lederman et al. |
| 4,211,949 A | 7/1980 | Brisken et al. |
| 4,313,032 A * | 1/1982 | Thomas et al. .............. 381/341 |
| 4,334,432 A | 6/1982 | Gill |
| 4,452,334 A * | 6/1984 | Rogers .......................... 181/175 |
| 4,550,606 A | 11/1985 | Drost |
| 4,558,598 A | 12/1985 | Young |
| 4,679,430 A | 7/1987 | Scott-Kestin et al. |
| 4,799,177 A | 1/1989 | Sarr |
| 4,890,490 A | 1/1990 | Telford |
| 4,894,806 A | 1/1990 | Jen et al. |

(Continued)

FOREIGN PATENT DOCUMENTS

RU 172543 6/1965

OTHER PUBLICATIONS

D.N. Alleyne and P. Cawley, 'The Interaction of Lamb Waves With Defects'; "IEEE Transactions on Ultrasonics, Ferroelectrics, and Frequency Control", vol. 39, No. 3, May 1992, pp. 381-397: Imperial College, London, UK.

(Continued)

*Primary Examiner* — Tuan Nguyen
(74) *Attorney, Agent, or Firm* — Duane Morris LLP

(57) ABSTRACT

A steerable acoustic waveguide apparatus includes plural plates arranged in one or more linear arrays. Steering of an acoustic beam radiated from the waveguide apparatus may be achieved through differential delays of acoustic signals resulting from differences in timing, frequency, or mode or resulting from differences in physical attributes of the plates. In one aspect, where the apparatus is used with a target that is confined by a conduit such as a pipe, a longitudinal plane for the conduit intersects the linear array, an array plane for the linear array has a conduit orientation relative to the longitudinal plane, and the conduit orientation is substantially perpendicular or substantially parallel. The waveguide apparatus may serve as a thermal buffer and may simplify access to an acoustic path in a device such as an ultrasonic flowmeter.

27 Claims, 13 Drawing Sheets

U.S. PATENT DOCUMENTS

| | | | |
|---|---|---|---|
| 5,159,838 | A | 11/1992 | Lynnworth |
| 5,284,148 | A | 2/1994 | Dias |
| 5,509,417 | A | 4/1996 | Dias et al. |
| 5,691,476 | A | 11/1997 | Madaras |
| 5,734,588 | A | 3/1998 | Rose et al. |
| 5,951,163 | A | 9/1999 | Jen et al. |
| 5,962,790 | A | 10/1999 | Lynnworth et al. |
| 5,976,466 | A | 11/1999 | Ratner et al. |
| 6,046,961 | A | 4/2000 | Griffin et al. |
| 6,047,602 | A | 4/2000 | Lynnworth |
| 6,070,468 | A | 6/2000 | Degertekin et al. |
| 6,122,968 | A | 9/2000 | Vandervalk |
| 6,155,982 | A | 12/2000 | Hunt |
| 6,225,729 | B1 | 5/2001 | Izumi et al. |
| 6,343,511 | B1 | 2/2002 | Lynnworth et al. |
| 6,400,648 | B1 | 6/2002 | Heijnsdijk |
| 6,453,526 | B2 | 9/2002 | Lorraine |
| 6,669,636 | B2 | 12/2003 | van Klooster |
| 6,747,584 | B2 | 6/2004 | Havelock |
| 6,754,403 | B1 * | 6/2004 | Schmid ............................ 385/7 |
| 6,860,853 | B2 | 3/2005 | Hashimoto |
| 7,156,201 | B2 * | 1/2007 | Peshkovskiy et al. ........ 181/175 |
| 7,185,547 | B2 | 3/2007 | Baumoel |
| 7,220,258 | B2 | 5/2007 | Myhr |
| 7,308,828 | B2 | 12/2007 | Hashimoto |
| 2002/0091404 | A1 | 7/2002 | Beaupre |
| 2007/0167815 | A1 | 7/2007 | Jacobsen et al. |
| 2007/0240512 | A1 | 10/2007 | Takada |

OTHER PUBLICATIONS

V.K. Hamidullin, et al., 'Waveguide Transducers With Limited Diffraction Beam For Ultrasonic Flow Measuring at high Temperature and Pressure'; "2007 IEEE Ultrasonics Symposium", Russia, 2007, pp. 917-920.

S. Banerjee, T. Kundu, 'Symmetric and Anti-Symmetric Rayleigh-Lamb Modes in Sinusoidally Corrugated Waveguides: An Analytical Approach': "International Journal of Solids and Structures", vol. 43-2006, pp. 6651-6567; Dept. of Civil Engineering and Engineering Mechanics, Univ. of Arizona, Tuscon, Arizona, Elsevier Ltd.

L.C. Lynnworth and E.H. Carnevale, 'Techniques for Mounting an Ultrasonic Temperature Device': prepared for National Aeronautics and Space Administration, Contract NAS3-6211, Feb. 1956, pp. 1-41, table of figures 1-41, NASA Lewis Research Center, Cleveland Ohio; Parametrics, Inc. Waltham, MA., USA.

Liu, Y. and Lynnworth, Lynnworth, Lawrence C., M.A. Zimmerman, "Buffer waveguides for flow measurement in hot fluids", Ultrasonics, vol. 36 (1998) pp. 305-315, Panametrics, Inc. Waltham, MA, USA.

Liu, Y. and Lynnworth, L.C., 'Ultrasonic Flowmeters: Half-Century Progress Report, 1955-2005', Ultrasonics, vol. 44(2006), e1371-e1378, Elsevier B.V., Lynnworth Technical Services, Waltham, MA, USA, GE Sensing, Shanghai, China.

\* cited by examiner

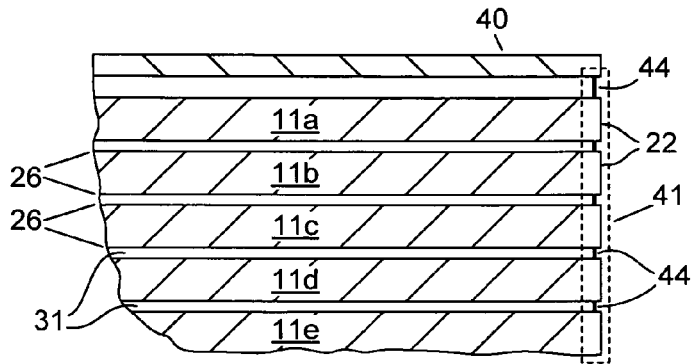
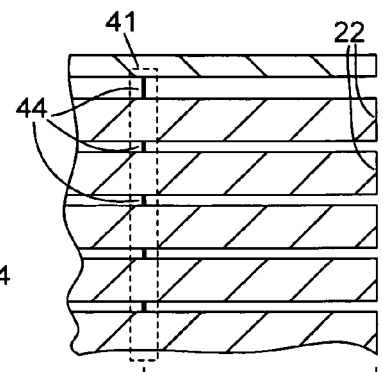
FIG. 5  FIG. 6
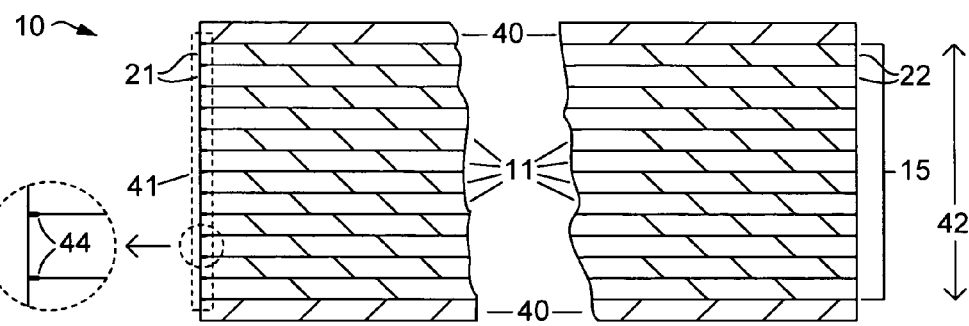
FIG. 7
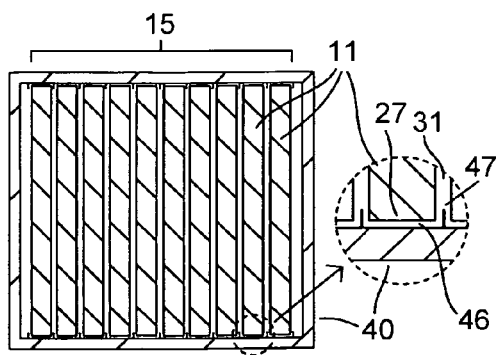
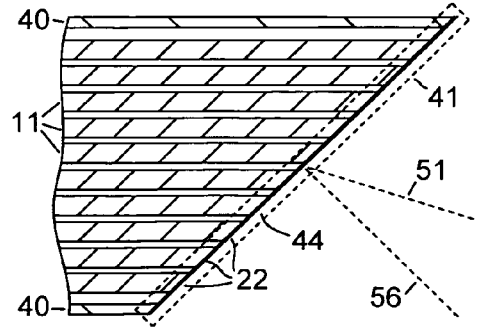
FIG. 8  FIG. 9

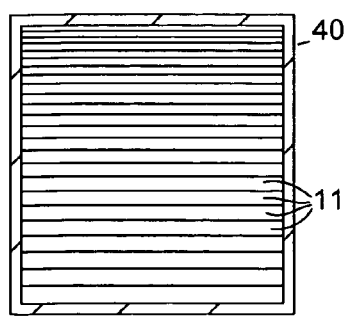 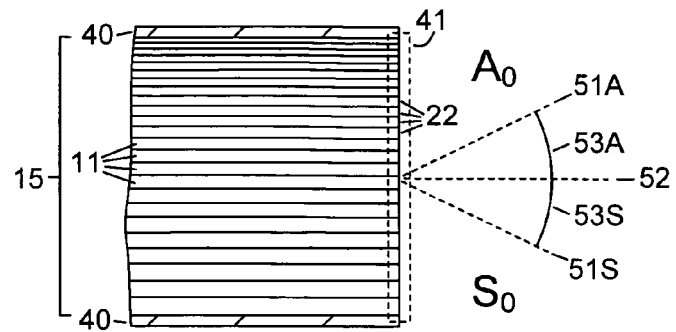
FIG. 15   FIG. 16
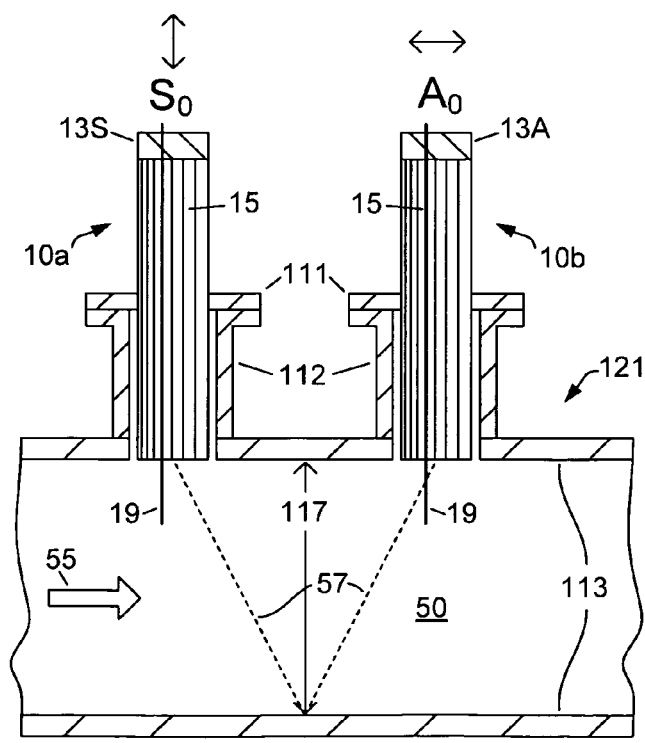
FIG. 17

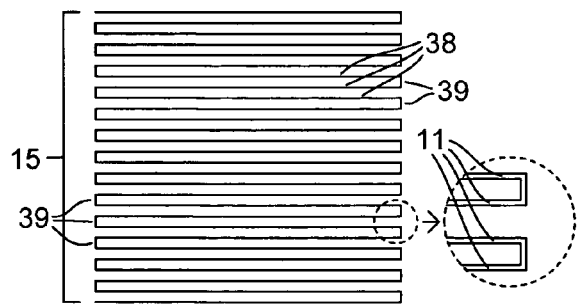
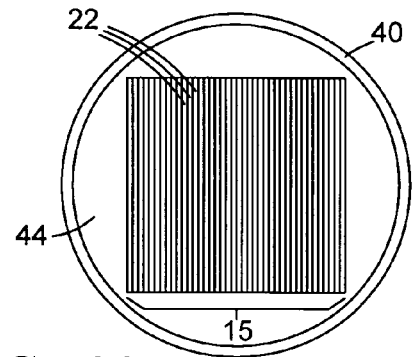
FIG. 22   FIG. 23
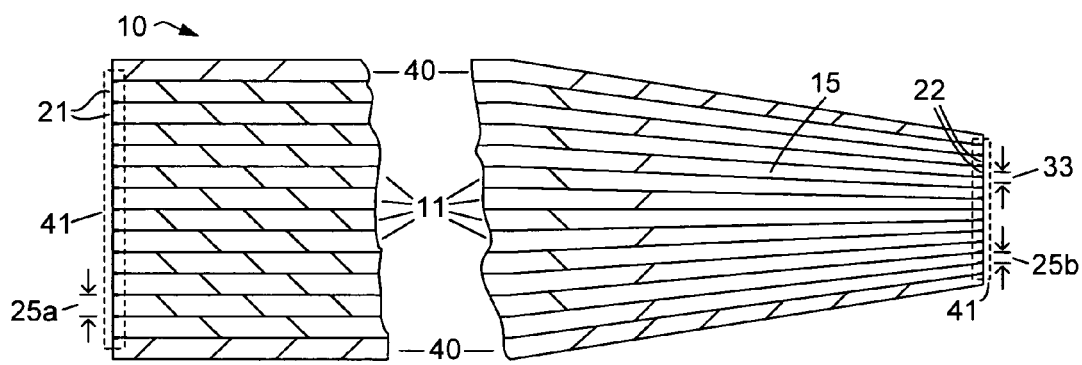
FIG. 24
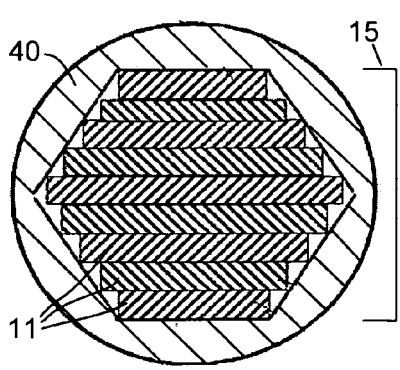
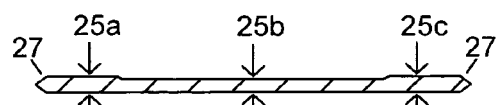
FIG. 26A
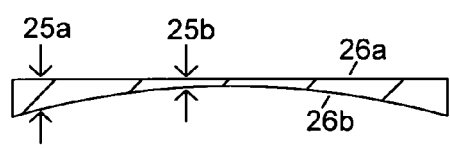
FIG. 25   FIG. 26B

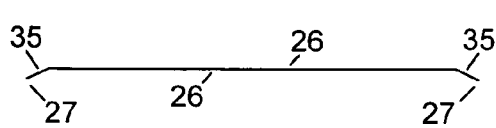
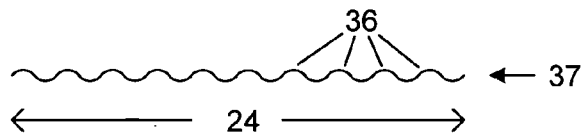
FIG. 30A
FIG. 30B
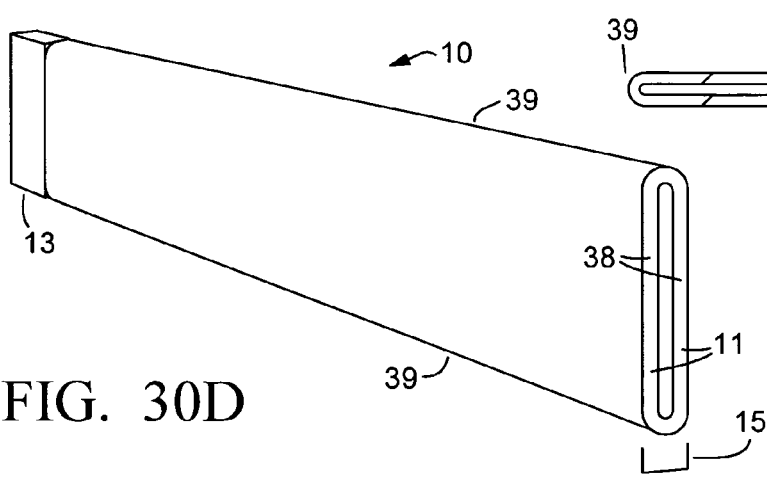
FIG. 30C
FIG. 30D
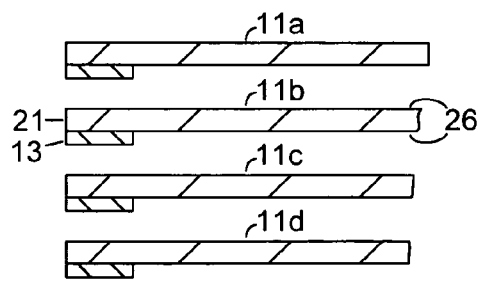
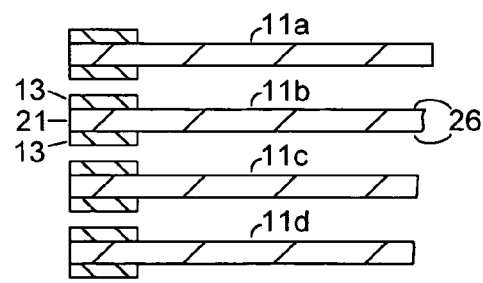
FIG. 31A
FIG. 31B
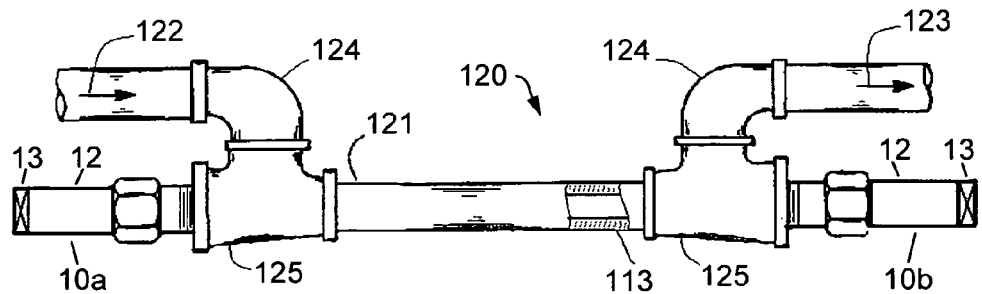
FIG. 32

STEERABLE ACOUSTIC WAVEGUIDE

CROSS-REFERENCE TO RELATED APPLICATIONS

This application claims the benefit of U.S. Provisional Application No. 60/959,085, filed Jul. 11, 2007, which is incorporated by reference herein.

BACKGROUND

Embodiments described herein relate to steerable acoustic waveguides. A steerable acoustic waveguide is an apparatus or waveguide that is capable of propagating an acoustic signal with little distortion from one end of the apparatus to the other end and radiating or receiving acoustic energy from an end of the apparatus. The beam axis of the radiated or received acoustic energy within a target may be parallel to the longitudinal axis of the apparatus or waveguide, or the beam axis may be oblique. Beam steering includes both an oblique or off-axis beam whose angle is constant with time and also a beam whose angle varies over time.

SUMMARY

A steerable acoustic waveguide apparatus includes plural plates arranged in one or more linear arrays. Steering of an acoustic beam radiated from the waveguide apparatus may be achieved through differential delays of acoustic signals resulting from differences in timing, frequency, or mode or resulting from differences in physical attributes of the plates. In one aspect, where the apparatus is used with a target that is confined by a conduit such as a pipe, a longitudinal plane for the conduit intersects the linear array, an array plane for the linear array has a conduit orientation relative to the longitudinal plane, and the conduit orientation is substantially perpendicular or substantially parallel. The waveguide apparatus may serve as a thermal buffer and may simplify access to an acoustic path in a device such as an ultrasonic flowmeter.

Additional embodiments are described in the detailed description below. This summary does not purport to define the invention. The invention is defined by the claims.

BRIEF DESCRIPTION OF THE DRAWINGS

FIG. 5 is a longitudinal cross-section view, similar to that of FIG. 3 but at higher magnification, of a portion of the apparatus of FIG. 1 near the distal ends of the plates.

FIG. 6 is a longitudinal cross-section view, at high magnification, of a portion of an apparatus near the distal ends of the plates.

FIG. 7 is a longitudinal cross-section view of an apparatus comprising a plurality of plates and an enclosure comprising a sleeve and means for sealing that seals an end region.

FIG. 8 is a cross-section view of an apparatus, with the plane of section perpendicular to the longitudinal axis of the apparatus, in which the edges of the plates fit into slots in the sleeve.

FIG. 9 is a longitudinal cross-section view of a portion of an apparatus that is chamfered at the distal end.

FIG. 15 is a cross-section view of an apparatus, with the plane of section perpendicular to the longitudinal axis of the apparatus, in which the thickness differs among the plates in coordination with the position of the plate within the linear array.

FIG. 16 is a longitudinal cross-section view of a portion of the embodiment of FIG. 15 near the distal ends of the plates.

FIG. 17 is a section view of two apparatuses mounted in nozzles attached to a wall of a conduit that contains a target fluid.

FIG. 22 is a cross-section view of an apparatus, with the plane of section perpendicular to the longitudinal axis of the apparatus, in which the linear array of plates is made from a folded sheet of material.

FIG. 23 is an end view of an apparatus in which a cylindrical sleeve surrounds a linear array of plates having a square cross-sectional shape.

FIG. 24 is a longitudinal cross-section view of an apparatus in which the thickness of the plates at the distal end is less than the thickness at the proximal end.

FIG. 25 is a cross-section view of an apparatus, with the plane of section perpendicular to the longitudinal axis of the apparatus, in which the sleeve has a hexagonal interior cross-section and the linear array of plates has a hexagonal cross-sectional shape.

FIG. 26A is a cross-section view of a plate, with the plane of section perpendicular to the longitudinal axis of the plate, in which thickness varies across the width of the plate.

FIG. 26B is a cross-section view of a plate, with the plane of section perpendicular to the longitudinal axis of the plate, in which thickness varies in a graded mirror symmetric pattern across the width of the plate.

FIG. 30A is a cross-section view of a plate, with the plane of section perpendicular to the longitudinal axis of the plate, which has flanges near the longitudinal edges.

FIG. 30B is a cross-section view of a plate, with the plane of section perpendicular to the longitudinal axis of the plate, which is corrugated across the width of the plate.

FIG. 30C is a cross-section view of an adjacent pair of plates, with the plane of section perpendicular to the longitudinal axis of the plates, in which the adjacent pair of plates is made by flattening a tube.

FIG. 30D is a perspective view of an apparatus in which the plurality of plates comprises flattened tube segments.

FIG. 31A depicts a portion of a linear array in which a transducer is coupled to one major face of each plate.

FIG. 31B depicts a portion of a linear array in which transducers are coupled to both major faces of each plate.

FIG. 32 is a side view of an axial path offset style flowcell.

DETAILED DESCRIPTION

Reference will now be made in detail to some embodiments, examples of which are illustrated in the accompanying drawings. In this description and in the appended claims, the terms 'a' or 'an' are used, as is common in patent documents, to include one or more than one. In this description and in the appended claims, the term 'or' is used to refer to a nonexclusive or, unless otherwise indicated.

Figure 1:
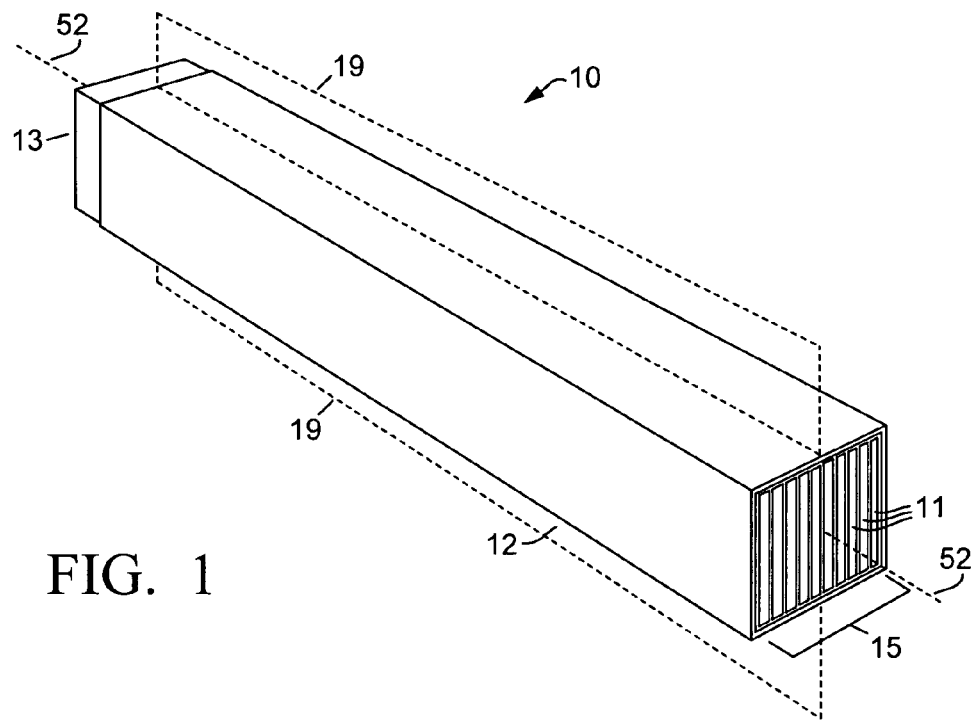
FIG. 1 is a perspective view of an apparatus comprising an enclosure, a transducer, and a plurality of plates disposed in a linear array.
Figure 2:
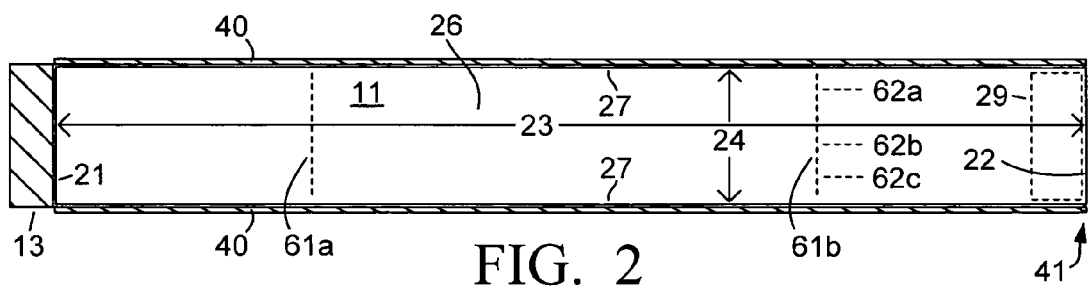
FIG. 2 is a longitudinal cross-section view, in the vertical plane, of the apparatus of FIG. 1.
Figure 3:
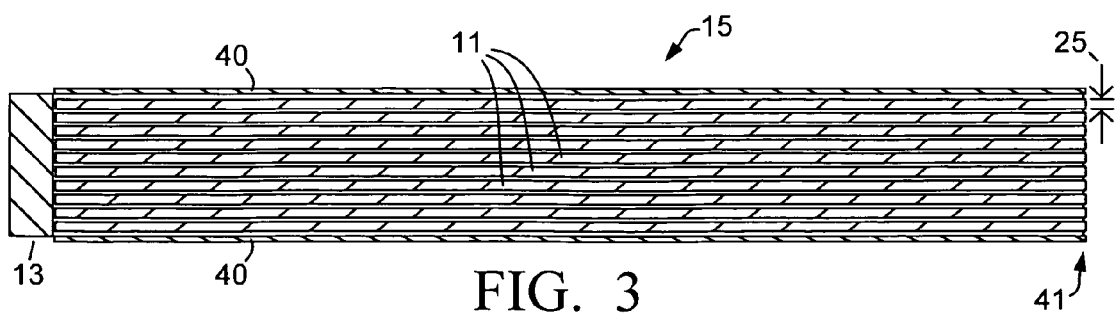
FIG. 3 is a longitudinal cross-section view, in the horizontal plane, of the apparatus of FIG. 1.

FIG. 1 is a perspective view of an apparatus 10 for use with acoustic energy, the apparatus 10 comprising an enclosure 12, an acoustic transducer 13, and a plurality of plates 11 disposed in a linear array 15, in accordance with an embodiment. FIG. 2 is a longitudinal cross-section view, taken in the vertical plane, of the apparatus of FIG. 1. FIG. 3 is a longitudinal cross-section view, taken in the horizontal plane, of the apparatus of FIG. 1. The embodiment of FIGS. 1-3 comprises ten plates 11, each plate 11 being a long thin flat rectangle. Each plate 11 has a proximal end 21 and a distal end 22 and a length 23 and a width 24 and a thickness 25. Each plate has two major faces 26 and two longitudinal edges 27. In FIG. 2, the plane of section passes between two of the plates 11, so that a major face 26 of one plate 11 is visible in FIG. 2. In FIG. 3, the plane of section is perpendicular to the major faces 26.

Figure 39:
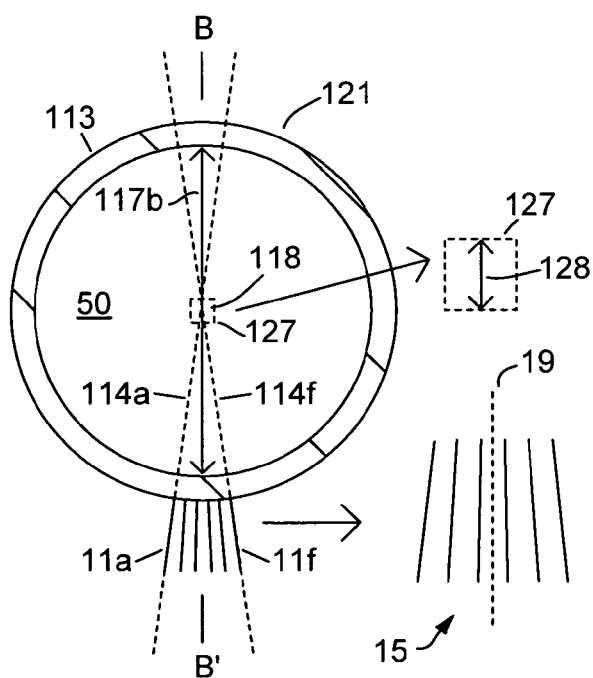
FIG. 39 is a cross-section view of a conduit and a linear array that is part of an apparatus mounted upon the conduit.
Figure 40:
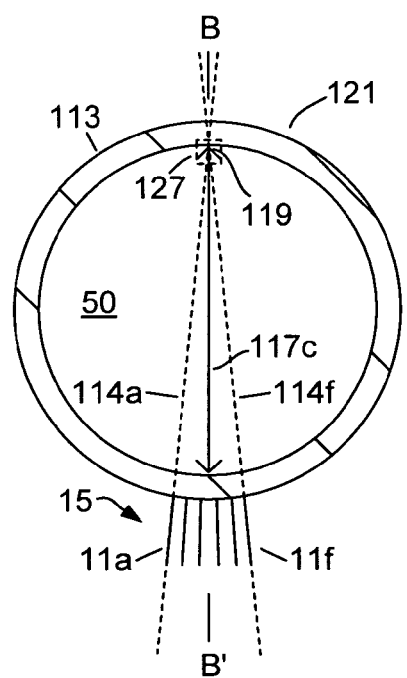
FIG. 40 is a cross-section view of a conduit and a linear array that is part of an apparatus mounted upon the conduit.

Linear array 15 has an array plane 19. Array plane 19 is a plane whose three-dimensional position and orientation is determined with respect to distal planes 114 for distal segments 29 of plates 11. As indicated by the dashed rectangle in FIG. 2, distal segment 29 is a segment of a plate 11 that includes distal end 22 and that is very short with respect to length 23 so that any curvature in the direction of length 23 may be ignored. If a distal segment 29 is completely planar, then its corresponding distal plane 114 passes through the center of distal segment 29, dividing distal segment 29 in the direction of thickness 25. If a plate 11 is curved in the direction of width 24, distal plane 114 is a plane that includes longitudinal edges 27 at distal segment 29. If a plate 11 is completely planar, then its corresponding distal plane 114 passes through the center of plate 11, dividing plate 11 in the direction of thickness 25. Examples of distal planes 114 for plates 11 that are completely planar are depicted in FIGS. 39 and 40. In this description and in the appended claims, array plane 19 means a plane that has a position and orientation that is the average of the positions and orientations for the distal planes 114 for the distal segments 29 of the plates 11 in the linear array 15. In the embodiment of FIG. 1, where plates 11 are parallel to one another, completely planar, and of uniform thickness 25, array plane 19 is parallel to both major faces 26 of each plate 11.

Enclosure 12 comprises a sleeve 40 and means for sealing 44 that seals an end region 41; means for sealing 44 is depicted in the higher magnification view of FIG. 5. Linear array 15 is acoustically coupled to transducer 13. Apparatus 10 has a longitudinal axis 52. Also indicated in FIG. 2 are two length positions 61 and three width positions 62 for plate 11. The linear array 15 of plates 11 may have a square or rectangular cross-sectional shape, with width 24 being equal among the plates 11, as in the embodiment of FIGS. 1-3, or the cross-sectional shape may be circular or hexagonal or some other shape, with plates 11 that differ in width 24.

Figure 4:
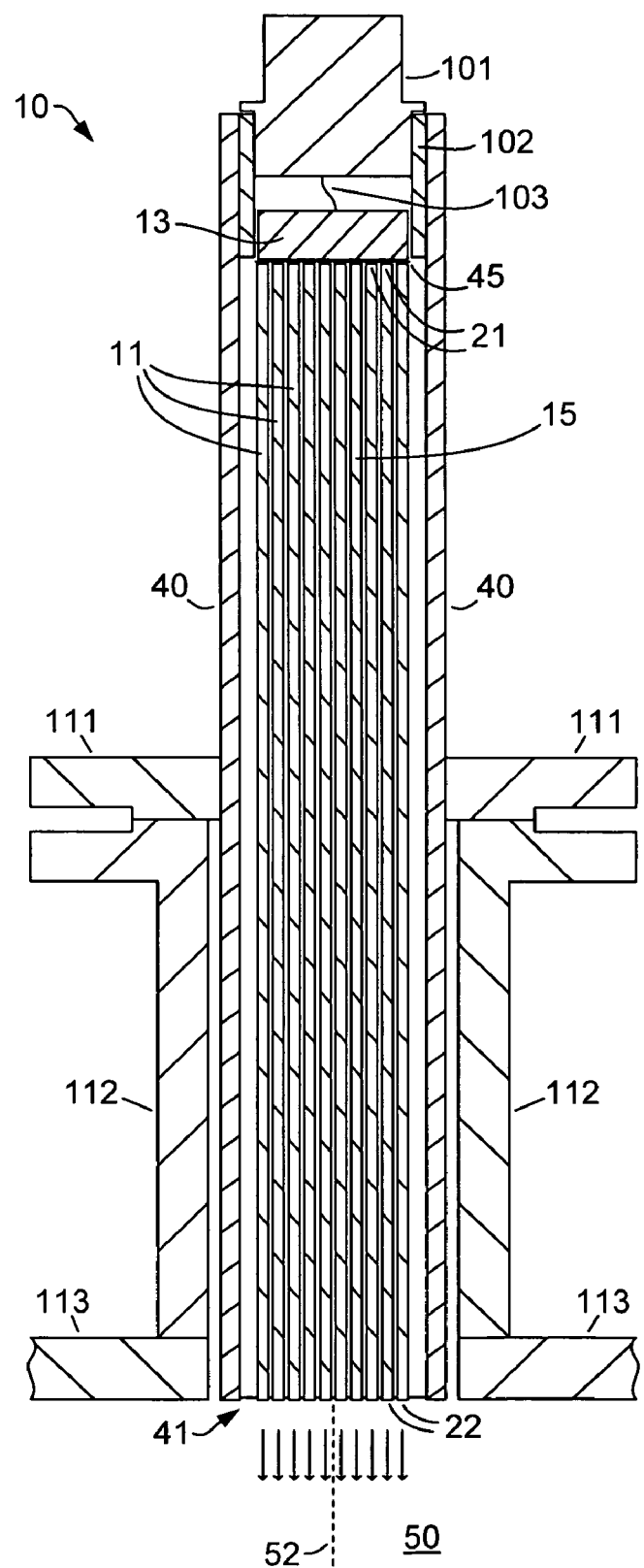
FIG. 4 is a longitudinal section view of the apparatus of FIG. 1 installed within a nozzle attached to a wall of a conduit that contains a target fluid.

Plates 11 within apparatus 10 serve as waveguides that convey an acoustic signal along the length of the plates 11 between proximal end 21 and distal end 22. FIG. 4 is a longitudinal section view of the apparatus 10 of FIGS. 1-3 installed within a nozzle 112 attached at a port (hole) in a wall 113 of a conduit 121 (e.g. a pipe) that contains a target 50 which, in the depicted embodiment, is a fluid. Conduits 121 for fluid targets 50 are discussed in connection with FIGS. 14, 17, 20, 21, 32, 38, 39, and 40. Apparatuses 10 may be used with other vessels or with a wall 113 (a pressure boundary) that can have varied shapes that are not conduits 121. In the embodiment of FIG. 4, apparatus 10 is secured within nozzle 112 via a flange 111 that is attached to sleeve 40 by welding or other means. In this embodiment, the proximal end 21 of each plate 11 is acoustically coupled to transducer 13 through a proximal coupling layer 45 which may be an impedance matching layer. Electrical connector 101 within adaptor 102 may be a BNC type connector and is connected to transducer 13 through a wire lead 103. Plates 11 may be made of various materials including, for example, titanium, aluminum, 316SS stainless steel, other metals, fused silica, aluminum oxide, and other ceramics.

Apparatus 10 may operate to transmit acoustic energy and to receive it. When apparatus 10 is transmitting, transducer 13 receives an electrical signal from electrical connector 101 and emits acoustic energy, such as an ultrasound pulse. The acoustic energy excites each plate 11 at proximal end 21 and the acoustic energy propagates as Lamb waves from proximal end 21 to distal end 22. The acoustic pulse radiates from distal ends 22 into target 50. When apparatus 10 is receiving, acoustic energy in target 50 excites each plate 11 at distal end 22 and propagates as Lamb waves from distal end 22 to proximal end 21. Acoustic energy from proximal ends 21 excites transducer 13 which sends an electrical signal to electrical connector 101.

Figure 13:
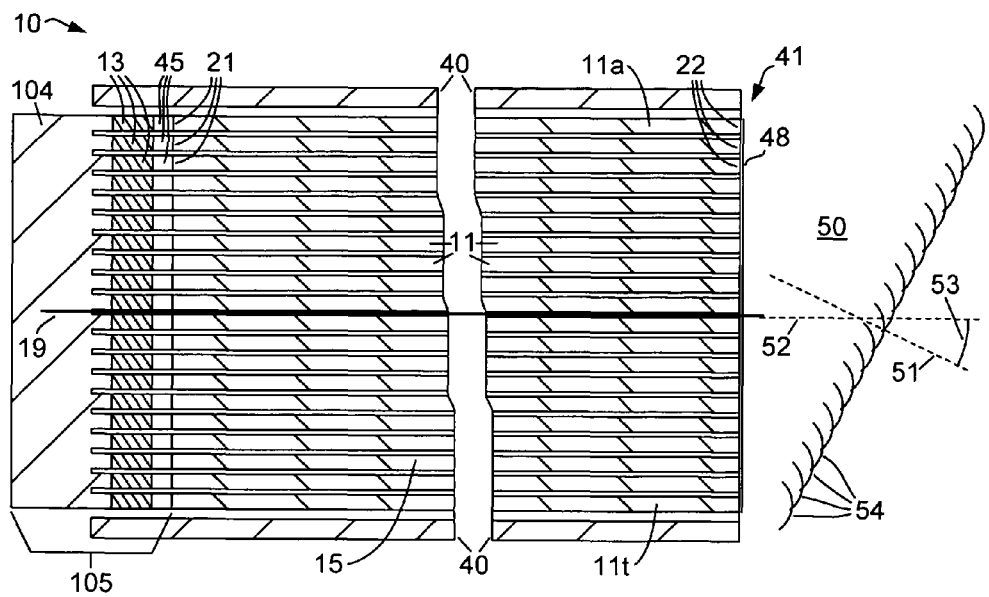
FIG. 13 is a longitudinal cross-section view of an apparatus comprising a plurality of plates disposed in a linear array, a plurality of transducers, and an enclosure comprising a sleeve and means for sealing that seals an end region, in accordance with an embodiment.

Beam steering may be used to control the direction of the beam of acoustic energy that is radiated or received at distal ends 22. FIG. 4 depicts apparatus 10 operating in transmit mode, with acoustic energy (arrows) radiated from distal ends 22 in a direction that is parallel to longitudinal axis 52. In other embodiments described herein, the radiated or received acoustic energy may follow a path that is oblique to longitudinal axis 52. For example, FIG. 13 depicts an embodiment in which a beam axis 51 is oblique to longitudinal axis 52 at an angle 53. Beam steering includes both an oblique or off-axis beam whose angle 53 is constant with time and also a beam whose angle 53 varies over time.

Apparatus 10 may be used as a waveguide that conducts an acoustic signal with little distortion between proximal ends 21 and distal ends 22. Apparatus 10 comprising plates 11 may serve, for example, as a thermal buffer that protects transducer 13 from exposure to extreme temperatures in a target 50. Apparatus 10 may also simplify access to an acoustic path in a device such as an ultrasonic flowmeter. While FIG. 4 depicts one example of apparatus 10 in use with a target 50, many other geometries are possible for use with solid or fluid targets 50. When target 50 is a fluid such as a gas or liquid, that fluid may be under pressure; for example, target 50 may be high pressure natural gas flowing in a conduit 121 such as a pipe. If target 50 is a solid, apparatus 10 may be urged against target 50 using clamp-on pressure-coupling means.

Each plate 11 is capable of propagating Lamb waves. A Lamb wave is a type of ultrasonic wave propagation in which the wave is guided between two parallel surfaces of an object, so that the object behaves as a waveguide. Lamb waves are sometimes called plate waves or guided waves. Lamb waves can propagate along a free plate. The velocity of a Lamb wave depends upon the mode and the "fd product" or "fd", which is the product of frequency (f) and material thickness (d). Material thickness (d) is equivalent to thickness 25 for a plate 11. Velocity also depends upon other attributes such as the density and the elastic properties of the material, particularly the elastic moduli such as the shear modulus and Young's modulus of elasticity. Propagation of Lamb waves is generally dispersive, dispersion meaning that the wave velocity varies as a function of frequency. Dispersion is discussed further in connection with FIGS. 10 and 11.

Lamb waves can propagate in symmetrical (S) or antisymmetrical (A) modes. Symmetrical Lamb waves have particle motion in a symmetrical fashion about the median plane of the plate. This is sometimes called the extensional mode because the wave is stretching and compressing the plate in the direction of wave motion. Wave motion in the symmetrical mode is most efficiently produced when the exciting force is parallel to the longitudinal axis of the plate. The asymmetrical Lamb wave mode is often called the flexural mode because a large portion of the particle motion occurs in a direction that is normal to the plate, and little motion occurs in the direction parallel to the plate. In asymmetrical mode, the body of the plate bends as the two surfaces move in the same direction, similar to a flag rippling in wind.

The Lamb wave is a guided wave and this means that it satisfies certain governing equations as well as some physical boundary conditions. In practice, a real plate is of finite extent and may be in contact with a gas, liquid or solid at some region of its surface or at an edge or end. In the field of nondestructive testing (NDT), Lamb waves may be used to inspect plates for defects. In process control sensing, Lamb waves may be used to sense a characteristic of a fluid (gas or liquid) which contacts the plate and which alters the sound speed or attenuation of the wave. In the NDT and process control sensing fields, the wave may propagate according to equations slightly different from those associated with a free plate in vacuum, but the wave is still called a Lamb wave.

For various embodiments described herein, transducer 13 may be a piezoelectric type such as lead metaniobate, which when excited, vibrates mainly in the thickness mode. In this mode, if transducer 13 is coupled as illustrated to the proximal end 21 (rather than to a major surface 26 at or near proximal end 21), then transducer 13 would mainly excite the symmetrical modes in the plate(s) 11 to which it is acoustically coupled. FIG. 17 depicts an example of a transducer 13S that vibrates in the thickness mode, as indicated by the double-headed arrow above transducer 13S. Transducer 13 may also be a PZT piezoelectric material, in which case it may be of the transverse shear or radial mode type as well as the thickness mode. Transverse shear vibration preferentially excites asymmetric modes in the plate(s) 11. FIG. 17 depicts an example of a transducer 13A that vibrates in the transverse shear mode, as indicated by the double-headed arrow above transducer 13A.

Transducer 13 may also be a pair of transducers 13 bonded together at a single location, e.g. one behind the other at the proximal end 21 of a plate 11. One of the bonded transducers 13 introduces primarily a stress parallel to the midplane of the plate (longitudinal stress), and the other transducer 13 introduces primarily a stress perpendicular to the midplane of the plate (shear stress). It is understood that if any figure in this specification depicts one transducer 13 at a location, the depicted transducer 13 may correspond to a pair of transducers 13 bonded together and attached at that location. It is understood that a plurality of transducers 13, are different from a pair of transducers at a single location, which introduce different stresses but which otherwise serve as a single transducer 13.

Proximal coupling layer 45 may be made of various materials whose characteristic acoustic impedance is intermediate between the impedance of transducer 13 and the impedance of plates 11. Proximal coupling layer 45 may be made of epoxy or silicone rubber or silicone grease, as known in the art. Proximal coupling layer 45 may be very thin, with a thickness that is about 1 percent of the wavelength in the proximal coupling layer 45. In some circumstances, proximal coupling layer 45 may have a thickness that is one-quarter or one-half wavelength. In other embodiments, proximal coupling layer 45 may be omitted, and transducer 13 may be pressed tightly against proximal ends 21 for acoustic coupling.

FIG. 5 is a longitudinal cross-section view, similar to that of FIG. 3 but at higher magnification, of a portion of the apparatus 10 of FIG. 1 near the distal ends 22 of the plates 11. Each plate 11 has a position within the linear array 15 that is indicated in FIG. 1. In FIG. 5, plates 11a-11e have the first through fifth positions within the linear array 15. The major faces 26 are indicated for plates 11b and 11c. As noted in connection with FIG. 3, the plane of section is perpendicular to the major faces 26 of each plate 11. Each plate 11 is adjacent to at least one other plate 11, and two adjacent plates 11 correspond to an adjacent pair of plates 11. Plates 11b and 11c, for example, are an adjacent pair of plates 11. For an adjacent pair of plates, the adjacent pair including a first plate 11 and a second plate 11, a first major face 26 for the first plate 11 is in proximity to a second major face 26 for the second plate 11. For example, a major face 26 of plate 11*b* is in proximity to a major face 26 of plate 11*c*.

As described in connection with FIG. 1, enclosure 12 comprises a sleeve 40 and means for sealing 44 that seals an end region 41. Means for sealing 44 is sealed to sleeve 40. At least 70 percent of each plate 11 is disposed within enclosure 12. In the example of FIGS. 1-5, nearly 100 percent of each plate 11 is disposed within enclosure 12. There are many possible embodiments for the structure of end region 41 and the sealing of end region 41. In the embodiment of FIG. 5, end region 41 comprises a terminal portion of each plate 11 near distal end 22 together with means for sealing 44 that spans gaps 31 and that spans the space between plates 11 and sleeve 40. One method of fabricating the embodiment of end region 41 that is depicted in FIG. 5 is as follows. A set of openings is formed within an end piece, and the distal end 22 of each plate 11 is inserted into an opening. Plates 11 may extend only a minimal distance beyond the external surface of end region 41, as depicted in FIG. 5, or plates 11 may extend further as depicted in FIG. 6. After insertion of plates 11 into the openings in the end piece, the end piece is sealed to each plate 11 and to sleeve 40 using bonding means such as brazing material or welding melt or adhesives (e.g. epoxy). In the method described, means for sealing 44 corresponds to the end piece plus the bonding means. The end piece may be made of the same material as sleeve 40 or of different material.

FIG. 6 is a longitudinal cross-section view, at high magnification, of a portion of an apparatus 10 near the distal ends 22 of the plates 11, in accordance with an embodiment. The embodiment of FIG. 6 is similar to that of FIG. 5, except that the plates 11 extend further beyond the external surface of end region 41, compared to the embodiment of FIG. 5. The portion of each plate 11 that extends beyond end region 41 is an extension 28. While extensions 28 extend outside of enclosure 12, at least 70 percent of each plate 11 is disposed within enclosure 12. Extensions 28 are external to enclosure 12 and are accessible, thereby providing a means of adjusting certain attributes of extensions 28 such as thickness 25 or topology. For example, the thickness 25 of extension 28 may be reduced by etching or may be increased by electroplating. Such adjustments may be useful to compensate for a change in requirements or to compensate for a characteristic of apparatus 10 that is found to be not quite optimal during final testing of the sealed apparatus 10. In another embodiment (not depicted), extensions 28 may be added to apparatus 10 after sealing of end region 41.

The length-width ratio for a linear array 15 is the ratio of the length 23 for the longest plate 11 in the linear array 15 to the width 24 of the widest plate 11 in the linear array 15. For a linear array 15, a length-width ratio is greater than or equal to 3. For improved and predictable propagation of Lamb waves, the length-width ratio may be greater than or equal to 10. The width-thickness ratio for a plate 11 is the ratio of the width 24 to the thickness 25. For at least 90 percent of the plates 11 within an apparatus 10 a width-thickness ratio is greater than or equal to 3. For improved and predictable propagation of Lamb waves, the width-thickness ratio may be greater than or equal to 10. For example, a plate 11 may have a thickness 25 of 0.5 mm, a width 24 of 25 mm, and a length 23 of 300 mm; these dimensions correspond to a width-thickness ratio of 50 and a length-width ratio of 12. When an apparatus 10 is used as a thermal buffer, length 23 is appropriate to the thermal isolation requirements imposed by the temperature of the target 50 and the maximum usable temperature of the transducer 13. Depending upon the thermal isolation requirements, the length-width ratio may range from 3 to 20 or even higher. A plate 11 may be rectangular, as depicted in FIG. 2, or it may have another shape such as, for example, a tapered or trapezoidal shape. A plate 11 may be bilaterally symmetrical in shape, or it may be asymmetrical.

Within an apparatus 10, each of at least 70 percent of the plates 11 is substantially isolated acoustically from each other one of the plates 11. In many embodiments, all of the plates 11 are substantially isolated acoustically. As used in this description and in the appended claims, the term "substantially isolated acoustically" is defined by the amplitude-based or velocity-based tests that are described in several paragraphs that follow this paragraph. As is known in the art, methods and means for acoustic coupling include high pressure and bonding. Bonding includes materials and methods such as adhesives, brazing, and welding. As a general guide, a plate 11 is likely to be substantially isolated acoustically if at least 95 percent of each major face 26 is not secured to any other plate 11 through high pressure or bonding or other acoustic coupling means or methods. For example, two planar metal rectangles, each 1 mm thick, if disposed adjacent to one another with only modest pressure holding the rectangles together, are likely to be substantially isolated acoustically. In contrast, if the two planar metal rectangles are held together tightly as a result of, for example, high pressure or bonding, then the two rectangles are likely to be coupled acoustically over a large fraction of the area of major faces 26 and will behave in many respects as a single plate 11 that is twice as thick as either of the individual planar rectangles. In cases where planar members are deliberately secured together over greater than 5 percent of their major faces 26 using high pressure or bonding or other means that are likely to cause acoustic coupling, we define the joined members to be a single plate 11. If the coupled area is less than 100 percent, the uncoupled regions correspond to holes or voids within the single plate 11. Holes or voids are discussed further below in connection with homogeneity.

Acoustic isolation of plates 11 may be evaluated using any of several independent tests. One type of test for isolation is based on measurement of signal amplitudes, and another type of test is based on measurement of velocity (sound speed). Experience and available equipment both may be determining factors in choosing which test to apply. Amplitude testing for acoustic isolation may suffice even if amplitudes are measurable to an accuracy of only plus or minus 10 percent. Sound speeds and frequencies can often be measured to accuracies of 1 percent or better. For any test, repeated measurements are advisable in order to ascertain the variability of the test results. If two types of test yield different conclusions about isolation of plates, the test having the smaller standard deviation governs.

To evaluate whether plates 11 are substantially isolated acoustically, an amplitude-based test may be performed as follows. The plates 11 are substantially isolated acoustically if for acoustic energy applied at the proximal end 21 of any one of the plates 11, a ratio of a first signal amplitude measured at the distal end 22 of the one of the plates 11 to a second signal amplitude measured at the distal end 22 of another one of the plates 11 is greater than or equal to 10. The 10-fold ratio also applies if the signal amplitudes at the distal ends 22 are inferred from signal amplitudes measured at the proximal ends 21 of the respective plates using pulse-echo or pitch-catch techniques, these techniques being known in the non-destructive testing (NDT) art. These NDT techniques are sometimes referred to as monostatic and bistatic methods; such methods use one transducer 13 or two transducers 13, respectively. For applications demanding extreme acoustic isolation, a ratio greater than or equal to 100 may be appropriate. In a variation of this test, reference reflectors may be used with pulse-echo and/or pitch-catch techniques.

To evaluate whether plates 11 are substantially isolated acoustically, a velocity-based test may be performed as follows. The group delay or group velocity is measured, to determine whether an acoustic pulse propagates in the plates 11 with the velocity (sound speed) that is predicted based upon the known composition and thickness 25 of the plates 11 and the known frequency of the pulse. As described in connection with FIGS. 10 and 11, the velocity of an acoustic pulse may vary as a function of the thickness 25 of the plate 11 in which the pulse propagates. If two plates 11 are acoustically coupled, then the plates 11 will behave like a single plate 11 that has a thickness 25 that is the sum of the thicknesses 25 of the individual plates 11, and that greater thickness 25 may result in faster or slower velocity, depending upon the mode of the acoustic pulse. The plates 11 are substantially isolated acoustically if a difference between the measured velocity and the predicted velocity is less than or equal to five times the standard deviation of the measured velocity. This test is performed at one or more frequencies that are chosen to yield fd products that are in the dispersive range for each expected mode. Swept frequency tests may be automated and take less than one second to execute, so that testing at a wide variety of frequencies is practical. Sound speed can be measured with accuracy of 1 percent or even 0.1 percent.

Another velocity-based test uses measurements of the group delay or group velocity between the proximal end 21 and a reflector which may be near the distal end 22. First, one measures the group delay to the reflector when the individual plate 11 is totally isolated (before installation within a linear array 15). Second, one measures the group delay when the plate 11 is installed within a linear array 15. The plates 11 are substantially isolated acoustically if a difference between the first measurement and the second measurement equals less than 10 percent of the first measurement. For applications demanding extreme acoustic isolation, the first and second measurements may differ by less than 1 percent. This test is performed at one or more frequencies that are chosen to yield fd products that are in the dispersive range for each expected mode.

Plates 11 may be separated by gaps 31, as depicted in FIG. 5, and the gaps 31 may be evacuated or may be filled with material that does not cause acoustic coupling of plates 11, such as material of high attenuation and low sound speed relative to that of the plates 11, as described in connection with FIG. 8. In other embodiments, such as that of FIG. 7, plates 11 may be closely packed together; in other words, gaps 31 may be very small so that there is essentially no space between the major faces 26 of adjacent plates 11. Even closely packed plates 11 may be substantially isolated acoustically because contacts occur only at asperities. For improved isolation, plates 11 may be roughened by, for example, etching or sandblasting. To prevent attenuation of an acoustic signal in a plate 11, surface features (e.g. pits) created by roughening should have dimensions that are much less than one wavelength in the plate 11 at the intended operating frequency. Corrugations may be of use for keeping plates 11 separated and acoustically isolated.

Within an apparatus 10, each of at least 70 percent of the plates 11 is substantially homogeneous. In many embodiments, all of the plates 11 are substantially homogeneous. As used in this description and in the appended claims, a "substantially homogeneous" plate 11 is a plate 11 that satisfies the test described in the following paragraph. As is known in the art, inhomogeneities that can attenuate acoustic energy include features that can reflect or change the path length for acoustic energy, such as holes, voids, grooves, bends, and corrugations. The degree of attenuation (reduction in amplitude) of an acoustic signal depends upon both the number of features and the dimensions of the features. As a general guide, holes, voids, or grooves whose dimensions are very small compared to wavelength in the plate 11 at the intended operating frequency are not likely to significantly attenuate the acoustic signal of interest. If any dimension for a hole, void, or groove is equal to or greater than one wavelength in the plate 11, and if the number of such features is moderate or large, then significant attenuation of the signal is likely.

Substantial homogeneity of a candidate plate 11 is evaluated by comparison to a reference plate 11 that is standardized according to four criteria as follows. (1) The reference plate 11 has nominally the same chemical composition as the candidate plate 11; for example, both plates 11 are made from the same metal or metal alloy or ceramic. (2) The reference plate 11 has the same length 23, width 24, and thickness 25 as the candidate plate 11. (3) The reference plate 11 is substantially planar, as defined herein. (4) The reference plate 11 is free of features such as holes, voids, or grooves having a dimension greater than 10 percent of wavelength at the intended frequency, and the reference plate 11 is free of bends or corrugations. Compliance with criterion (4) may be based upon an industry standard for material quality or based upon inspection of the material used to make the reference plate 11, which inspection may include known ultrasonic pulse-echo methods. The test is performed on a reference plate 11 and a candidate plate 11 that are acoustically isolated (not installed within a linear array 15). The candidate plate 11 and the reference plate 11 are excited with identical transducers 13 and the signals for comparable path lengths are compared. As known in the art, attenuation may be expressed as a complex propagation constant that includes a real part and an imaginary part. The real part for the candidate plate 11 should differ from the real part for the reference plate 11 by at most 10 percent of the latter. The imaginary part for the candidate plate 11 should differ from the imaginary part for the reference plate 11 by at most 20 percent of the latter. An even greater degree of homogeneity may be appropriate for some applications.

If a plate 11 includes only a single inhomogeneity such as a bend or a void, the acoustic signal may not be significantly attenuated, even if the feature dimension is equal to or greater than one wavelength. For example, a bend near each edge 27 that extends from proximal end 21 to distal end 22, resulting in two narrow longitudinal flanges 35, may not significantly attenuate the acoustic signal. FIG. 30A depicts a cross-section view of a flanged plate 11. In another example, a single rectangular void may not cause significant attenuation. A single void may cause significant attenuation, however, if the void divides a region of the plate into two walls of differing length, because the differing lengths will cause a differential delay for the signals travelling in the two walls, so that the signals are not in phase when recombined at the end of the void. Walls of differing length may occur, for example, if there is a void within a plate 11 that differs in thickness 25 along its length 23. Corrugations may not cause significant attenuation if the corrugations have a large radius of curvature compared to wavelength in the plate 11 and if the corrugations are spaced at least several wavelengths apart or one-half of the pulse length apart, whichever is greater, to minimize destructive interference. FIG. 30B depicts a cross-section view of a corrugated plate 11.

Within an apparatus 10, each of at least 70 percent of the plates 11 is substantially planar. In many embodiments, all of the plates 11 are substantially planar. In this description, the terms "flat" and "substantially planar" have the same meaning. As used in this description and in the appended claims, the term "substantially planar" means that the length 23 is less than or equal to 100 percent of a longitudinal radius of curvature for the plate 11, and the width 24 is less than or equal to 100 percent of a transverse radius of curvature for the plate 11. For greater planarity, for each of at least 90 percent of the plates 11 the length 23 may be less than or equal to 20 percent of the longitudinal radius of curvature for the plate 11. Similarly, for each of at least 90 percent of the plates 1 the width 24 may be less than or equal to 20 percent of the transverse radius of curvature for the plate 11. Most of the embodiments depicted in the Figures herein are highly planar, with length 23 and width 24 being less than 1 percent of the longitudinal and transverse ratios of curvature, respectively. FIG. 26B depicts a cross-section view of an embodiment that is highly planar on major surface 26*a* and which is less planar on major surface 26*b*. Where a plate 11 has flanges 35, as in the embodiment of FIG. 30A, the degree of planarity is measured for a major face 26 excluding flanges 35. Where a plate 11 is corrugated, the degree of planarity is measured for a plate midplane 37, as depicted in the embodiment of FIG. 30B.

FIG. 7 is a longitudinal cross-section view of an apparatus 10 comprising a plurality of plates 11 and an enclosure 12 comprising a sleeve 40 and means for sealing 44 that seals an end region 41, in accordance with an embodiment. The array thickness 42 for a linear array 15, depicted in FIG. 7, equals the summed thickness of the individual plates 11 plus any gaps 31 between the plates 11. In the embodiment of FIG. 7, plates 11 are closely packed together, with essentially no space between the major faces 26 of adjacent plates 11. In this embodiment, end region 41 comprises a terminal portion of each plate 11 near proximal end 21 together with means for sealing 44 that makes a seal between adjacent plates 11 and that also makes a seal between plates 11 and sleeve 40. In the embodiment of FIG. 7, end region 41 may be sealed using bonding means such as brazing material or welding melt or adhesives (e.g. epoxy) and means for sealing 44 corresponds to the bonding means.

Means for sealing 44 that seals end region 41 may be located at or near the proximal ends 21 as in the embodiment of FIG. 7, or may be located at or near the distal ends 22 as in the embodiments of FIGS. 1-6, or may be located at both the proximal ends 21 and the distal ends 22. Thus in some embodiments, the end region 41 comprises a first end region 41 and a second end region 41, and the means for sealing 44 comprises a first means for sealing 44 that seals the first end region 41 and a second means for sealing 44 that seals the second end region. For example, the embodiment depicted in FIG. 24 comprises a first end region 41 located at proximal ends 21 and a second end region 41 located at distal ends 22. In an embodiment such as that of FIG. 24, means for sealing 44 that seals first and second end regions 41 may correspond to any of the means for sealing 44 described herein, and different means for sealing 44 may be used to seal the first end region 41 and the second end region 41.

For any embodiment, enclosure 12, comprising sleeve 40 and means for sealing 44 that seals end region 41, may serve to exclude substances that could cause acoustic coupling or corrosion of plates 11. For example, if a liquid such as water were present within gaps 31 between plates 11, that liquid could cause acoustic coupling of plates 11. Corrosion of plates 11 can result in degradation of an acoustic signal that propagates in plates 11. When apparatus 10 contacts a target 50 that is a fluid, typically there is a means for sealing 44 that seals an end region 41 at or near the distal ends 22. Sealing of an end region 41 at the proximal ends 21, as in the embodiment of FIG. 7, is useful in settings where moisture or other substances may be present in the environment surrounding apparatus 10. Moisture condensed upon the plates 11 can cause acoustic coupling or can otherwise interfere with reliable propagation of Lamb waves. When apparatus 10 is used with a target 50 that is solid, such as a conduit 121, it is often acceptable to omit means for sealing 44 at the distal ends 22 but include means for sealing 44 that seals an end region 41 at the proximal ends 21.

Sealing of end region 41 may be accomplished using various means for sealing 44. The sealing may use an adhesive such as epoxy or any of various metallurgical methods such as brazing, laser welding, electron beam welding, or tungsten inert gas (TIG) welding. When such sealing means and methods are used, means for sealing 44 in the embodiment of FIG. 7 corresponds to the bonding means which is the adhesive or the brazing material or the weld melt material. The simple geometry, with a linear array 15 of planar plates 11, facilitates use of a simple control program for automatic control of the welding or brazing method.

In another embodiment (depicted in FIG. 9), end region 41 may be sealed using an end piece that covers proximal ends 21 or distal ends 22, the end piece being sealed to sleeve 40 using bonding means, and the means for sealing 44 comprises the end piece together with the bonding means. The end piece may be made of the same material as sleeve 40 or of different material. In an end region 41 embodiment such as that of FIG. 9, the end piece is acoustically coupled to the proximal ends 21 or the distal ends 22 using bonding means or high pressure. If the covering end piece seals an end region 41 located at proximal ends 21, the proximal ends 21 are acoustically coupled to the transducer 13 through the end piece which is part of the means for sealing 44.

Proximal ends 21, distal ends 22, and/or end region(s) 41 may be machined according to the application requirements. Proximal ends 21 or a (sealed) end region 41 at the proximal ends 21 may be machined to accommodate a transducer 13. Distal ends 22 or a (sealed) end region 41 at the distal ends 22 may be machined to accommodate a target 50 which may be either solid or fluid. At the proximal ends 21, an end region 41 may also serve as a ground electrode for a transducer 13.

For any embodiment, to prevent noise resulting from acoustic waves propagating in sleeve 40, the group velocity in sleeve 40 may be different from the group velocity in plates 11, so that an acoustic pulse in sleeve 40 arrives well before or well after an acoustic pulse in plates 11. By using different materials or thicknesses for sleeve 40 and plates 11, the group velocity for sleeve 40 can be made to differ from the group velocity for plates 11.

FIG. 8 is a cross-section view of an apparatus 10, with the plane of section perpendicular to the longitudinal axis 52 of the apparatus 10, in which the edges 27 of the plates 11 fit into slots 46 in the sleeve 40, in accordance with an embodiment. In the embodiment of FIG. 8, slots 46 are separated by ridges 47 which are aligned with gaps 31 between plates 11. Slots 46 within sleeve 40 may be formed by various means including casting, broaching, or electric discharge machining. Slots 46 may terminate within the sleeve to provide mechanical stops for plates 11. Slots 46 secure plates 11 within sleeve 40 that is part of enclosure 12, so that plates 11 can withstand various forces. Such forces include the force of a fluid target 50 under pressure or the force of a solid target 50 that is urged against apparatus 10 to provide acoustical coupling between distal ends 22 and the solid target 50.

Slots 46 also control the spacing between plates 11 in the embodiment of FIG. 8. In embodiments that have gaps 31 between plates 11, such as the embodiments of FIGS. 1-6 or FIG. 8, the gaps 31 between plates 11 may be equal in size for all adjacent pairs or may differ in size. In another embodiment, a linear array 15 of plates 11 may be temporarily spaced with Teflon shims and secured within sleeve 40 using an adhesive such as epoxy. After the epoxy cures, the Teflon spacer shims, which do not bond to ordinary epoxy, may be removed, leaving gaps 31 of predetermined size that is equal to the thickness of the Teflon spacer shims that were removed. In another embodiment, spacing of metal plates 11 within a metal sleeve 40 may be accomplished by spike-welding using an electron beam weld, which secures the edges of each plate 11 at its proper position within the sleeve 40. In another embodiment, spacing may be controlled by flanges 35 that are formed by bending a plate 11 near its longitudinal edges 27.

In another embodiment, the spacing between plates 11 may be controlled using material of a defined thickness that fills a gap 31 between plates 11. To ensure that the spacing material in the gap 31 does not acoustically couple the plates 11, this material should have high attenuation and low sound speed relative to that of the plates 11. For example, the spacing material may be a foamy material such as urethane foam. Other materials having relatively high attenuation coefficients and low sound speed may be chosen from the Teflon family of plastics. Teflon is highly attenuating compared to acrylic or other plastic materials, but weak coupling of plates 11 may occur if the Teflon spacing material is very thin and if the Teflon and the plates 11 are held together under pressure. To the extent that the spacing material introduces no traction to the major faces 26 that the spacing material contacts, predictions of Lamb wave theory tend to be more accurate, than if traction were introduced. In an embodiment in which the enclosure 12 is sealed at both end regions 41, using a means for sealing 44 at proximal ends 21 and also at distal ends 22, the gaps 31 between plates 11 may be evacuated or may be filled with an inert gas, resulting in high attenuation within the gaps 31.

To achieve a strong signal and high signal to noise ratio (SNR), it may be appropriate to use a linear array 15 of plates 11 that are fairly closely packed together, with small or very small gaps 31, and with linear array 15 filling all or nearly all of the interior volume within sleeve 40. Close packing of plates 11 may result in a stronger signal and a higher signal to noise ratio, compared to widely spaced plates 11. For a given size of sleeve 40, more energy can be radiated per unit time into a target 50 if plates 11 are fairly closely packed together and if sleeve 40 is fairly completely filled. As noted herein, plates 11 may be substantially acoustically isolated even when close together, especially if the major faces 26 are roughened. In many embodiments, spacing of plates 11 corresponds to the following rule: for at least 70 percent of the adjacent pairs of plates 11, a distance between the first major face 26 for the first plate 11 in an adjacent pair and the second major face 26 for the second plate 11 in an adjacent pair is less than the thickness 25 of the first plate 11 or the second plate 11. The distance corresponds to the size of the gap 31 in FIG. 5. In some embodiments, the distance is very much less than thickness 25 so that the plates 11 are closely packed together. Spacing of plates 11 is discussed further with respect to grating lobes and pitch 33 in connection with FIG. 24.

The strength of an acoustic signal transmitted by a waveguide, such as the apparatus 10 embodiments described herein, is a function of the cross-sectional area of the waveguide. The cross-sectional area of interest is the summed area for the linear array 15 of plates 11 viewed in a plane of section perpendicular to the longitudinal axis 52 of apparatus 10, as in the cross-sectional view of FIG. 8. In one example, a linear array 15 of plates might include 25 plates 11, each plate 11 having a width 24 of 25 mm and a thickness 25 of 1 mm. The summed thickness of the linear array 15 of plates 11 is 25 mm, and the cross-sectional area of the linear array 15 is 25 mm×25 mm=625 square mm. This is equivalent to about one square inch. In another example, linear array 15 might include 125 plates 11, each plate 11 having a thickness of 0.2 mm and a width of 25 mm. The summed thickness of the linear array 15 is 25 mm, and the cross-sectional area is the same as in the previous example. The linear array 15 of plates 11 may have a square or rectangular cross-sectional shape, as in the examples just described and in the embodiments of FIGS. 1 and 8. In other embodiments, the cross-sectional shape may be circular or hexagonal or some other shape. FIG. 25 depicts an embodiment in which the linear array 15 has a hexagonal cross-sectional shape, the linear array 15 including a number of rectangular plates 11 that differ in width 24.

A steerable acoustic waveguide comprising a linear array 15 of plates 11, the linear array 15 having a large cross-sectional area, may be used in applications that typically employ a moderate or high acoustic energy intensity. Moderate acoustic energy applications include ultrasonic measuring or testing applications in industrial settings such as measuring characteristics of fluids within pipes (process control sensing, flowmeters), or detection of flaws or discontinuities within solids using non-destructive testing (NDT). High acoustic energy applications include applications such as cleaning or welding using acoustic energy, and catalysis of chemical reactions using acoustic energy, an application which is sometimes called sonochemistry. In some applications, a steerable waveguide may serve as a buffer that maintains a distance between a transducer 13 and a target 50, the target 50 having one or more properties, such as an extreme temperature or a high and suddenly changing pressure, which might cause damage to the transducer 13 if the transducer 13 were adjacent to the target 50. A complete ultrasonic system may include other components such as a pulser or pulser/receiver, amplifiers, filters, and computation means, in addition to waveguide apparatus 10.

A steerable waveguide apparatus 10 comprising a linear array 15 of plates 11 may be manufactured in various ways, as described herein. For example, sheet material of various thicknesses, densities, compositions and microstructures is available and can be cut to form individual plates 11 having rectangular or other shapes. In another embodiment, the plates 11 may be manufactured in varying width 24 to fit within a cylindrical sleeve 40 such as a half-inch or one inch diameter pipe, or to fit within an arbitrarily shaped sleeve 40. In other words, the cross-sectional shape of the linear array 15 may be circular or of arbitrary shape. The plates 11 may be identical in dimensions, composition, and other attributes, or an individual plate 11 may differ from adjacent plates 11 with respect to one or more attributes, as described further below. The thickness 25 of one or a few plates 11 may differ slightly from the thickness 25 of the majority of the plates 11, for ease of installing the linear array 15 within a sleeve 40. For embodiments that employ plates 11 having smooth major faces 26, the plates 11 may be cut from ground flat stock available from, for example, McMaster-Carr Supply Company of New Brunswick, N.J.

As described in connection with FIG. 8, plates 11 may be secured in specific positions within a sleeve 40 using various means. These means for securing differ in the degree to which they constrain the motion of a plate 11. Motion of a plate 11 is integral to the propagation of acoustic waves such as Lamb waves. A small constraint of motion occurs when a linear array 15 of plates 11 is disposed within a sleeve 40 with no bonding means. Slightly greater constraint occurs when edges 27 are held within slots 46 as in the embodiment of FIG. 8. Epoxy, spot welds, and continuous welding or brazing along edges 27 represent successively greater constraints. A thin plate 11 (a plate 11 having a large width-thickness ratio) is less rigid than a thick plate 11. Thus, thin plates 11 may be appropriate for offsetting the motion constraints imposed by the securing of plates within a sleeve 40. In other words, in embodiments where the motion constraint is greater, it may be useful to use thinner plates 11 rather than thicker plates 11.

FIG. 9 is a longitudinal cross-section view of a portion of an apparatus 10 that is chamfered at the distal end, in accordance with an embodiment. The distal end of apparatus 10 is the end that includes distal ends 22 of plates 11 and that radiates energy into or receives energy from a target 50. Radiation off the distal end is oblique to the distal end surface (interface) at an angle governed by Snell's law. The line labelled 56 indicates an axis that is normal (perpendicular) to the distal end surface, the end surface in this embodiment corresponding to end region 41. Radiation off the distal end is refracted along beam axis 51, which is oblique to normal axis 56. Chamfering may be executed in a plane at an angle to the midplane of apparatus 10 or at an angle to the longitudinal axis in a plane perpendicular to the midplane, or both. In an alternative embodiment, the distal end of the apparatus 10 may be contoured to match the surface contour of a solid target 50. In the embodiment of FIG. 9, end region 41 at distal ends 22 is sealed using an end piece that covers distal ends 22, the end piece being sealed to sleeve 40 using bonding means, and the means for sealing 44 comprises the end piece together with the bonding means.

Figure 10:
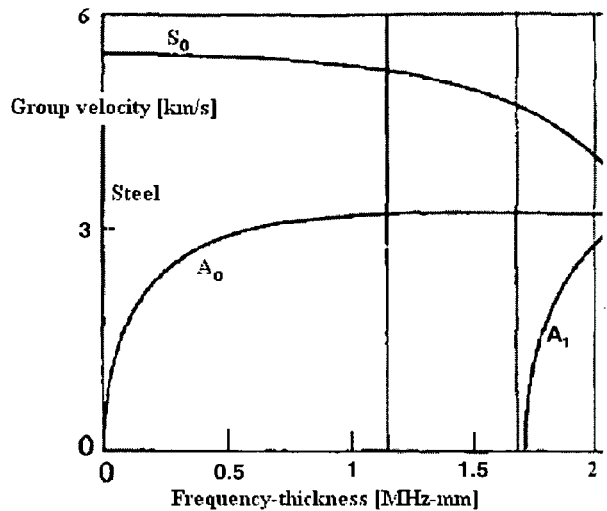
FIG. 10 is a prior art graph that depicts dispersion curves for the $S_0$, $A_0$, and $A_1$ modes for Lamb waves in a steel plate.
Figure 11:
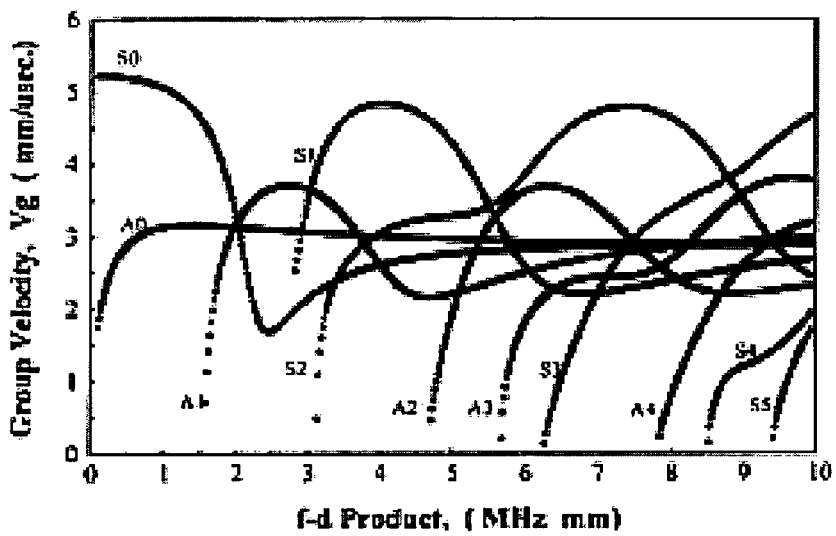
FIG. 11 is a prior art graph that depicts dispersion curves for several symmetrical (S) and antisymmetrical (A) modes for Lamb waves in a steel plate.

FIG. 10 is a prior art graph that depicts group velocity dispersion curves for the $S_0$, $A_0$, and $A_1$ modes for Lamb waves in a steel plate. FIG. 11 is a prior art graph that depicts group velocity dispersion curves for several symmetrical (S) and antisymmetrical (A) modes for Lamb waves in a steel plate. The $S_0$ and $A_0$ modes are the lowest-order modes. For each graph, the vertical axis represents the group velocity of a Lamb wave, and the horizontal axis represents the "fd product" or "fd", which is the product of frequency (f) of the wave and material thickness (d) of the plate in which the wave propagates. Material thickness (d) is equivalent to thickness 25 for a plate 11. Many ultrasonic measurements utilize tone bursts of one to several cycles, and thus group velocity is probably the most reliable predictor of how fast the energy of interrogating pulses propagates along plates 11. The graph of FIG. 10 is adapted from a journal article by Alleyne and Cawley, "The Interaction of Lamb Waves with Defects", IEEE Transactions on Ultrasonics, Ferroelectrics, and Frequency Control, Vol. 39, No. 3, page 392, May 1992. The graph of FIG. 11 is adapted from Jeong, H. D., Rose, J. L., "Detection of Defects in a Thin Steel Plate Using Guided Ultrasonic Wave", 15th World Conference on Non-Destructive Testing, Rome, Italy, Oct. 15-21, 2000.

With respect to Lamb waves, dispersion means that wave velocity varies as a function of frequency (f) but also depends on thickness (d). Small dispersion means that velocity is relatively constant over a range of fd values. In the graphs of FIGS. 10 and 11, small dispersion for a given mode means that the curve for that mode is reasonably level, with little or no slope, within some range of fd values. For example, the $S_0$ curve is nearly level at fd less than 0.1 MHz-mm. The $A_0$ curve is fairly level between 1 MHz-mm and 2 MHz-mm, but is steeply sloped (dispersive) at fd less than 0.1 MHz-mm. Dispersion causes "smearing", in which a pulse is spread over a longer time interval and the amplitude of the pulse is reduced. Smearing arises because a pulse is not a single frequency but instead typically includes a band of frequencies.

Figure 33:
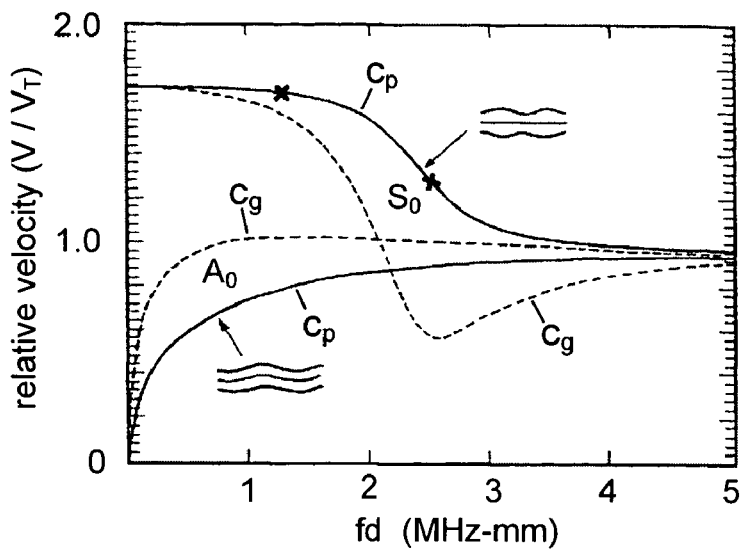
FIG. 33 is a prior art graph that depicts relative velocity $V/V_T$ for glass, calculated as a function of fd (MHz-mm), for the $A_0$ and $S_0$ modes.
Figure 34:
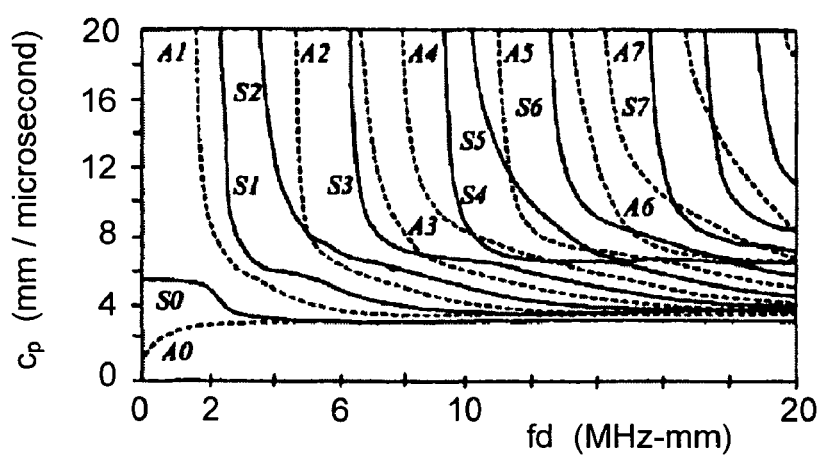
FIG. 34 is a prior art graph that depicts phase velocity dispersion curves for several symmetrical (S) and antisymmetrical (A) modes for Lamb waves in an aluminum plate.
Figure 35:
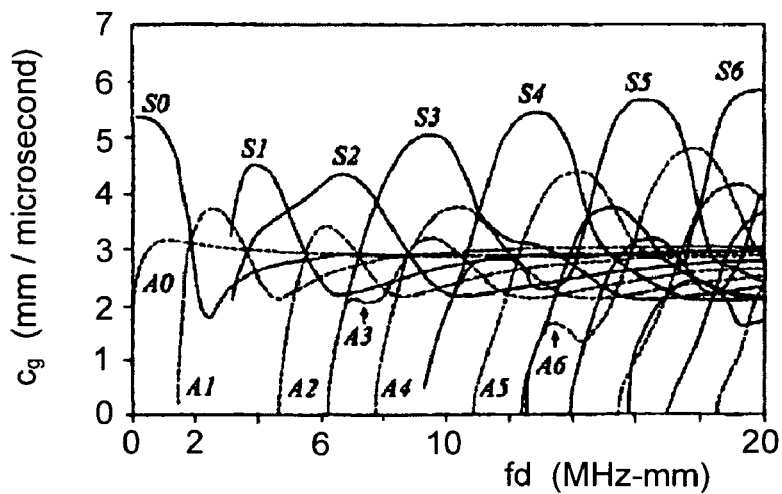
FIG. 35 is a prior art graph that depicts group velocity dispersion curves for several symmetrical (S) and antisymmetrical (A) modes for Lamb waves in an aluminum plate.

As is known in the art, the group velocity dispersion curves for some other metals and for glass are qualitatively and quantitatively similar to those for steel. As a result, lowest-order modes exist and higher-order modes are largely absent at ranges of fd that are similar for many materials. FIG. 33 is a prior art graph that depicts relative velocity $V/V_T$ for glass, calculated as a function of fd (MHz-mm), for the $A_0$ and $S_0$ modes. For each mode, $c_p$ is the phase velocity and $c_g$ is the group velocity. The graph of FIG. 33 is adapted from a book entitled "Elastic Waves in Solids II" by Daniel Royer and Eugene Dieulesaint, page 337, © 1999 Masson. Relative velocities were calculated for a glass plate having longitudinal ($V_L$) and shear ($V_T$) velocities of 5960 n/s and 3200 n/s, respectively. The velocity at any position on any of the curves may be determined by multiplying the relative velocity ($V/V_T$), which is indicated in the graph, times $V_T$ which is 3200 n/s. For example, the group velocities for glass for the $A_0$ and $S_0$ modes are nearly equal, with values of about 3200 meters/second, at fd=2 MHz-mm. The group velocities for steel for the $A_0$ and $S_0$ modes, depicted in FIGS. 10 and 11, are similar to the group velocities for glass that are depicted in FIG. 33. FIG. 34 is a prior art graph that depicts phase velocity dispersion curves for several symmetrical (S) and antisymmetrical (A) modes for Lamb waves in an aluminum plate. FIG. 35 is a prior art graph that depicts group velocity dispersion curves for several symmetrical (S) and antisymmetrical (A) modes for Lamb waves in an aluminum plate. The graphs of FIGS. 34 and 35 are adapted from a book entitled "Ultrasonic Waves in Solid Media" by Joseph L. Rose, page 112, © 1999 Cambridge University Press.

Ceramics such as aluminum oxide have longitudinal and shear sound speeds that are nearly double those of many metals or glass. For materials having high sound speeds compared to that of steel, the asymptotic group velocities are proportionately higher than the group velocities for steel.

In choosing the thickness 25 for plates 11 in an apparatus 10, consideration of only the $S_0$ mode (lowest-order symmetric mode) might lead one to choose a very small value of d (thickness 25), such as fd less than 0.1 MHz-mm, so that little or no dispersion is expected for the $S_0$ mode. Lamb waves, however, typically propagate in two or more modes. At very small values of fd, the $S_0$ mode is indeed nearly free of dispersion but the $A_0$ mode is highly dispersive. This means, in general, that to the extent symmetric (S) and asymmetric (A) modes are both present, dispersion cannot be totally avoided when Lamb waves are propagating. If higher-order modes are excited, then additional sources of dispersion are present. At small values of fd, the group velocity of the $A_0$ mode is low compared to the $S_0$ group velocity. At a sufficiently low frequency, therefore, $A_0$ pulses arrive after $S_0$ pulses, and the $A_0$ pulses may be considerably smaller in amplitude than the $S_0$ pulses as a consequence of $A_0$ dispersion (smearing). In this case the $A_0$ pulses might not interfere with $S_0$ pulses. This approach is practical only for small values of fd, however, and for many applications higher values of fd may be appropriate.

The signal to noise ratio (SNR) of a system depends upon both the number of modes that are present and the amount of dispersion for each mode. To maximize the SNR of a system, it may be useful to operate at a range of fd that is consistent with the following criteria: (1) minimize the number of modes that are present, and (2) minimize the total dispersion for a set of modes.

The signal to noise ratio SNR of an apparatus 10 generally is increased by operating the apparatus 10 with only one or a few modes present. For example, the apparatus 10 may operate so that only the two lowest-order modes $A_0$ and $S_0$ can exist. It is expected that a high SNR will result when no mode arrives earlier than the $A_0$ or $S_0$ mode. For example, the apparatus 10 may operate so that no higher-order mode propagates in any of the plates 11 at a group velocity faster than the group velocity of the slower of the two lowest-order modes $A_0$ and $S_0$. As seen in FIG. 10 for steel, when fd is less than about 1.8 MHz-mm, the $A_1$ mode has a group velocity in steel which is significantly lower than the group velocities of the $A_0$ or $S_0$ modes. Thus, an fd value below about 1.8 MHz-mm may be useful for delaying the arrival of the $A_1$ mode and for achieving a high SNR. If the application is such that a higher frequency is preferred, then operation at fd=2 MHz-mm may be useful even though the third mode $A_1$ is present, because the $A_1$ mode has a slightly lower group velocity than the group velocities of the lowest-order modes $A_0$ and $S_0$ and so the $A_1$ mode arrives later. However, if the pulse repetition frequency (PRF) is sufficiently high, in the kilohertz range, e.g. 5 kHz as may be required for fast response, a slow $A_0$ pulse from a previous ping (interrogation) may interfere. To some extent it is possible to control the energy partition between $A_0$ and $S_0$ by the manner of excitation and frequency. $A_0$ may be emphasized by using excitation and detection orthogonal to the plate 11. Conversely, by exciting the proximal ends 21 of a linear array 15 of plates 11 orthogonal to the proximal ends 21, the $S_0$ mode may be emphasized.

To minimize dispersion, one may operate an apparatus 10 using a range of fd values for which total dispersion is small for the set of modes of interest. The set of modes of interest may be, for example, the lowest-order modes $A_0$ and $S_0$. For any mode, the magnitude (absolute value) of the slope of the dispersion curve at a specific value of fd is a measure of the dispersion for that mode at that value of fd. If dispersion is large for any individual mode, that large dispersion may reduce the SNR for the system. Thus for any individual mode a small dispersion may be useful. Operating at an fd value or range that gives the lowest dispersion for one mode may, however, result in a large dispersion for another mode at that same fd value or range. Thus, the operating value or range of fd may be a value or range that results in a reasonably small dispersion for each mode in the set of modes of interest, but this value or range of fd may not result in the very lowest dispersion for any individual mode.

In FIG. 10, at fd=0 MHz-mm, the magnitude of the slope of the $S_0$ curve appears to be close to zero while the magnitude of the slope of the $A_0$ curve is very large. At fd=2 MHz-mm, the magnitude of the slope of the $S_0$ curve is moderately large and the magnitude of the slope of the $A_0$ curve is close to zero. The sum of the magnitudes of the slopes, at either fd=0 MHz-mm or at fd=2 MHz-mm, is fairly large. At intermediate values of fd such as fd=1.0 Mz-mm, the magnitudes of the slopes are very small for both the $S_0$ and $A_0$ curves. Thus the sum of the magnitudes of the $S_0$ and $A_0$ slopes, for intermediate values of fd, is reasonably small. A value of fd for which the sum of the magnitudes of the $S_0$ and $A_0$ slopes is a minimum results in small slope magnitudes, and thus small dispersion, for both $S_0$ and $A_0$.

As used herein and in the appended claims, the term "operating fd value" means a value of fd for which the sum of the magnitudes of the $S_0$ and $A_0$ slopes is a minimum, and the term "fd product range" means a range of values of fd that includes an operating fd value. The fd product range may be centered upon the operating fd value, or the fd product range may be shifted higher or lower while still including the operating fd value. For a broad continuum of values of fd, there may be more than one local minimum for the sum of the magnitudes of the slopes; the minimum of interest here is the minimum where the operating fd value is less than an fd value for any other minimum.

The preceding description can be expressed as follows. An operating fd value is a value of fd where F(fd) has a minimum value, where $F(fd)=(|m1(fd)|+|m2(fd)|)$ and where $|m1(fd)|$ is a first absolute value for a first slope for a first dispersion curve at the operating fd value and where $|m2(fd)|$ is a second absolute value for a second slope for a second dispersion curve at the operating fd value. An alternative expression, which yields the equivalent result, is the following. An operating fd value is a value of fd where F(fd) has a minimum value, where $F(fd)=|m1(fd)-m2(fd)|$ If either of the preceding expressions is applied to the dispersion curves for steel for $S_0$ and $A_0$ in FIG. 10, the result is a minimum value for F(fd) at an fd value of approximately 1.0 MHz-mm. Thus, for steel one may employ an operating fd value of approximately 1.0 MHz-mm. As noted, an fd product range includes the operating fd value. The fd product range may be a broad range that includes the operating fd value, or the fd product range may be a narrower range that includes the operating fd value. For example, if the fd product range is centered relative to the operating fd value, the minimum and maximum values for the fd product range may be 50 percent above and 50 percent below the operating fd value, so that the total breadth of the range equals 100 percent (50 percent plus 50 percent) of the operating fd value. In other words, if the operating fd value is 1.0 MHz-mm, for example, the minimum and maximum values of the fd product range may be 0.5 MHz-mm and 1.5 MHz-mm. Depending upon the application, a greater breadth, such as 200 percent or 150 percent of the operating fd value, may be appropriate. Similarly, a smaller breadth, such as 50 percent of the operating fd value, may be appropriate.

As noted previously, an fd product is the product of the frequency (f) of the acoustic energy times the thickness (d) of a plate in which the acoustic energy propagates. For example, if an fd product range extends from 0.5 MHz-mm to 1.5 MHz-mm, and using an operating center frequency of 1.0 MHz, then the thickness d of the plates may range from 0.5 mm to 1.5 mm. In another example, if an fd product range extends from 0.5 MHz-mm to 1.5 MHz-mm, and using plates having a uniform thickness of 1.0 mm, then the operating center frequency may range from 0.5 to 1.5 MHz. In this second example, the operating center frequency may be the same for each plate or may differ between plates, and the operating center frequency or frequencies may vary over time. While the fd product range and operating fd value are described above for the example of steel, the same approach may be used for selecting combinations of frequency and thickness for other materials for plates, such as, for example, the metals aluminum, titanium, or 316SS stainless steel, or glass, or fused silica or ceramics such as aluminum oxide.

The frequency for use with a target 50 depends upon whether target 50 is a gas, a liquid, or a solid. For a gas, frequencies between 0.05 and 0.5 MHz are typically used. For a liquid, frequencies between 0.5 and 5 MHz are typical. For a solid, frequencies between 1 and 10 MHz are typical. Frequency f may be further restricted based on additional considerations such as avoiding vibration noise, flow noise or valve noise, avoiding pipe-borne crosstalk between transducer assemblies, avoiding grating lobes (side lobes), or achieving beam directivity in the target medium.

Other aspects of group velocity and phase velocity may be explained with reference to an embodiment such as that of FIG. 4. Assuming that plates 11 are uniform in physical attributes such as thickness and composition, radiation into target 50 is primarily parallel to longitudinal axis 52, as indicated by the arrows, but beam spread will give rise to some off-axis radiation as well. If the fd product range is less than approximately 1 MHz-mm, Lamb waves will propagate only in the lowest-order modes $S_0$ and $A_0$. Transducer 13 may be a compressional-mode or thickness-mode transducer 13 that is capable of launching or receiving energy primarily in the $S_0$ mode in plates 11. Alternatively, transducer 13 may be a shear-mode device capable of launching or receiving primarily $A_0$ waves. In practice it is hard to generate only one mode, so one may expect that both lowest-order modes will be present. One or the other mode may be dominant, depending on the transducer 13 being compressional or shear. With two lowest-order modes, at any fd product below fd=2 MHz-mm, at least one mode will be dispersive to a detectable amount, i.e., measurably dispersive. By testing over a suitable range of frequency, one can verify attributes and verify steerable or other functions of the assembly even after final sealing.

Figure 20:
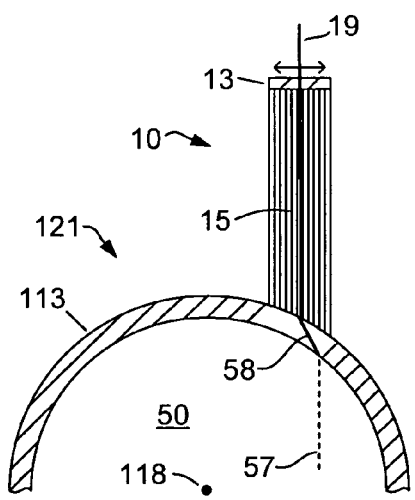
FIG. 20 is a section view of an apparatus mounted in a clamp-on configuration on a wall of a conduit, in accordance with an embodiment.

FIG. 10 can help explain a significant refraction advantage of $A_o$ over $S_o$ waves. Assume that the overall length of an apparatus 10 is limited because of space constraints or other factors. This length limit imposes limits on achievable time delays. Note in FIG. 10 that at an fd product near 0.25 MHz-mm, the group velocity of the $A_o$ wave is about half that of the $S_o$ wave. Refer also to FIGS. 20 and 17 which involve oblique incidence upon a wall 113 of a conduit 121 or on a fluid target 50, respectively. As a numerical example, we assume that: (1) the wall 113 in FIG. 20 is steel with longitudinal and shear velocities of 6 and 3 km/s, respectively; (2) $S_o$ and $A_o$ velocities are approximately 5 km/s and 2.5 km/s, respectively; (3) the fluid target 50 is water having a longitudinal velocity of 1.5 km/s; (4) the angle of incidence is 30 degrees. With these assumptions, and for a geometry similar to that of FIG. 20, if $S_o$ is the incident wave, then two waves are launched in the wall 113, and the maximum refracted angle in the water target 50 is 8.6 degrees. (Only regions in the target 50 close to the radiating distal end 22 are considered.) The two waves in the wall 113 may cause ambiguity in timing, due to confusion over which wave is the sought one. If the incident wave is the $A_o$ wave, however, the longitudinal wave in the wall 113 is cut off so that only one wave is launched in the wall 113, and the refracted angle in the water is 17.5 degrees, nearly double the angle achieved with the $S_o$ wave. Thus with the $A_o$ wave there is only one wave in the wall 113 and no confusion. A second example, having a geometry similar to that of FIG. 17, would use two $A_o$ mode apparatuses 10 configured symmetrically about their midpoint, and may take advantage of the slower $A_o$ incident velocity so that larger refracted angles are utilized. The larger angles may allow larger axial separation between the two $A_o$ apparatuses 10, and yield a larger time difference upstream minus downstream, in a contrapropagation flow measurement, compared to a system using two $S_o$ apparatuses 10. The net advantage may be a factor of two, or even larger in terms of accuracy if one takes into account both the larger time differences and the improved signal to noise ratio afforded by a single refracted wave in a wall 113 or larger separation, affording opportunities to attenuate pipe-borne crosstalk. This refraction advantage of $A_o$ over $S_o$ is probably best exhibited with plates 11 that are flat.

As depicted in the $A_0$ curve of FIG. 10, the group velocity for the $A_0$ mode is about 1400 m/s where fd is about 0.1 MHz-mm. For a frequency f=50 kHz, which is a useful frequency for ultrasonic measurements in gases and in other attenuating media, and for a plate thickness 25 equal to 1 mm, fd=0.05 MHz-mm. As depicted in FIG. 10 for steel, the magnitude of the slope of the $S_0$ mode is very small at low values of fd such as 0.1 MHz-mm or 0.05 MHz-mm, indicating low dispersion for the $S_0$ mode. Thus, to emphasize the $S_0$ mode rather than the $A_0$ mode, it may be appropriate to operate at values of fd which are less than or equal to about 0.1 MHz-mm. The $A_0$ mode at such fd values will exhibit dispersion, which may be appropriate for some purposes.

One aspect of the energy within a dispersed packet of a group of cycles that is not revealed by a dispersion graph such as FIG. 10 is the pattern of how cycles appear to move through the packet as the packet propagates. This aspect of dispersion leads to a technical problem for an apparatus 10 that comprises a plurality of plates 11. One needs to determine how to coordinate the corresponding peak amplitudes within dispersed groups of pulse packets, to achieve coherent radiation in particular directions. A simple numerical example may be used to explain the need for coherence. Consider two steel plates 11 that differ in thickness 25 but are otherwise identical. The first plate has a thickness 25 of 1 mm and is excited at 1 MHz. The second plate has a thickness 25 of 2 mm and is excited at 0.5 MHz. The fd products are the same, 1 MHz-mm, so the group velocity (approximately 5 km/sec) and the phase velocity (approximately 3 km/sec) will be the same in the two plates 11. Pulses launched simultaneously from the proximal ends 21 arrive simultaneously at the distal ends 22. But beyond the distal ends 22 in the target 50, the two emitted beams having two different frequencies sometimes combine constructively but at other times combine destructively, depending on the extent the pulsed energy radiated from each plate adds or subtracts in different directions at different times. For our present purposes we define two pulsed contributions to be temporally and/or spatially coherent if after one contribution is phase-reversed, the reversal causes cancellation of the other contribution to be at least 90 percent complete within a region in the target 50, the region extending away from the distal ends 22 for a distance equal to the length 23 of the longest plate 11.

Figure 12:
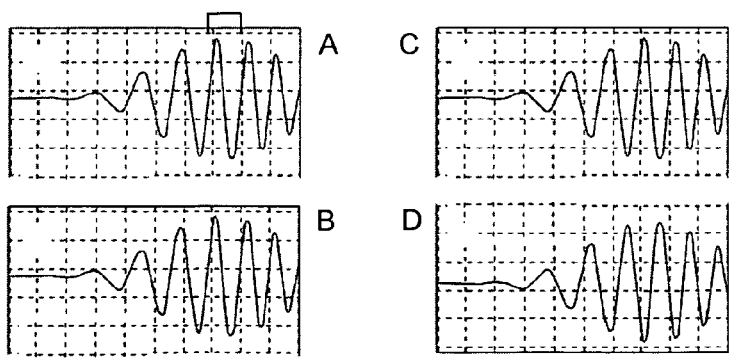
FIG. 12 depicts oscillogram traces for two pairs of dispersed waveform packets.

FIG. 12 depicts oscillogram traces for two pairs of dispersed waveform packets. In this example, each packet may be thought of as a Gaussian-enveloped group of ten cycles, about six cycles of which are included in FIG. 12. The cycles within this burst may have an average period of 1 microsecond, and for the purposes of this example one may assume a peak amplitude of 10 mV. Dispersion is indicated by the fact that in all four oscillogram traces, the early cycles are of longer duration than later cycles. In the first pair, packets A and B are congruent with respect to both their group envelope and the phase structure within each envelope. The sum of packets A and B would have a peak amplitude of 20 mV. The peak amplitude of the sum would be less than 20 mV if congruence were not exact. In the second pair, packets C and D appear to be nearly congruent with respect to their envelopes, but the phase structures are opposite or inverted, resulting in destructive interference. The peak amplitude of the sum of packets C and C would be zero.

Applicant recognizes that one measure of congruence at the radiating end (distal ends 22) is the amplitude of the echo from the radiating end as determined in a pulse-echo test. If the frequency f can be varied, then one can vary f in a feedback loop to maximize the composite end echo amplitude. The echo contains the group delay time information as well as the frequency information. For a plate 11 of known thickness 25, this pulse-echo test may also be used to verify the fd product and the corresponding group delay in an operating system. This method is easiest to implement if the proximal ends 21 and the distal ends 22 are aligned in two planes, each plane being normal to the longitudinal axis 52. If the apparatus 10 is chamfered as in FIG. 9, or if the plates 11 have unequal group delays by virtue of different materials or thicknesses, it may be necessary to introduce reference reflections as a way to gage the deviations from intended coordinated group delays up to a predetermined region within the waveguide assembly.

Another empirical solution to coordinating group delays within an apparatus 10 is described as follows. This solution relates radiation in a particular direction, for example in air at an angle of 5 degrees from longitudinal axis 52, measured when that angle is accessible for measurement, to a pulse-echo amplitude measurement for the apparatus 10. Note that a pulse-echo measurement may be part of a group delay compensation algorithm where the transit time t_target within a target is to be determined from a total elapsed time t_total minus plate delays t_plate according to an equation of the form: t_target=t_total−t_plate.

To maximize radiation in a particular direction, one strives to coordinate the delays such that both envelope and phase structure contributions from each of the plates 11 are congruent or nearly congruent in the direction of interest. If there were no dispersion, or if one were dealing with continuous waves, it would suffice to coordinate only the phase information of the energy transmitted into the target 50. However, with short pulse packets and dispersion, a further requirement emerges, namely, coordinating the envelopes of the delayed groups, as well as the phase structure. Taking into account that two sine waves of equal amplitude cancel each other only if they are exactly 180 deg out of phase, a design guide for the phases within pulse packets to be constructive is to require corresponding periods to be congruent to within one-quarter period and preferably to within one-tenth of a period. Congruence is to be obtained analytically or empirically in the direction of sought energy transmission, or at a datum within apparatus 10.

Timing the propagation of an enveloped pulse packet may utilize a center of energy method described by Bradshaw and Pedersen in U.S. Pat. No. 4,480,485, which is incorporated by reference herein. In one example, the pulse packet may be generated using a frequency f=1 MHz, and used with a plate 11 whose thickness 25 may be set to 1.0 mm, chosen midway between 0.75 and 1.25 mm so that the fd product lies midway between the limits of an fd product range of 0.75 to 1.25 MHz-mm.

Chirped transmission into a fluid or solid target 50 may be accomplished in three ways. (1) If the plates 11 are dispersive, excite them with a broadband pulse such as a negative-going spike. The spike may be described as a single transition pulse of magnitude perhaps 10V to 300V, followed by a relatively slow recovery to baseline. This process is analogous to a piano tuner striking a tuning fork. The resulting spectrum is mainly a function of the tuning fork material and geometry. In its electronic implementation, this method may be implemented using a simple driving network such as has been used in the ultrasonic NDT and flowmeter art. (2) If the plates 11 are not dispersive, excite them with an electrically-controlled chirp. In this case the electronic driving waveform determines the transmitted chirp spectrum. Signal processing typically employs spread spectrum techniques. (3) If the plates 11 are dispersive, excite them with an electrically controlled chirp that supplements the dispersion characteristic of the plates 11 to achieve a particular envelope of amplitude versus frequency transmission. It will be understood that these are examples of limiting cases. In practice, plates 11 may operate in a frequency band having little dispersion, and method (2) may be adapted to the situation.

For various steerable waveguide embodiments that are described herein, individual plates 11 within an apparatus 10 may have differential delays for acoustic energy propagated between the proximal ends 21 and the distal ends 22 of the plates 11, the differential delay being coordinated with the position within the linear array 15. The differential delays may be such that an acoustic beam radiates from a distal end 22 of the apparatus 10 along a beam axis 51 that is oblique to the longitudinal axis 52 of the apparatus 10. For example, FIG. 13 depicts an embodiment in which a beam axis 51 is oblique to longitudinal axis 52 at an angle 53. A differential delay means a difference in group delay between plates 11. Group delay means the travel time for the center portion of a pulse packet or wave packet to propagate between the proximal ends 21 and the distal ends 22 of a plate 11. Differential delays may be used in beam steering for both launching radiation into a target 50 and receiving acoustic energy from a target 50.

When differential delays are employed, the phase difference between pulse packets for adjacent plates 11 may be limited so that phase differences may be predetermined or analyzed without ambiguity. In one embodiment, the acoustic energy propagates as a pulse packet, the pulse packet having a largest amplitude cycle, and for at least 90 percent of the adjacent pairs of plates 11 the differential delay is less than or equal to one period for the largest amplitude cycle. In the pulse packet oscillogram waveform trace depicted in FIG. 12A, the period for the largest amplitude cycle is indicated by a bracket above the trace. The largest amplitude cycle is the cycle that includes the largest upward peak plus the largest downward peak, relative to the baseline of the trace. In one embodiment, if the frequency is 1 MHz, then the period for the largest amplitude cycle is about 1 microsecond, so the differential delay may be less than or equal to 1 microsecond. For example, the differential delay may be 0.2 microseconds (200 nanoseconds).

Differential delays (differences in group delays) may be achieved in two general ways. (1) Differential delays may be achieved by electronic control of timing, frequency, or mode of acoustic energy propagated within individual plates 11. Thus, a timing, frequency, or mode for the acoustic energy may differ among the plates 11 in coordination with the position within the linear array 15. (2) Differential delays may also be achieved through control of physical attributes of individual plates 11. Thus, the value for an attribute may differ among the plates 11 in coordination with the position within the linear array 15. Different values of an attribute for the plates 11 within a linear array 15 can cause differential delays in propagation of acoustic energy within individual plates 11. Attributes whose value may differ between plates 11 include length 23, thickness 25, density, composition, microstructure, and elastic moduli.

It is understood that trivial differential delays between plates 11 may arise from slight inconsistency in values of an attribute of the plates 11, the inconsistency resulting from failure to carefully match the values of an attribute for a linear array 15 of plates 11, or may arise from failure to carefully control the timing, frequency, or mode of acoustic signals for individual plates 11 within a linear array 15. If the elastic moduli of the material for the plates 11 are strong functions of temperature, then a temperature gradient across the linear array 15 or along the length 23 of the plates 11 may significantly perturb the intended differential delay. The differential delays that are of interest here are the differential delays that are large enough to have practical applications in beam steering or in beam focusing. For the steering applications of interest, the angle 53 between the beam axis 51 and the longitudinal axis 52 will include a range of values including angles 53 that are greater than or equal to 5 percent of a radian. As used in this description and in the appended claims, a statement that some aspect "differs among the plates 11 in coordination with the position within the linear array 15" means that the aspect of interest differs sufficiently between the plates 11 to result in an angle 53 that is greater than or equal to 5 percent of a radian.

The transit time in any plate 11, measured at proximal end 21 using an echo from distal end 22 or from a reflector near distal end 22, may be used in an adaptive manner to electronically compensate the delay in that plate 11 for unwanted deviations from an intended distribution of delays across the plural plates 11. Such unwanted deviations may be caused by temperature effects, aging, imperfections in attributes, or other factors that influence sound speed. In an embodiment that includes plural transducers 13, one may compensate for such deviations by shifting the frequency or timing for each plate 11 until the sought group and phase delays are obtained in each plate 11. Applicant calls this "adaptive electronic compensation."

FIG. 13 is a longitudinal cross-section view of an apparatus 10 comprising a plurality of plates 11 disposed in a linear array 15, a plurality of transducers 13, and an enclosure 12 comprising a sleeve 40 and means for sealing 44 that seals an end region 41, in accordance with an embodiment. In FIG. 13, the plane of section is perpendicular to array plane 19 and to the major faces 26. Linear array 15 is acoustically coupled to the plurality of transducers 13. In this embodiment, the proximal end 21 of each plate 11 is acoustically coupled to one of the plural transducers 13 through a segmented proximal coupling layer 45. Transducer array 105 includes a low impedance backing layer 104, transducers 13, and the segmented proximal coupling layer 45. End region 41 at the distal ends 22 is acoustically coupled to a target 50 through distal coupling layer 48. The embodiment of FIG. 13 includes twenty plates 11, two of which are individually labelled with reference numerals 11a and 11t. The twenty plates 11a-11t comprise a linear array 15, similar to the linear array 15 indicated by a reference numeral in other figures herein, and each of plates 11a-11t has a position within the linear array 15, plate 11a having the first position and plate 11t having the twentieth position.

In an alternative embodiment, the plurality of transducers 13 is a segmented transducer 13, and each plate 11 is excited by one segment of the segmented transducer 13. As used in this description and in the appended claims, a plurality of transducers 13 is equivalent to a segmented transducer 13. As is known in the art, a segmented transducer 13 may comprise, for example, a single piece of piezoelectric material with segmented electrodes, one excitation electrode per plate, or a piece of piezoelectric material with multiple cuts that do not extend through the entire thickness of the piece, the cuts creating segments within the piezoelectric material.

Beam steering using overlapping group pulse packets is possible when there are differences in group delays (differential delays) between the acoustic energy pulses that propagate in individual plates 11a-11t. Differences in group delays (differential delays) may be achieved through, for example, electronic control of timing of acoustic signals propagated within individual plates 11a-11t. Individual transducers 13 may be excited with controlled delays so that the timing of acoustic energy emitted by the transducers 13 differs among the transducers 13, resulting in differential delays. Beam steering using short pulses is achievable when the group pulse packets overlap. Refraction and beam steering are usually explained in terms of Snell's Law, phase velocity, and phase delays. Indeed, for dispersive systems and continuous waves, group velocity can be derived from phase velocity, as described in e.g. Joseph L. Rose, op. cit., pages 112-113. For short pulses rather than continuous waves, however, an explanation in terms of phase does not suffice unless the group pulse packets overlap sufficiently to cooperate in achieving beam steering.

For beam steering, it is not necessary that each plate 11 differ from each other plate 11 with respect to timing or some other aspect. Rather, at least one of the plates 11 needs to differ in timing from some other plates 11 in coordination with the position in the linear array 15. For example, plates 11a-11d could have one controlled delay, plates 11e-11h could have a second controlled delay, et cetera. As used in this description and in the appended claims, a statement that some aspect "differs among the plates 11" means that the aspect of interest is not identical in all of the plates 11, and this statement encompasses embodiments where subgroups of the plates 11 have the same value for the aspect of interest. The aspect that differs may be timing, frequency, or mode, or it may be a physical attribute of the plates 11, as described in connection with other Figures.

Acoustic energy propagates in plates 11a-11t. An acoustic wave 54 in target 50 may have a beam axis 51 that is oblique to longitudinal axis 52 at an angle 53, as depicted in FIG. 13. An oblique beam axis 51 can result if the timing of the acoustic energy differs among the plates 11 in coordination with the position within the linear array 15. The difference in timing creates differences in group delays (differential delays), so that wave 54 launches in target 50 at different times from individual plates 11. Thus, when apparatus 10 is transmitting or radiating, wave 54 launches earliest from plate 11a and wave 54 launches last from plate 11t. For differential delays resulting from differences in timing, individual transducers 13 are excited sequentially in time. In other words, excitations of individual transducers 13 are electronically delayed across the linear array 15 of plates 11.

In an alternative embodiment (not depicted), beam axis 51 is parallel to longitudinal axis 52 because there is no difference in group delay (differential delay) between the acoustic energy propagating in the individual plates 11a-11t. In this embodiment, each of plates 11a-11t is uniform in physical attributes such as thickness and composition, and the frequency, timing, and mode of acoustic energy is the same for each of plates 11a-11t. Wave 54 launches in target 50 simultaneously from each of distal ends 22, resulting in a wave 54 that is parallel to end region 41 and with a beam axis 51 that is parallel to longitudinal axis 52. This type of embodiment, with beam axis 51 parallel to longitudinal axis 52, may be achieved using an apparatus 10 with plural transducers 13 (as in FIG. 13) or with a single transducer 13 (as depicted in FIGS. 1-4).

In another embodiment (not depicted), differential delays may be used for beam focusing. Furthermore, beam focusing may be combined with beam steering for any embodiment. In one example of beam focusing, there is a mirror symmetrical gradient of group delay across linear array 15 with the earliest pulses in both the first and last positions within linear array 15. Thus, waves 54 radiate from plates 11a and 11t the earliest, and waves 54 radiate from plates 11j and 11k the slowest, so that the wavefront in target 50 is shaped like an arc, rather than a straight line wavefront as in FIG. 13.

Beam steering can also change over time. In the embodiment of FIG. 13, the timing of acoustic energy may change over time for individual plates 11*a*-1 it, resulting in a pattern of group delays that changes over time. The pattern of group delays that changes over time causes the beam axis 51 to rotate over time. In other words, angle 53 between beam axis 51 and longitudinal axis 52 changes over time, so that the beam is steered over time. Additionally, a beam axis 51 may be parallel to longitudinal axis 52 at some times and oblique to axis 52 at other times. Thus, where differential delays result from differences in timing, the timing for at least one of the plates 11 may vary over time, causing the beam angle 53 to vary over time.

Beam steering that can change over time may facilitate compensation for beam drift, which is an unintentional change in the angle 53 of beam axis 51. In a fluid target 50, beam drift may arise if the flow rate of the target 50 changes over time, because the acoustic wave is carried by the fluid target 50. Similarly, sound speed of a target 50 may change with time due to a change in temperature or pressure of the target 50, and the change in sound speed in target 50 may cause beam drift. Electronic control of frequency or timing may provide a way to maintain a particular beam angle 53, analogous to a pilot steering an airplane in response to crosswinds to maintain a desired course heading. Beam steering that changes with time based on varying the frequency over time is described after the discussion of FIG. 17.

Beam drift in an uncompensated system with a fluid target 50 would be expected to vary approximately in proportion to the Mach number. Refraction in an uncompensated system would be expected to vary as the sound speed c in the target medium changed. Even at constant flow velocity V, changes in the fluid sound speed introduce changes in Mach number because the Mach number=V/c. Fluid sound speed c changes in general due to changes in temperature, changes in composition, and large pressure changes. Beam drift, if not adequately compensated, may confound an otherwise effective means for ultrasonically measuring the flow velocity V of gas or steam flowing at a Mach number greater than 0.1.

Figure 14:
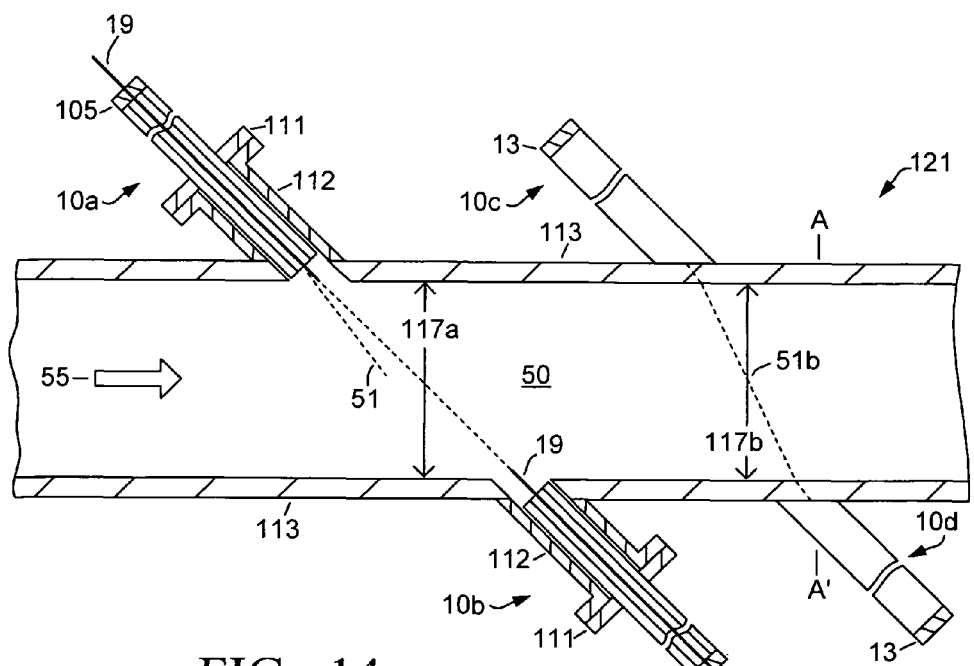
FIG. 14 is a section view of two pairs of apparatuses, the apparatuses of a pair being attached to opposite walls of a conduit that contains a target fluid.
Figure 38:
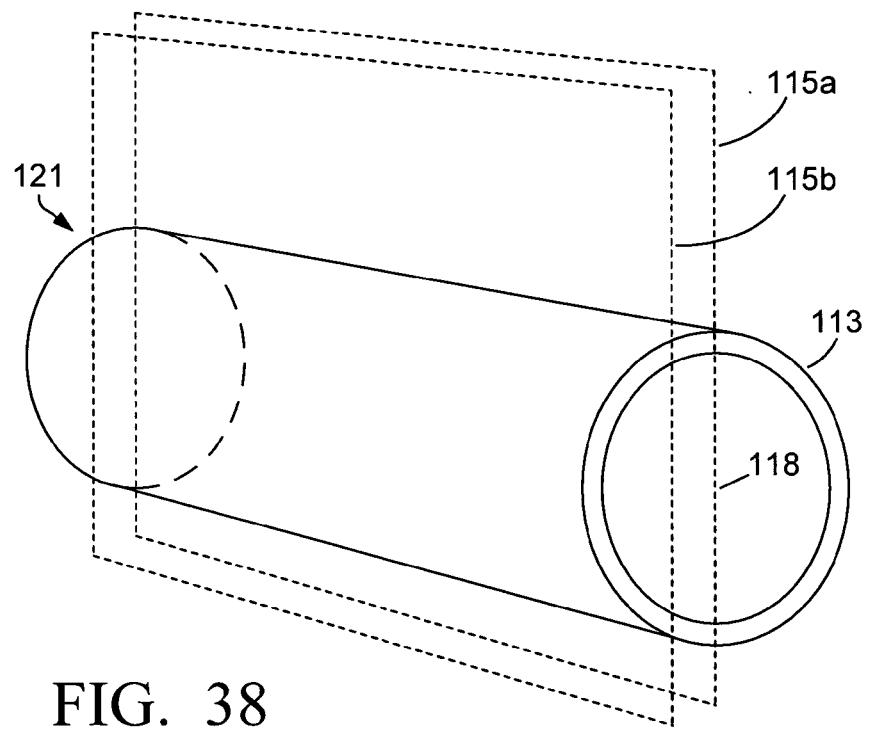
FIG. 38 is a perspective view of a conduit and two longitudinal planes for the conduit.

FIG. 14 is a section view of two pairs of apparatuses 10, the apparatuses 10 of a pair being attached to opposite regions of a wall 113 of a conduit 121 (e.g. a pipe) that contains a target 50 that is a fluid. Apparatuses 10*a* and 10*b* represent one embodiment, and apparatuses 10*c* and 10*d* represent another embodiment. Each apparatus 10 conveys acoustic energy between a transducer 13 (or transducer array 105) and the target 50, either directly through a port (hole) in wall 113 as in apparatuses 10*a* and 10*b*, or indirectly through wall 113 in a clamp-on configuration as in apparatuses 10*c* and 10*d*. In FIG. 14, the plane of section is a longitudinal plane 115 for conduit 121. FIG. 38 is a perspective view that depicts two longitudinal planes 115*a* and 115*b* for a conduit 121 similar to the conduit 121 of FIG. 14. Longitudinal plane 115*a* of FIG. 38 intersects the axial center 118 of conduit 121, whereas longitudinal plane 115*b* is offset from axial center 118. FIG. 39 is a cross-section view, taken along line A-A' of FIG. 14, of conduit 121 and linear array 15 and array plane 19 within apparatus 10*d* of FIG. 14. The plane of section for FIG. 14 is along the line B-B' of FIG. 39. The embodiments of FIG. 14 are examples of flowmeter applications.

The longitudinal plane 115 (the plane of section) for conduit 121 in FIG. 14 intersects linear array 15 within each of apparatuses 10*a*, 10*b*, 10*c*, and 10*d*. In FIG. 14, the plane of section is perpendicular to array plane 19 for apparatuses 10*a* and 10*b*, and the plane of section is parallel to array plane 19 for apparatuses 10*c* and 10*d*. Thus, longitudinal plane 115 for conduit 121 is substantially perpendicular to array plane 19 for apparatuses 10*a* and 10*b*, and longitudinal plane 115 for conduit 121 is substantially parallel to array plane 19 for apparatuses 10*c* and 10*d*. As used herein and in the appended claims, the term "conduit orientation" means the orientation of an array plane 19 relative to the longitudinal plane 115 that intersects linear array 15. In the embodiments of FIG. 14, the conduit orientation is substantially perpendicular for apparatuses 10*a*, 10*b*, and the conduit orientation is substantially parallel for apparatuses 10*c*, 10*d*.

The terms "substantially perpendicular" and "substantially parallel" refer to conduit orientations that need not be exactly perpendicular or exactly parallel. The maximum permitted deviation from exactly perpendicular or exactly parallel is expressed in radians and is a function of the array thickness 42 for linear array 15 and the inner dimension 117 of conduit 121. Array thickness 42 is depicted in FIG. 7. As used herein and in the appended claims, the terms "substantially perpendicular" and "substantially parallel" mean that the conduit orientation may deviate from exactly perpendicular or exactly parallel as follows: the deviation in radians is less than or equal to (1) or (2), whichever is greater, where (1) equals the array thickness 42 divided by the inner dimension 117 of conduit 121, and where (2) equals 0.1 radians. Inner dimension 117 of conduit 121 is measured along a line that lies within longitudinal plane 115, the line being perpendicular to a central axis of conduit 121, the line being taken in the segment of conduit 121 where one or more apparatuses 10 of an embodiment are mounted. For example, if conduit 121 is cylindrical, then inner dimension 117 is an internal diameter of conduit 121. In FIG. 14, inner dimension 117*a* is for the embodiment of apparatuses 10*a*, 10*b*, and inner dimension 117*b* is for the embodiment of apparatuses 10*c*, 10*d*.

Apparatuses 10*a*, 10*b* may be used for steering in the theta direction. In the flowmeter art, the theta direction is the direction that is parallel to the longitudinal axis of a conduit 121, whereas the phi direction is the circumferential direction of a conduit 121. Each apparatus 10*a*, 10*b* is secured within nozzle 112 at a port (hole) in wall 113 via a flange 111 that is attached to sleeve 40, as in the embodiment of FIG. 4. Each apparatus 10*a*, 10*b* includes a transducer array 105 comprising plural transducers 13, similar to the embodiment of FIG. 13. Fluid target 50 flows in a direction 55. Beam steering based on differential delays, described in connection with FIG. 13, may be used to keep beam axis 51 aligned between the apparatuses 10*a*, 10*b* over a period of time, in spite of changes over time in target 50. Beam axis 51 lies within or near the longitudinal plane 115 that intersects linear arrays 15 within apparatuses 10*a* and 10*b*. As noted previously, the conduit orientation of array plane 19 for apparatuses 10*a*, 10*b* is substantially perpendicular to longitudinal plane 115. This substantially perpendicular conduit orientation means that beam axis 51 may be steered in the theta direction. FIG. 17 depicts another embodiment that provides a beam that is steerable in the theta direction based on a substantially perpendicular conduit orientation, similar to the embodiment of apparatuses 10*a*, 10*b* in FIG. 14.

Apparatuses 10*c*, 10*d* may also be used for steering in the theta direction, but based on a different mechanism than that described in the previous paragraph for apparatuses 10*a*, 10*b*. Each apparatus 10*c*, 10*d* includes a transducer 13 and is mounted in a clamp-on configuration on wall 113. In the embodiment of apparatuses 10*c* and 10*d*, distal ends 22 of plates 11 are chamfered. Chamfering of distal ends 22 causes refraction at the interface between distal ends 22 and wall 113, as described by Snell's law. Refraction also occurs at the interface of wall 113 and target 50. A change in frequency of acoustic energy causes changes in sound speed within plates 11, wall 113, and target 50, resulting in changes in the angles of refraction at the interfaces. Thus, changing frequency enables changing the direction of the beam axis 51b. As noted previously, the conduit orientation of array plane 19 for apparatuses 10c, 10d is substantially parallel to longitudinal plane 115. Beam axis 51b lies within or near the longitudinal plane 115 that intersects linear arrays 15 within apparatuses 10a and 10b. The substantially parallel conduit orientation combined with chamfering at distal ends 22 enables steering of beam axis 51 in the theta direction.

Figure 21:
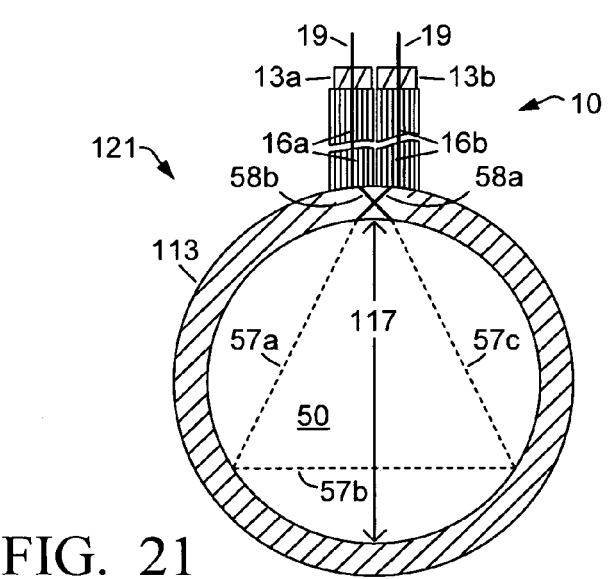
FIG. 21 is a section view of an apparatus comprising two subarrays, each subarray comprising a plurality of plates disposed in a linear array, the apparatus being mounted on a wall of a conduit.

FIGS. 20 and 21 depict other embodiments having substantially parallel conduit orientations. A substantially perpendicular or substantially parallel conduit orientation may be used with a longitudinal plane 115 that is offset from axial center 118 of conduit 121, similar to longitudinal plane 115b of FIG. 38. FIG. 20 depicts an apparatus 10 whose linear array 15 is intersected by a longitudinal plane 115 (not labelled) that is offset from axial center 118 of conduit 121; the conduit orientation is substantially parallel for the embodiment of FIG. 20. In other embodiments, a pair of apparatuses 10 having a substantially perpendicular or substantially parallel conduit orientation may be mounted on opposite walls 113 of a conduit 121 for operation with a beam that is parallel to inner dimension 117. For some conduit applications, grating lobes may not be an issue, so the spacing of plates 11 may be relatively large. In one embodiment, for at least 70 percent of the adjacent pairs a distance between the first major face and the second major face is less than or equal to one-half of the inner dimension 117 for the conduit 121.

In the embodiments depicted in FIG. 14, the apparatuses 10 of a pair are mounted on opposite walls 113 of conduit 121. In other embodiments, a pair of apparatuses 10 may be mounted on the same wall 113 of conduit 121, as in the embodiments of FIGS. 17 and 21. Mounting on the same wall 113 may be more convenient because it does not require access to opposite sides of conduit 121. The walls 113 depicted in FIG. 14 may be walls 113 of a spoolpiece of a type known in the art. Each apparatus 10c, 10d may be secured to wall 113 using clamp-on means that do not penetrate wall 113, as is known in the art. For example, sleeve 40 of apparatus 10c, 10d may have serrations near distal end 22 so that a serrated strap engages the serrations and clamps apparatus 10 firmly against wall 113. In another example, a triangular vane may be bonded to sleeve 40, the vane supporting apparatus 10 at a fixed angle relative to wall 113, with fastener means or a strap securing the vane and apparatus 10 against wall 113. Other clamping means are available from United California Corp., 12200 Woodruff Avenue, Downey, Calif. 90241. The mounting means are independent of conduit orientation: in other embodiments, an apparatus 10 having a parallel conduit orientation may be mounted at a port (hole) in wall 113, or an apparatus 10 having a perpendicular conduit orientation may be mounted using clamp-on means and no port (hole) in wall 113. Apparatus 10 may be installed into a port (hole) in a wall 113 using other sealable connections known in the art, such as standard pipe threads, instead of a connection using a flange 111.

As described in connection with FIG. 1, each plate 11 has a distal plane 114 that is defined with respect to a distal segment 29 of the plate 11. FIG. 39 is a cross-section view, taken along line A-A' of FIG. 14, of conduit 121 and linear array 15 and array plane 19 within apparatus 10d of FIG. 14. In the embodiment of FIG. 39, linear array 15 includes six plates 11a-11f. FIG. 39 depicts two distal planes 114a and 114f which are for plates 11a and 11f, respectively. For clarity, distal planes 114b-114e are not depicted. Each distal plane 114a-114f intersects a region 127. Region dimension 128 for region 127 is less than or equal to ten percent of inner dimension 117 for conduit 121. In the embodiment of FIG. 39, region 127 includes axial center 118 for conduit 121, axial center 118 being one example of a central position for conduit 121. A central position for conduit 121 is the midpoint of the line on which inner dimension 117 is measured. FIG. 40 depicts another embodiment which is very similar to that of FIG. 39. In the embodiment of FIG. 40, region 127 that distal planes 114a-114f intersect includes an inner surface 119 of an opposite wall 113 for the conduit 121. As is evident from FIGS. 39 and 40, distal planes 114a-114f are not parallel to one another, but instead are slightly angled relative to one another so that distal planes 114a-114f intersect a chosen region 127 that includes either a central position for conduit 121 or inner surface 119 of opposite wall 113.

In the embodiment of FIG. 39, each distal plane 114 is normal to wall 113, which means that there is no refraction in the phi direction at the interface between distal ends 22 and wall 113. In the flowmeter art, the phi direction is the circumferential direction of a conduit 121. If the frequency changes, or if there is a change in sound speed within fluid target 50 caused by e.g. a change in temperature of fluid target 50, the absence of refraction in the phi direction means that the beam angle in the phi direction is unchanged within fluid target 50. In order that distal planes 114 intersect a chosen region 127, plates 11 should be angled correctly within linear array 15. Furthermore, the correct angles for plates 11 will differ depending upon the spacing of distal ends 22 and the magnitude of inner dimension 117, which depends upon the size of conduit 121. To adjust the angles of plates 11, one may use a mechanism that is similar in principle to a sine bar.

As described in connection with FIG. 14, the apparatus 10c, 10d embodiment uses a substantially parallel conduit orientation combined with chamfered distal ends 22 for steering in the theta direction. In another type of embodiment, a substantially parallel conduit orientation may be combined with differential delays for steering in the phi direction. In one embodiment, a single apparatus 10 serves for both radiating and receiving, with reflection off an inner surface 119 of an opposite wall 113, and with differential delays between plates 11 to steer a beam in the phi direction. In this single apparatus 10 embodiment, each distal plane 114 is aligned with a radius of conduit 121, as in the embodiment of FIG. 39, so that the reflected beam will be aimed at the single apparatus 10.

In other embodiments that employ steering in the phi direction, two apparatuses 10 may be spaced apart on a circumference of wall 113 of conduit 121, in either an opposite side or side by side configuration. FIGS. 20 and 21 depict other embodiments having substantially parallel conduit orientations. In the side by side configuration as in FIG. 21, the two apparatuses 10 are spaced apart by less than half of the circumference, and reflection off an inner surface 119 of wall 113 directs the beam to the receiving apparatus 10. For each apparatus 10, differential delays between plates 11 may be used to steer the beam in the phi direction. In an opposite side configuration as in FIG. 20, the two apparatuses 10 may be intersected by a single longitudinal plane 115, the conduit orientation for each array plane 19 being substantially parallel for each apparatus 10. In the embodiment of FIG. 20, the second apparatus 10 is not depicted but is mounted at the opposite wall 113 where path 57 intersects wall 113. In a side by side configuration as in FIG. 21, separate longitudinal planes 115 intersect the two linear arrays 15 for the two apparatuses 10, and the conduit orientation for each array plane 19 is substantially parallel to its respective longitudinal plane 115. Note that this embodiment differs from the 10c, 10d embodiment of FIG. 14, where the two apparatuses 10c, 10d are spaced apart along the length, not the circumference, of conduit 121 and where both apparatuses 10c, 10d are intersected by a single longitudinal plane 115.

A distal coupling layer 48, similar to that depicted in FIG. 13, may be used with many of the embodiments described herein, as is known in the art. The characteristic acoustic impedance of distal coupling layer 48 may be intermediate between the impedance of the plates 11 and the impedance of the target 50. Distal coupling layer 48 may be very thin, with a thickness that is about 1 percent of the wavelength in the distal coupling layer 48. If the target 50 is a fluid such as air or another gas, distal coupling layer 48 preferably may have a characteristic acoustic impedance as close as practical to the geometric mean of the impedances of the plates 11 and the target 50, and a thickness equal to one-quarter wavelength in distal coupling layer 48. Low-density nanofoam materials are among the examples of matching materials known in the art for impedance matching from solids to gases such as air. For dry pressure acoustical coupling to a target 50 that is solid, the distal coupling layer 48, if utilized, may be a resilient sheet of rubbery material such as silicone or polyurethane, and its thickness in that case may be a half wavelength. A distal coupling layer 48 may be segmented, with one segment for each plate 11, and the segments may be added to apparatus 10 after sealing of end region 41. The radiating end surface (distal ends 22 or end region 41 located at distal ends 22) may be entirely planar, piecewise planar, or entirely or piecewise curved to match the internal or external surface contour of the target 50.

When acoustic pulses propagate in individual plates 11 with differential delays, the thickness of end region 41 should be small compared to the wavelength in end region 41. For example, the thickness of end region 41 may be less than about one-tenth of a wavelength in end region 41. A thin end region 41 located at distal ends 22 retains the intended differential delay in launching of waves into target 50 and also in receiving of waves from target 50. The same considerations about thickness apply if an end region 41 is included at proximal ends 21. Thicker end region(s) 41 may be required for operation at high pressure or for other reasons, however, in which case some compromise of acoustic performance may result.

When it is desired to radiate straight ahead with beam axis 51 parallel to longitudinal axis 52 or to receive incoming energy from that direction, the thickness of the end region 41 may be thin compared to wavelength or it may be as thick as or thicker than the wavelength in end region 41. One practical guideline for straight forward radiation (launching or reception) is to make the end region 41 approximately as thick as the wall thickness of sleeve 40. In some cases it will be appropriate to make the thickness of the end region 41 equal to an integer multiple of a half wavelength in end region 41. One may think of the relatively thin or relatively thick end region 41 in these situations as acoustically operating approximately as a piston source or piston receiver, preserving the relative time or phase delays of groups of pulse packets, while at the same time mechanically acting as a sealed, leak-tight pressure barrier. In general, acoustic performance is better if end region 41 is thin compared to wavelength rather than a half wavelength or thicker.

Differential delays may be achieved through control of physical attributes of individual plates 11. For beam steering, it is not necessary that each plate 11 differ from each other plate 11 with respect to an attribute. Rather, at least one of the plates 11 needs to differ from some other plates 11 with respect to the value of an attribute in coordination with the position in the linear array 15. For example, for an a linear array 15 of twenty plates 11a-11t, plates 11a-11d could have one value for an attribute, plates 11e-11h could have a second value for the attribute, et cetera. As used in this description and in the appended claims, a statement that some aspect "differs among the plates 11" means that the aspect of interest is not identical in all of the plates 11, and this statement encompasses embodiments where subgroups of the plates 11 have the same value for the aspect of interest. The aspect that differs may be timing, frequency, or mode, or it may be a physical attribute of the plates 11. More than one attribute may vary within a set of plates 11.

Differential delays resulting from controlled variations in elastic properties of individual plates 11 may be achieved using plate materials having different values for attributes such as density, composition, microstructure, or elastic moduli. Differences in density may be achieved using, for example, differing materials in individual plates 11. Differences in composition may be achieved using, for example, different alloys in individual plates 11. Differences in microstructure may be achieved using, for example, differing extents of heat treatment or metal working in the materials for different plates 11. Elastic moduli include Young's modulus and shear modulus, and these moduli are a function of density, composition, and microstructure.

For Lamb wave propagation, the density of the material from which a plate 11 is made may range from approximately 2 $g/cm^3$ if made of fused silica to about 20 $g/cm^3$ if made of iridium. More commonly, the plate 11 may be made of a metal such as aluminum, titanium or steel, for which the densities are approximately 2.7, 4.5 and 8 $g/cm^3$, respectively. To generate a linear array 15 of plates 11 having small predetermined density differences, the plates 11 may be made from a series of neighboring alloys having small differences in density according to the principal alloy ingredients. As an example, commercially pure titanium has a density of 4.52 $g/cm^3$ while the alloy known as Ti 64, which is primarily titanium plus 6 percent aluminum and 4 percent vanadium, has a density of 4.43 $g/cm^3$, which is slightly lower than the density of pure titanium. By varying the percents of aluminum and vanadium a range of densities may be obtained.

Figure 36:
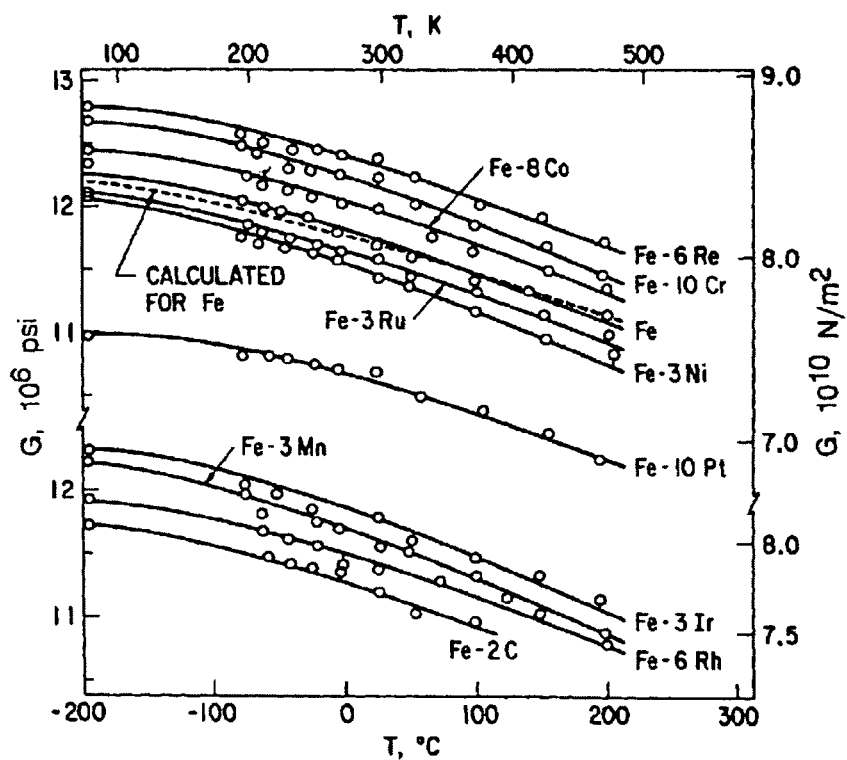
FIG. 36 is a prior art graph that depicts Young's modulus for a series of ferrous alloys at a range of temperatures.
Figure 37:
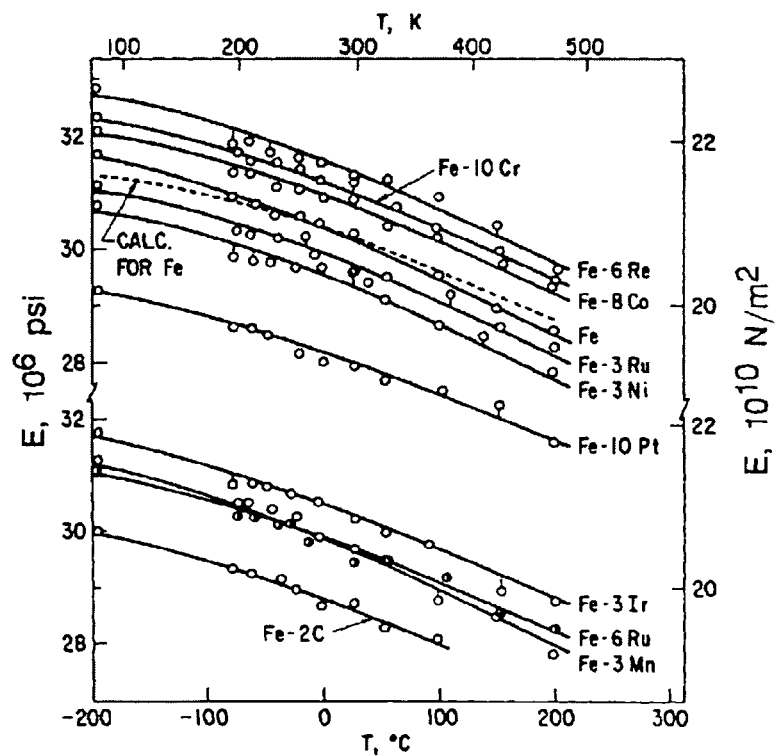
FIG. 37 is a prior art graph that depicts shear modulus for a series of ferrous alloys at a range of temperatures.

FIG. 36 is a prior art graph that depicts Young's modulus for a series of ferrous alloys at a range of temperatures. For the series of alloys represented in FIG. 36, Fe-2C has the smallest Young's modulus and Fe-6Re has the largest Young's modulus. Similarly, FIG. 37 is a prior art graph that depicts shear modulus for a series of ferrous alloys at a range of temperatures. The graphs of FIGS. 36 and 37 are adapted from a journal article by Speich, G. R., Schwoeble, A. J., and Leslie, W. C., "Elastic Constants of Binary Iron-Based Alloys", Metallurgical and Materials Transactions B, Vol. 3, Number 8, pages 2031-2037, August 1972, Springer Boston. Table 1 indicates Young's modulus for a series of silicon nitride ($Si_3N_4$) composites that include different volume percents of TiC. Young's modulus increases as the volume percent of TiC increases. Table 1 is adapted from a book entitled "Ultrasonic Measurements for Process Control" by Lawrence C. Lynnworth, Table 8-2, page 540, Academic Press, 1989. From elastic moduli and density one can compute the longitudinal and shear velocities, as described on page 224 of the cited book by Lynnworth; page 224 is incorporated by reference herein. In turn, from these bulk velocities, one can calculate the phase and group velocity dispersion curves for plates, as described on page 110 of the cited book by Rose; page 110 is incorporated by reference herein.

TABLE 1

| Material | Young's modulus (10^6 psi) |
| --- | --- |
| $Si_3N_4$ + 10 v/o TiC | 43.75 |
| $Si_3N_4$ + 20 v/o TiC | 45.91 |
| $Si_3N_4$ + 30 v/o TiC | 47.88 |

Differential delays may also be achieved through control of other physical attributes such as thickness 25 and length 23 of individual plates 11. Variation in thickness 25 is described in connection with FIGS. 15-17, and variation in length 23 is described in connection with FIGS. 18-19. FIG. 15 is a cross-section view of an apparatus 10, with the plane of section perpendicular to the longitudinal axis 52 of the apparatus 10, in which the value for the thickness 25 differs among the plates 11 in coordination with the position of the plate 11 within the linear array 15, in accordance with an embodiment. FIG. 16 is a longitudinal cross-section view of a portion of the embodiment of FIG. 15 near the distal ends 22 of the plates. In FIG. 16, the plane of section is perpendicular to the major faces 26. The apparatus 10 of FIGS. 15-16 comprises a transducer 13 (not depicted), which may be a single transducer 13, as in the embodiment of FIGS. 1-4, or plural transducers 13, as in the embodiment of FIG. 13. For clarity, cross-hatching of plates 11 is omitted from many Figures having very small or thin plates 11, including FIGS. 15, 16, 17, 20, 21, 22, 23, and 27.

In the embodiment of FIGS. 15 and 16, the value for thickness 25 increases monotonically from top to bottom of the linear array 15 of plates 11. As described in connection with FIG. 10, sound velocity in plates 11 is a function of thickness 25 and also frequency. If the plates 11 are identical in other physical attributes, then a gradient of thickness 25 is a way of generating a gradient in group velocity across the linear array 15. The gradient in group velocity results in a pattern of group delays that causes the acoustic energy to radiate along a beam axis 51 that is oblique to a longitudinal axis 52 of the apparatus 10.

Both the direction of rotation and the angle 53 of the beam axis 51 depend upon the mode of the acoustic energy and the fd product range. As depicted in FIG. 10, as the fd product increases from zero to about 1.0 MHz-mm, the group velocity for the $S_0$ mode decreases and the group velocity for the $A_0$ mode increases. If frequency is the same for each plate 11, then group velocity for the embodiment of FIG. 15-16 is fastest in the top (thinnest) plate 11 for the $S_0$ mode and group velocity is fastest in the bottom (thickest) plate 11 for the $A_0$ mode. Thus beam axis 51A for the $A_0$ mode is rotated upwards from longitudinal axis 52 and beam axis 51S for the $S_0$ mode is rotated downwards. For other ranges of fd product, the velocity dependence is different. For example, for the fd product range between about 1.0 and 2.0 MHz-mm, the group velocity for the $A_0$ mode is nearly constant and then decreases gradually. The decrease is seen more clearly in FIG. 11.

FIG. 17 is a section view of two apparatuses 10a, 10b mounted in nozzles 112 attached at ports in a wall 113 of a conduit 121 that contains a target 50 that is a fluid, in accordance with an embodiment. The fluid target 50 may be stationary or may be, as depicted in FIG. 17, flowing in a direction 55. Each apparatus 10a, 10b comprises a linear array 15 of plates 11 with a gradient in thickness 25, similar to the embodiment of FIGS. 15-16. In each linear array 15, the plates 11 are thinnest at the left and thickest at the right. In apparatus 10a, transducer 13S vibrating in the compressional mode excites primarily the $S_0$ mode, indicated by the vertical double-headed arrow. In apparatus 10b, transducer 13A vibrating in the shear mode excites primarily the $A_0$ mode, indicated by the horizontal double-headed arrow. In FIG. 17, the plane of section is perpendicular to array plane 19 for apparatuses 10a and 10b. In FIG. 17, the plane of section is a longitudinal plane 115 for conduit 121. Thus, a longitudinal plane 115 for conduit 121 is perpendicular to array plane 19 for apparatuses 10a and 10b. The longitudinal plane 115 for conduit 121 in FIG. 17 intersects linear array 15 within each of apparatuses 10a and 10b.

Waves are launched controllably either downstream or upstream using a radiating face (end region 41 as in FIG. 16) that is flush with the interior surface of wall 113. Apparatus 10a launches radiation diagonally and in a downstream direction relative to the direction 55 of flow. The radiation from apparatus 10a is directed along a first segment of path 57. Apparatus 10b launches radiation diagonally and in an upstream direction relative to the direction 55 of flow. The radiation from apparatus 10b is directed along a second segment of path 57. The spacing between apparatuses 10a and 10b is chosen relative to the diameter of the conduit 121 so that path 57 is a vee path whose inner vertex coincides with the interior surface of the wall 113 that is opposite nozzles 112. The embodiment of FIG. 17 is suitable for flow velocity measurements by contrapropagation using vee path 57. The lengths of plates 11 for apparatus 10a ($S_0$ mode) and for apparatus 10b ($A_0$ mode) may be adjusted to achieve comparable group delay gradients and comparable beam angles 53 so that the vee path 57 is symmetrical about its vertex, ensuring strong signals along the vee path 57. Recall from FIG. 10 that at fd products where only the two lowest-order modes exist, the $S_0$ mode has a higher group velocity than the $A_0$ mode.

FIG. 17 illustrates how the same passive mechanical plates 11 may yield opposite results according to the principal vibration mode of the transducer 13 and the manner of excitation, i.e. frequency sufficiently low to launch only the lowest-order modes. The symmetric mode transducer 13S may also launch some energy in the straight forward direction along its longitudinal axis 52 and later receive an echo from the opposite wall 113. This straight forward path is orthogonal to the pipe axis. This pulse-echo measurement may yield a value for sound speed $c_3$ in the fluid target 50, which value may be compared with the value obtained from the average of the transit times over the vee path 57, as is known in the art for measuring flow velocity by the contrapropagation method. The amplitude of the orthogonal-path echo by itself or after comparing with the through-transmitted amplitude over the vee path 57 may yield the acoustic impedance Z of the fluid target 50, which may be e.g. steam, and together with $c_3$ and other data may yield the steam density or quality. Steam density or quality, when combined with velocity, and taking the pipe area and flow profile into account, may yield the steam mass flow rate.

The section of conduit 121 depicted in FIG. 17 may be part of a long pipe or part of a short spoolpiece. Orthogonal nozzles 112 as depicted in FIG. 17 generally are simpler to fabricate than oblique nozzles 112, and may contribute to achieving a short spoolpiece, especially if the transducers 13 can be threaded into the nozzles 112 instead of using flanges 111 of outside diameter several times larger than the nozzle 112 diameter. The orthogonal positioning of apparatuses 10a, 10b, with radiating faces flush with the interior wall 113 of the conduit 121, minimizes flow disturbances in the ports. With $A_0$ radiators, there may be reasons to use an oblique port. In this case, the linear array 15 of plates 11 would be chamfered to be flush with the interior of wall 113 to minimize disturbance to the flow.

In an alternative embodiment (not depicted), both transducers 13 operate in the same mode and the gradient of thickness 25 for one apparatus 10 is a mirror image of the gradient for the other apparatus 10. Relative to a midplane between the two apparatuses 10, the slowest velocity plates 11 are nearest to the midplane and the fastest velocity plates 11 are farthest from the midplane. If the operating mode is the $S_0$ mode, then the thickest (slowest velocity) plates 11 will be nearest to the midplane. If the operating mode is the $A_0$ mode then the thinnest (slowest velocity) plates 11 will be nearest to the midplane.

The discussion in connection with FIGS. 15-17 applies when the combination of the interface, the mode, and the target 50 support the radiation. As known in the art, all media support longitudinal bulk waves, but only solids and viscous fluids support shear waves. Similarly, an incident $S_0$ wave will radiate effectively into any target 50 medium (solid, liquid or gas), but an $A_0$ wave at normal incidence from a plate 11 might not launch compressional waves of adequate intensity in inviscid target 50 media. At oblique incidence, however, the $A_0$ wave can launch compressional waves of adequate intensity in inviscid fluid media such as air or water. This launching at oblique incidence is analogous to the mode conversion of obliquely incident shear waves to longitudinal waves in low-viscosity (inviscid) fluids. For an apparatus 10 that is intended to launch, from asymmetric (e.g. $A_0$) waves, mode converted compressional waves in a non-viscous fluid target 50, the distal end region may need to be slightly chamfered, or individual plates 11 may need to be chamfered.

Another approach to launching $A_0$ waves in a low-viscosity target 50 is to utilize the end region 41 as an intermediate member in which $A_0$ waves are launched parallel to the surface of the end region 41. If the $A_0$ pulse arrives with differential delays at different regions of end region 41, then a second $A_0$ wave can be launched in end region 41. If the phase velocity of that second $A_0$ wave is greater than the longitudinal velocity in the fluid target 50, which may be an inviscid fluid, a longitudinal wave will be radiated at an angle according to Snell's Law. In effect, end region 41 serves as a mode converter so that $A_0$ pulses radiate into a fluid target 50 which may be an inviscid fluid. Mode conversion through a wall 113, resulting in propagation of $A_0$ Lamb waves into a fluid target 50, is described in U.S. Pat. No. 4,838,127 issued in 1989 to Herremans et. al. which is incorporated by reference herein. If the fluid target 50 has shear rigidity, as a polymer may have as it cures to a solid, the end region 41 may still be appropriate but it may be necessary to vary the $A_0$ delays in the plates 11 to compensate for changing sound speed in the target 50 medium as it cures.

In other embodiments, physical attribute control of differential delays may be combined with electronic control of differential delays. For example, differential delays that enable beam steering may result from the combination of differences in the value for an attribute, as described in connection with FIGS. 15-17, together with differences in timing or mode among the plates 11. In such embodiments (not depicted), apparatus 10 comprises plural transducers 13 and plural plates 11 that differ in value for an attribute, and a timing or a mode differs among the plates 11 in coordination with the position within the linear array 15. Differential delays that result from differences in timing are described in connection with the embodiment of FIG. 13 that includes plural transducers 13.

Differential delays that result from differences in mode may result when individual transducers 13 excite plates 11 in different modes. As described in connection with FIG. 17, the direction of rotation and the angle 53 of the beam axis 51 depend upon the mode of the acoustic energy and the fd product range. In one embodiment that uses mode differences for steering, the plurality of transducers 13 comprises first and second tranducers 13$a$ and 13$b$ that excite different modes, similar to transducers 13A and 13S in the embodiment of FIG. 17. In such an embodiment (not depicted), the apparatus 10 comprises two subarrays 16$a$ and 16$b$ similar to the subarrays 16$a$, 16$b$ depicted in FIG. 21. Each subarray 16$a$, 16$b$ comprises a plurality of plates 11 disposed in a linear array 15. Within each linear array 15, the value for an attribute such as density differs among the plates 11 in coordination with the position within linear array 15. For example, the value for an attribute such as density could decrease from left to right in subarray 16$a$ and increase from left to right in subarray 16$b$, resulting in a mirror gradient of density across the subarrays 16$a$, 16$b$. In the embodiment of FIG. 21, transducer 13$a$ is a shared transducer 13 for subarray 16$a$, and transducer 13$b$ is a shared transducer 13 for subarray 16$b$. Transducers 13$a$ and 13$b$ may excite different modes, as in the embodiment of FIG. 17. The combination of a gradient in an attribute for each subarray 16$a$, 16$b$ and a different mode of excitation for the plates 11 in each subarray 16$a$, 16$b$ results in differential delays for acoustic energy in the two subarrays 16$a$, 16$b$. In an alternative embodiment, transducers 13$a$ and 13$b$ may excite the same mode, as described in connection with the embodiment of FIG. 21.

In other embodiments where the value for an attribute differs among the plates 11, beam steering can change over time. Beam steering that can change over time may enable compensation for beam drift, as described in connection with FIG. 13. In such embodiments, apparatus 10 may comprise either a single transducer 13 or plural transducers 13, and plural plates 11 that differ in value for an attribute, and a frequency or a timing or a mode varies over time. In an embodiment based on varying the timing, apparatus 10 includes plural transducers 13 with timing that changes over time, as described in connection with FIG. 13. In an embodiment based on varying the frequency, apparatus 10 comprises a linear array 15 of plates 11 that differ in value for an attribute such as thickness 25, acoustically coupled to a single transducer 13 or plural transducers 13. If electronic control is used to sweep frequency for the transducer(s) 13, beam steering that changes with time may be achieved. If plural transducers 13 are used, the frequency is the same for all transducers 13 at any time, so that the pulses are coherent for all transducers 13. As described in connection with FIGS. 10 and 11, the group velocity of Lamb waves is a function of frequency and also thickness 25. A smaller group velocity causes a longer transit time for Lamb waves propagating between proximal ends 21 and distal ends 22, resulting in a differential delay. For beam steering based on changes in frequency, the fd products for the plates 11 must be in the dispersive range for the mode of interest. If frequency is hopped or swept, the beam angle 53 changes with time because the fd product changes over time for each plate 11 according to the thickness 25 for the plate 11 and the frequency.

In another embodiment, changing the mode can be used to change the beam angle 53 over time. As indicated in FIG. 10 for steel, group velocities for individual modes are unequal except at a few values of fd product. For example, at fd products less than about 2 MHz-mm, the $S_0$ group velocity is greater than the $A_0$ group velocity. Therefore switching from one mode to the other changes the group velocity of acoustic energy propagated in a plate 11. If the plates 11 in a linear array 15 differ in one or more attributes, then group velocities may differ between plates 11, resulting in differential delays. For a beam axis 51 that is oblique because of differing values for attributes, changing the mode can cause the beam angle 53 to change. By first exciting one mode (eg the $S_0$ mode) and then exciting another mode (eg the $A_0$ mode), one can change the group velocity and the differential delay for each plate 11 in the linear array 15 and hence change the beam angle 53.

To enable changing the mode over time, a pair of bonded transducers 13 may be used with only one transducer 13 of the pair excited at a given time. As noted in connection with FIGS. 1-4, a transducer 13 may be a pair of transducers 13 bonded together at a single location, e.g. one behind the other at the proximal end of a plate 11. One of the bonded transducers 13 introduces primarily a longitudinal stress that excites symmetric modes such as $S_0$, and the other transducer 13 introduces primarily a shear stress that excites asymmetric modes such as $A_0$. Using a pair of transducers that introduce different stresses, both $S_0$ and $A_0$ modes may be launched. Alternatively, different stresses may be introduced by using a single transducer 13 and choosing a crystal cut that provides stresses normal to the direction of the midplane and also along the midplane in an axial direction. Using a single transducer 13 having this crystal cut, both $S_0$ and $A_0$ modes may be launched by one transducer 13. Generally speaking, the type of mode or modes launched is often considered to be mainly a function of the transducer 13, it being understood that no mode is launched until the transducer 13 is excited electrically. Again, by choosing the frequency appropriately, one can control the symmetric or antisymmetric mode to be lowest order (as in the present invention, $S_0$ and $A_0$ modes) or for other purposes, emphasize or include higher order modes.

According to FIG. 10 for steel, if it is desired to operate both modes $S_0$ and $A_0$ with small dispersion, simultaneously or sequentially, this can be accomplished by exciting the $S_0$ mode at 0.5 MHz-mm and $A_0$ at 1.5 MHz-mm. This minimizes any compromise in performance that may result from choosing a single frequency for both modes. Conversely, if it is desired to generate in steel plates 11 sufficient dispersion as may be needed for a chirp generated using a spike electrical excitation, then the $S_0$ mode may be excited at 1.5 MHz-mm and the $A_0$ at 0.5 MHz-mm. Emphasizing either dispersive characteristics versus nearly nondispersive characteristics is achieved by combining mode switching and frequency hopping, in this example. If thickness 25 equals 1 mm, then the frequency f would be hopped (switched) between 0.5 and 1.5 MHz, to electrically excite the appropriate transducer (longitudinal- or shear-stress producer for $S_0$ or $A_0$, respectively) according to the objectives in this numerical example. As noted with respect to FIG. 10, dispersion curves for other plate 11 materials, such as aluminum and glass, are similar to those for steel. The use of separate values of fd for separate modes such as $A_0$ and $S_0$ may be applied to other elastic engineering materials, and particularly to engineering materials, such as metals and glass, in which the longitudinal velocity is approximately 6 km/s and the shear velocity is approximately 3 km/s.

Figure 18:
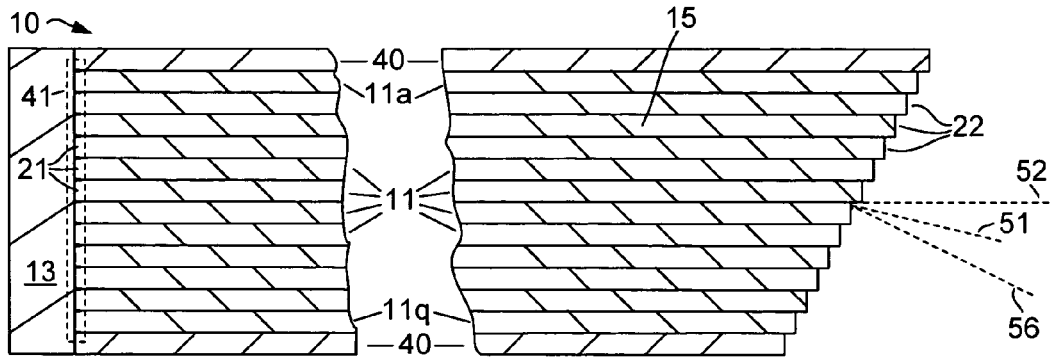
FIG. 18 is a longitudinal cross-section view of an apparatus comprising a plurality of plates disposed in a linear array, an enclosure comprising a sleeve and means for sealing that seals an end region, and a transducer, in which the length differs among the plates in coordination with the position of the plate within the linear array.

FIG. 18 is a longitudinal cross-section view of an apparatus 10 comprising a plurality of plates 11 disposed in a linear array 15, an enclosure 12 comprising a sleeve 40 and means for sealing 44 that seals an end region 41, and a transducer 13, in which the length 23 differs among the plates 11 in coordination with the position of the plate 11 within the linear array 15, in accordance with an embodiment. Linear array 15 is similar to the linear array 15 indicated by a reference numeral in other figures herein. In FIG. 18, the plane of section is perpendicular to the major faces 26. In the embodiment of FIG. 18, sleeve 40 includes two rectangular sides that are depicted in cross-section view and labelled with reference numeral 40, and sleeve 40 also includes two trapezoidal sides that are out of the plane of FIG. 18, the rectangular sides and trapezoidal sides being sealed to one another to make a sleeve 40. The two rectangular sides may be acoustically coupled to transducer 13, as depicted in FIG. 18, and may serve as supplementary carriers of acoustical energy while primarily functioning as part of enclosure 12.

The length 23 for the plates 11 is largest in plate 11a and smallest in plate 11q, with the length 23 increasing by equal increments between adjacent plates 11. The group delay is largest in plate 11a and smallest in plate 11q. The line labelled 56 indicates an axis that is normal (perpendicular) to a plane that is tangent to distal ends 22. Radiation from distal ends 22 is along a beam axis 51 whose angle is a function of the relative velocities in the plates 11 and a target 50. Beam axis 51 may be below longitudinal axis 52, as depicted in FIG. 18, or it may be above longitudinal axis 52 (not depicted), but beam axis 51 is always above the normal axis 56.

Figure 19:
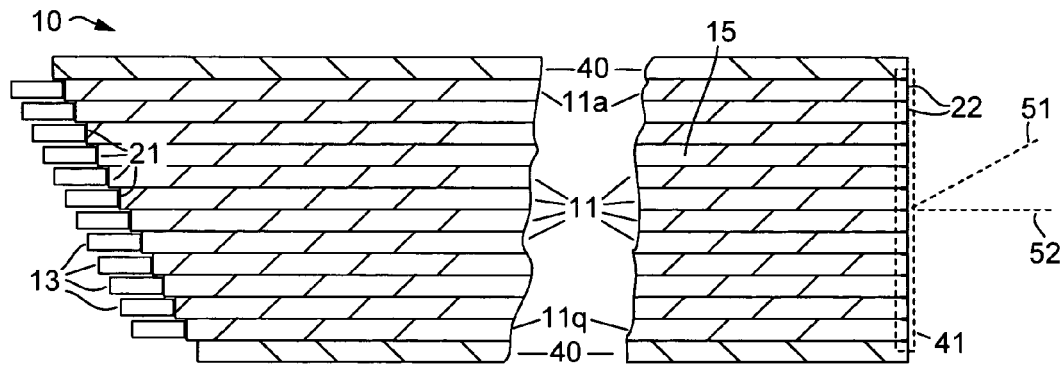
FIG. 19 is a longitudinal cross-section view of an apparatus comprising a plurality of plates disposed in a linear array, an enclosure comprising a sleeve and means for sealing that seals an end region, and a plurality of transducers, in which the length differs among the plates in coordination with the position of the plate within the linear array.

FIG. 19 is a longitudinal cross-section view of an apparatus 10 comprising a plurality of plates 11 disposed in a linear array 15, an enclosure 12 comprising a sleeve 40 and means for sealing 44 that seals an end region 41, and a plurality of transducers 13, in which the length 23 differs among the plates 11 in coordination with the position of the plate 11 within the linear array 15, in accordance with an embodiment. In the embodiment of FIG. 19, the distal ends 22 are aligned in a plane normal to the longitudinal axis 52, whereas in the embodiment of FIG. 18 the distal ends 22 are staggered. The length 23 for the plates 11 is largest in plate 11a and smallest in plate 11q, with the length 23 increasing by equal increments between adjacent plates 11. The group delay is largest in plate 11a and smallest in plate 11q. Beam axis 51 is angled upwards relative to longitudinal axis 52.

In the embodiments of FIGS. 9, 18, and 19, linear array 15 is chamfered or staggered at either distal ends 22 or proximal ends 21. In another embodiment (not depicted), each plate 11 has a longitudinal offset, the longitudinal offset differing among the plates 11 in coordination with the position within the linear array 15. The longitudinal offset results in a staggered or chamfered shape at proximal ends 21 and also at distal ends 22. Thus, the overall shape of linear array 15 is a parallelogram, rather than a rectangle or a trapezoid. Chamfering or staggering at distal ends 22 may cause an oblique beam axis 51 at an interface with a target 50 or a wall 113, as described by Snell's law. By varying the amount of longitudinal offset, it is possible to produce a series of apparatuses 10 having different values for beam angle 53. In another embodiment, mechanical means may be used to shift the positions of plates 11 relative to one another, so that the longitudinal offset varies over time, resulting in a beam angle 53 that changes over time.

FIG. 20 is a section view of an apparatus 10 mounted in a clamp-on configuration on a wall 113 of a conduit 121, in accordance with an embodiment. As in the case of apparatuses 10c and 10d depicted in FIG. 14, a longitudinal plane 115 for conduit 121 in FIG. 20 is parallel to array plane 19 for apparatus 10 in FIG. 20, and this longitudinal plane 115 for conduit 121 intersects linear array 15 within apparatus 10. The longitudinal plane 115 that intersects linear array 15 of FIG. 20 is offset from the axial center 118 of conduit 121, similar to longitudinal plane 115b in FIG. 38. Transducer 13 is a thickness-shear mode transducer 13 having particle motion primarily perpendicular to the longitudinal axis 52 of the apparatus 10, as indicated by double-headed arrow, and is capable of launching or receiving energy that propagates in the plates 11 primarily in the $A_0$ mode. In the clamp-on embodiment of FIG. 20, wall 113 acts as an intermediate member that facilitates mode conversion into longitudinal waves in the fluid target 50, as discussed in connection with FIG. 17. For simplicity let us assume uniform plates 11 of identical attributes, such that the group velocity is the same in each plate 11. If the incident velocity is less than the speed of shear waves in the wall 113, then ray 58 refracted into wall 113 bends away from the normal. If the sound speed c.sub.3 in the fluid target 50 within the conduit 121 is comparable to the velocity in the plates 11, then the direction of the energy refracted into the fluid target 50 may have a path 57 that is parallel to the longitudinal axis 52 of the apparatus 10. This provides a convenient way to launch pulse packets along paths 57 other than the diameter of the conduit 121.

FIG. 21 is a section view of an apparatus 10 comprising two subarrays 16, each subarray 16 comprising a plurality of plates 11 disposed in a linear array 15, the apparatus 10 being mounted on a wall 113 of a conduit 121, in accordance with an embodiment. Subarrays 16a and 16b are disposed in a high-level array which is, in this embodiment, a one-dimensional array. Within each linear array 15, the value for an attribute differs among the plates 11 in coordination with the position within linear array 15. For example, the value for an attribute could decrease from left to right in subarray 16a and increase from left to right in subarray 16b, resulting in a mirror gradient of value for the attribute across the subarrays 16a, 16b and a mirror gradient in group velocity. In the embodiment of FIG. 21, transducer 13a is a shared transducer 13 for subarray 16a, and transducer 13b is a shared transducer 13 for subarray 16b. The gradient in group velocity for the acoustic pulse in each subarray 16a or 16b mimics a pulse striking the interface at an oblique angle, so that rays 58a and 58b are refracted in accordance with Snell's Law, resulting in refraction towards the normal if the sound speed in fluid target 50 is less than the sound speed in wall 113. The pulse in ray 58a continues along path 57a, 57b, 57c and then re-enters wall 113 along ray 58b and is received at subarray 16a. The pulse that begins in ray 58b follows the same path 57 but in reverse order and is received at subarray 16b. For a wall 113 having a circular cross-section, as in FIG. 21, path 57b lies slightly below a horizontal midradius chord. This embodiment makes it possible to launch and receive pulse packets of ultrasonic waves from two directions. Two longitudinal planes 115 for conduit 121 in FIG. 21 intersect linear arrays 15 within subarrays 16 and these longitudinal planes 115 are parallel to array planes 19 for subarrays 16a and 16b in FIG. 21. The longitudinal planes 115 that intersect linear arrays 15 of FIG. 21 are offset from the axial center 118 of conduit 121, similar to longitudinal plane 115b in FIG. 38.

As described for various embodiments herein, beam steering is possible using a frequency or a timing or a mode that varies over time. In another method of beam steering, several parameters may be varied over time for a single linear array 15. The several parameters are frequency, timing difference (electronic delay in excitation), and mode. By choosing two or three values for each of the three parameters, and sequentially cycling through all combinations of the chosen values for the three parameters, a wide range of beam angles 53 may be achieved very quickly using a limited number of values for each parameter. This method enables rapid interrogation of multiple paths, so that information from multiple paths may be integrated into one measurement. The method also provides an alternative to using feedback about beam drift and making compensatory adjustments to correct for beam drift.

A first step of this method is providing a plurality of plates 11 and a plurality of acoustic transducers 13. Each plate 11 has a position within the linear array 15, and a value for an attribute or a longitudinal offset differs among the plates 11 in coordination with the position within the linear array 15. A second step of the method is exciting the plates 11 with acoustic energy emitted from the plurality of acoustic transducers 13. At any time, the frequency and the mode are the same for all plates 11, and the timing difference (electronic delay in excitation) between adjacent plates 11 is the same for all adjacent pairs of plates 11. In other words, at a given time, the timing may differ among the plates 11 (or the timing difference may be zero), whereas at a given time the frequency and mode do not differ among the plates 11. Thus at any time, for any adjacent pair of plates 11, the differential delay between adjacent plates 11 within the pair is the sum of: (1) any delay caused by a difference in an attribute or a longitudinal offset; and (2) any delay caused by the timing difference (electronic delay), which may be zero. Changing the values for the three parameters over time, as in subsequent steps of the method, will add another and variable amount of delay.

The acoustic energy has one of N states, each of the N states corresponding to a combination of values for the three parameters for the acoustic energy. In one embodiment, there are two values for the mode, two values for the frequency, and two values for the timing difference. More generally, each of the N states has one of M values for the mode, each of the N states has one of F values for the frequency, and each of the N states has one of T values for the timing difference, where M, F, and T are integers, where M equals one or two, F equals two or three, and T equals two or three. N is greater than or equal to eight and less than or equal to M multiplied by F multiplied by T. For example, if M, F, and T each equal two, then $N=2\times2\times2=8$. If M equals one and F and T each equal three, then $N=1\times3\times3=9$. Initially the acoustic energy has a first one of the N states. A third step of the method is changing the state for the acoustic energy by resetting at least one of the parameters for the acoustic energy. Now the acoustic energy has a second one of the N states. For example, the timing difference may be reset from 200 nanoseconds to 100 nanoseconds, or the frequency may be changed from 0.5 MHz to 0.6 MHz, or the mode may be changed from $S_0$ to $A_0$. The resetting of the one of the parameters causes a change in the differential delays between adjacent plates 11, resulting in a change in the beam angle 53. A fourth step of the method is repeating the third step until the acoustic energy has cycled through each of the N states. At this point, having interrogated N paths using the N states, one can stop. Alternatively, one can cycle through each of the N states over and over again by adding a fifth step which is continuing to repeat the third and fourth steps.

FIG. 22 is a cross-section view of an apparatus 10, with the plane of section perpendicular to the longitudinal axis 52 of the apparatus 10, in which the linear array 15 of plates 11 is made from a folded sheet of material, in accordance with an embodiment. In the embodiment of FIG. 22, the plurality of plates 11 comprises a plurality of segments 38 joined at longitudinal folds 39, and the plurality of segments 38 comprises folded sheet segments. In a related embodiment depicted in FIGS. 30C and 30D, the plurality of plates 11 comprises a plurality of segments 38 joined at longitudinal folds 39, and the plurality of segments 38 comprises flattened tube segments. The longitudinal folds 39 stiffen the linear array 15, which may assist handling during manufacture. For example, a sheet of titanium or 316SS stainless steel of thickness 25 equal to 1 mm, folded to make plural segments 38 of width 20 mm and length 300 mm (about one foot), would be stiff enough to be held by hand or by a robotic machine. The linear array 15 of plates 11 is acoustically coupled to an acoustic transducer 13 (not visible in the cross-section view of FIG. 22). The folded sheet may be inserted into a sleeve 40 and sealed at one or more end region 41. In an alternative embodiment, the outermost segments 38 may serve as two sides of a sleeve 40. In this alternative embodiment, the remaining sides of sleeve 40 may correspond to additional pieces of material sealed to the outermost segments 38, or the edges 27 of plates 11 at the folds 39 may be bonded together to make a continuous and sealed side for sleeve 40. In other embodiments, the plurality of plates 11 may comprise segments 38 that are a mix of folded sheet segments and flattened tube segments, as in FIG. 30C, or the segments 38 joined at longitudinal folds 39 may be combined in a linear array 15 with plates 11 that are not joined at longitudinal folds 39.

The folded sheet may be a sheet of metal. The overall shape of the sheet before folding may be zigzag contoured along one edge to yield by folding a design chamfered at one end, without need for additional machining. In another embodiment, the contour before folding is a right trapezoid, and alternate segments 38 may be differentially chamfered at the distal end 22 for two-directional radiation, for example at plus or minus 5 degrees with respect to the longitudinal axis 52, without need for additional machining.

In another embodiment (not depicted), one may fabricate an apparatus 10 starting with a solid cylindrical rod made of a metal such as 316SS stainless steel and having a diameter such as 25 mm. To form a linear array 15 of plates 11, small-diameter holes may be drilled at or near the ends of the intended gaps 31 between intended plates 11. Next, sawing and/or the wire EDM (electric discharge machining) process may be utilized to elongate the holes parallel to the longitudinal axis 52 and create the desired gaps 31, leaving a relatively thin solid region at each end of the rod. These solid regions may later be incorporated as part of the means for sealing 44 at each end region 41. The linear array 15 fabricated as described may be inserted into a sleeve 40, and an end region 41 may be sealed as described herein. In another embodiment, the starting material may be a conically tapered rod instead of a rod of uniform diameter. The resulting conically tapered linear array 15 may be inserted within a conically tapered sleeve 40, the taper providing a stop to withstand pressure from a fluid target 50 or from clamp-on pressure coupling. In another embodiment, a linear array 15 of plates 11 may be formed by casting, with subsequent machining.

FIG. 23 is an end view of an apparatus 10 in which a cylindrical sleeve 40 surrounds a linear array 15 of plates 11 having a square cross-sectional shape, in accordance with an embodiment. In the embodiment of FIG. 23, the distal ends 22 and an end piece 44 are bonded to make a sealed end region 41. In this embodiment, the linear array 15 of plates 11 does not fill the interior volume of sleeve 40, in contrast to many embodiments herein including the embodiment of FIG. 25. FIG. 24 is discussed after FIG. 25.

FIG. 25 is a cross-section view of an apparatus 10, with the plane of section perpendicular to the longitudinal axis 52 of the apparatus 10, in which the sleeve 40 has a hexagonal interior cross-section and the linear array 15 of plates 11 has a hexagonal cross-sectional shape, in accordance with an embodiment. Sleeve 40 has a cylindrical exterior shape, similar to the cylindrical sleeve 40 depicted in FIG. 23, that may be convenient for insertion into a cylindrical nozzle 112. In the embodiment of FIG. 25, each plate 11 has a rectangular cross-section and the plates 11 fill nearly all of the interior volume of sleeve 40. If the plates 11 had smaller thickness 25, the linear array 15 of plates 11 would have a smooth rather than "stepped" outline resulting in more complete filling of the interior volume. As noted herein, to achieve a strong signal and a corresponding high signal to noise ratio (SNR), it may be appropriate to use a linear array 15 of plates 11 that are fairly closely packed together, with small or very small gaps 31, and with linear array 15 filling all or nearly all of the interior volume within sleeve 40. In another embodiment, plates 11 may have a trapezoidal cross-section, enabling more complete filling of sleeve 40 even with relatively thick plates 11. A relatively large thickness 25 may be appropriate with respect to dispersion or for economy.

For some apparatus 10 embodiments, it may be appropriate to prevent or reduce the occurrence of grating lobes (side lobes) in the acoustic wave that radiates from distal ends 22 into a target 50. As is known in the art of phased arrays, grating lobes occur if the pitch 33 for an array of radiating elements is greater than or equal to one wavelength, and grating lobes are typically absent if the pitch 33 is less than one-half wavelength in the target 50. For pitch 33 that is between one-half and one wavelength, generation of grating lobes depends upon the beam angle 53. The pitch 33 at the distal ends 22 is the center-to-center distance between adjacent distal ends 22, as indicated by reference numeral 33 in FIG. 24. In an embodiment with essentially no gaps 31 between plates 11, such as the embodiment of FIG. 7 or FIG. 24, the pitch 33 is equal to the thickness 25. In an embodiment with a nonzero gap 31 between plates 11, such as the embodiment of FIG. 5, the pitch 33 is equal to the sum of thickness 25 and the distance between major faces 26 of adjacent plates 11.

Wavelength equals sound speed divided by frequency; in this relation, sound speed is the phase velocity. With respect to pitch 33, if the pulse spectrum is relatively narrow, then the wavelength of interest may be taken as the average wavelength in a target 50 at a center frequency of excitation. For a more rigorous prevention of grating lobes, the wavelength of interest is the shortest wavelength, which corresponds to the highest frequency of excitation. The target 50 may be a solid or a fluid (liquid or gas), and in such a target 50 the sound speed typically has a value between 100 meters/second and 10,000 meters/second. Thus, for example, for a frequency of 1 MHz (10sup6 Hz) and a sound speed of 1000 meters/second, wavelength equals 1 mm. Table 2 indicates the longitudinal ("long") and shear sound speeds in meters per second for various materials at 20 degrees Celsius and atmospheric pressure. The sound speed value for steam, however, is for 200 degrees Celsius and 200 psig. Table 3 lists some examples of wavelength and one-half wavelength ("half") in a target 50 calculated for specific combinations of target 50 and frequency.

TABLE 2

|  | long (m/sec) | shear (m/sec) |
| --- | --- | --- |
| air | 343 | — |
| steam | 506 | — |
| methane | 448 | — |
| gasoline | 1150-1200 | — |
| water | 1482 | — |
| glycerine | 1920 | — |
| Teflon | 1350 | 550 |
| PVC | 2395 | 1060 |
| steel | 5890 | 3240 |
| titanium | 6070 | 3110 |
| aluminum | 6320 | 3130 |

TABLE 3

| target | frequency (MHz) | wavelength (mm) | half (mm) |
|---|---|---|---|
| methane | 0.5 | 0.9 | 0.45 |
| water | 2.0 | 0.7 | 0.35 |
| steel (long) | 5.0 | 1.2 | 0.6 |

TABLE 4

| fd product (MHz-mm) | frequency (MHz) | thickness (mm) |
|---|---|---|
| 0.05 | 0.5 | 0.1 |
| 0.5 | 0.5 | 1.0 |
| 1.0 | 0.5 | 2.0 |
| 0.05 | 2.0 | 0.025 |
| 0.5 | 2.0 | 0.25 |
| 1.0 | 2.0 | 0.5 |
| 0.05 | 5.0 | 0.01 |
| 0.5 | 5.0 | 0.1 |
| 1.0 | 5.0 | 0.2 |

As described in connection with FIGS. 10-11, dispersion considerations may lead one to operate in a particular range of fd product. The center of the selected fd product range may be, for example, 0.05 or 0.5 or 1.0 MHz-mm. For a selected fd product and a selected frequency, one can calculate the appropriate thickness 25 for a plate 11. Table 4 lists some examples of thickness 25 calculated for specific combinations of fd product and frequency.

The calculated values for thickness 25 in Table 4 may be compared to the one-half wavelength values for specific targets 50 listed in Table 3. For example, for methane with a frequency of 0.5 MHz, one-half wavelength equals 0.45 mm. A maximum pitch 33 of 0.45 mm is not a problem for a thickness 25 of 0.1 mm (first row of Table 4), but it is a problem for a thickness 25 of 1.0 mm (second row) or 2.0 mm (third row). Within a range of fd product that provides acceptable dispersion characteristics, smaller values of fd product within that range are more likely to be compatible with a restriction on pitch 33. Continuing the example of methane, if the acceptable fd product range were 0.05 to 0.5 MHz-mm, then choosing the lowest value (0.05 MHz-mm) minimizes grating lobe problems related to pitch 33. For a given thickness 25, reducing the fd product means reducing the frequency, which results in decreased timing resolution. Poorer timing resolution may be tolerable in return for minimizing grating lobes and off-axis echoes. However, lower frequency may be useful or necessary to overcome attenuation, while at the same time avoiding grating lobe problems.

Another approach to achieving a suitably small pitch 33 is to taper the plates 11. In such embodiments, the pitch 33 and the thickness 25 at distal ends 22 may be reduced so that grating lobes are suppressed, while some or most of the plate 11 has a thickness 25 that is selected based on dispersion characteristics and that may exceed the chosen pitch 33. FIG. 24 is a longitudinal cross-section view of an apparatus 10 comprising a plurality of plates 11 disposed in a linear array 15 and an enclosure 12 comprising a sleeve 40 and means for sealing 44 that seals an end region 41, in which the thickness 25b at the distal end 22 is less than the thickness 25a at the proximal end 21, in accordance with an embodiment. In this embodiment, for at least 70 percent of the plates 11a first thickness 25b at the distal end 22 is less than a second thickness 25a at the proximal end 21, and the first thickness 25b is chosen to be less than or equal to one wavelength in a target 50. For improved suppression of grating lobes, first thickness 25b may be less than or equal to one-half wavelength in a target 50. In the embodiment of FIG. 24, the plates 11 are closely packed together so that pitch 33 equals thickness 25b at distal ends 22. In another embodiment having a nonzero gap 31 between plates 11, first thickness 25b is less than pitch 33 and is also less than or equal to one wavelength in a target 50. In FIG. 24, the plane of section is perpendicular to the major faces 26. Means for sealing 44 at each end region 41 may be similar to any of various means for sealing 44 described herein, including those described in connection with FIG. 7.

The tapering may be confined to a region near the distal ends 22, as in the embodiment of FIG. 24. In another embodiment (not depicted), the tapering may extend over the entire length 23 of the plates 11. In such an embodiment, the linear array 15 of plates 11 may have a fan-like shape that is narrow at the distal ends 22 and broad at the proximal ends 21. In another embodiment, the taper may be reversed, resulting in a fan-like linear array 15 that is narrow at the proximal ends 21 and broad at the distal ends 22. The tapering may be gradual or relatively steep. In other embodiments (not depicted), the plates 11 may not be parallel. For example, the spacing between the plates 11 (i.e. the size of gap 31) may vary along the length 23 of the plates 11 so that major faces 26 of adjacent plates are not parallel. In one embodiment (not depicted), gaps 31 may be very small at distal ends 22 so that pitch 33 can be small, while gaps 31 are larger in other regions of the plates 11 to ensure good isolation. Parallel plates 11 may result in a more compact apparatus 10, compared to an apparatus 10 with plates 11 that are not parallel. Other aspects of spacing are discussed in connection with FIG. 8.

For medical or NDT applications utilizing echoes, grating lobes (side lobes) may be a problem. For many other applications, grating lobes may not be a problem. For a flowmeter embodiment such as that of FIG. 14, where a beam 51 crosses a conduit 121 diagonally, grating lobes may not impact the timing of pulse packets traveling diagonally upstream or downstream. In tag cross correlation situations, the main beams may travel normal to the conduit 121 axis. Cross correlation of jitter sensed at these axially displaced paths likewise may not be impacted by grating lobes. In through-transmission energy-sensing situations, either amplitude-based or attenuation-based, grating lobes may not be a significant problem.

When the fluid target 50 is steam, one approach is to place the apparatus 10 at a location where the steam is hottest. For steam, higher temperature results in higher soundspeed and longer wavelength, for a given frequency. Thus hotter steam, while hostile in other respects, can help to minimize grating lobe interference. For water the maximum soundspeed occurs near 74 degrees Celsius. For most other liquids, sound speed is inversely related to temperature. In such liquids, gasoline being an example, higher soundspeeds are associated with lower temperatures. The temperature dependence of wavelength for acoustic waves, and its use in minimizing grating lobes, differs from other phased array systems. In electromagnetic probe technologies such as microwave or optical phased array systems, the target 50 usually has an index or speed which is not a strong function of temperature.

In many embodiments, thickness 25 is uniform throughout all of a plate 11, as depicted in many cross-section views and end views herein. In some embodiments, however, thickness 25 may vary along the length 23 or the width 24 of the plate 11. In the embodiment of FIG. 24, for example, the thickness 25b at the distal end 22 differs from the thickness 25a at the proximal end 21. FIG. 2 indicates two length positions 61a, 61b and three width positions 62a, 62b, 62c for a plate 11. FIG.

26A is a cross-section view of a plate 11, with the plane of section perpendicular to the longitudinal axis of the plate 11, in which thickness 25 varies across the width 24 of the plate 11, in accordance with an embodiment. In the embodiment of FIG. 26A, thickness 25b at width position 62b is less than thickness 25a or 25c which are at width positions 62a and 62c, respectively. In the embodiment of FIG. 26, edges 27 are bevelled. In another embodiment (not depicted), thickness 25 is uniform across most but not all of the width 24 of a plate 11. In other words, at each length position 61 within each plate 11 the plate 11 has a predominant thickness 25, and for each of 90 percent of the width positions 62 at each length position 61 the thickness 25 equals the predominant thickness 25. For example, a plate 11 might have a thickness 25 equal to 1 mm across 90 percent of its width, with a smaller thickness 25 at the edges 27 because of bevelling. In another embodiment, edges 27 may be rounded.

Variations in thickness 25 can increase the dispersion and smearing of acoustic pulses propagating in a plate 11. As indicated in FIG. 10, the group velocity of Lamb waves is a function of the thickness 25 of a plate 11. Consider a plate 11 that has different thicknesses 25 across the width 24 of the plate 11. For example, the plate 11 might have a thin central region that extends between proximal end 21 and distal end 22 and thick lateral regions along each longitudinal edge 27, the lateral regions being thicker than the central region, as depicted in FIG. 26. If the fd products for the central and/or lateral regions are in the dispersive range, then an acoustic wave will travel at different velocities in the central and lateral regions. For an acoustic pulse originating at the proximal end 21, the acoustic pulse in the central region will arrive earlier or later at the distal end 22 compared to the acoustic pulse in the lateral regions, resulting in a pulse that may be focused, defocused, or launched relatively incoherently into a target 50. Variation in thickness 25 may be appropriate for some purposes. FIG. 26B is a cross-section view of a plate 11, with the plane of section perpendicular to the longitudinal axis of the plate 11, in which thickness 25 varies in a graded mirror symmetric pattern across the width 24 of the plate 11, in accordance with an embodiment. In the embodiment of FIG. 26B, thickness 25b near the center is less than thickness 25a in the lateral region. For a mode and an fd product in which pulses travel faster when thickness 25 is larger, a wavefront radiating from distal end 22 will be shaped like an arc. An arc shaped wavefront may be appropriate for focussing a beam. Note that focussing in the plane parallel to width 24 is complementary to focussing based on differential delays between plates 11.

FIGS. 27-29 and FIG. 21 depict embodiments that comprise plural subarrays 16. Each subarray 16 comprises plural plates 11 disposed in a linear array 15. The plurality of subarrays 16 are disposed in a high-level array. The high-level array is a one-dimensional array 17 or a two-dimensional array 18. Subarrays 16 may be disposed in a one-dimensional array 17, as in the embodiments of FIG. 27 and FIG. 21. Alternatively, subarrays 16 may be disposed in a two-dimensional array 18, as in the embodiment of FIG. 28. The high-level array (one-dimensional array 17 or two-dimensional array 18) is acoustically coupled to a plurality of transducers 13. Plural transducers 13 may facilitate beam steering, as described in connection with FIG. 13 and other Figures herein.

Subarrays 16 may be of use in applications that employ very thin plates 11. Very thin plates 11, such as plates 11 having a thickness 25 of 0.1 mm or less, may be appropriate for applications that employ a moderate or high frequency combined with a small fd product, as indicated in Table 4. Grouping very thin plates 11 within subarrays 16 may facilitate acoustic coupling of the plates 11 to a plurality of transducers 13. For example, for plates 11 having a thickness 25 of 0.1 mm, and for a linear array 15 with an array thickness of 25 mm, the total number of plates 11 is 250. If the 250 plates 11 are grouped into twenty-five subarrays 16 with ten plates per subarray, each subarray 16 having a subarray thickness of 1 mm, this set of subarrays 16 is easily coupled to a transducer array 105 having twenty-five transducers 13.

Figure 27:
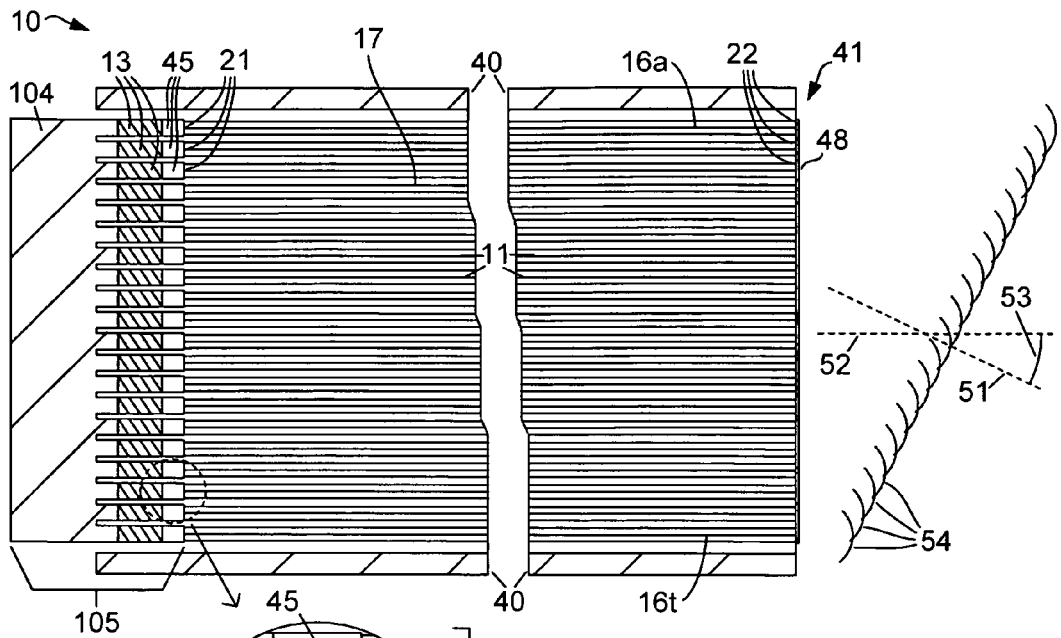
FIG. 27 is a longitudinal cross-section view of an apparatus comprising a plurality of subarrays disposed in a high-level array that is a one-dimensional array, in accordance with an embodiment.

FIG. 27 is a longitudinal cross-section view of an apparatus 10 comprising a plurality of subarrays 16 disposed in a high-level array that is a one-dimensional array 17, in accordance with an embodiment. Apparatus 10 also comprises a plurality of transducers 13 and an enclosure 12 comprising a sleeve 40 and means for sealing 44 that seals an end region 41. In FIG. 27, the plane of section is perpendicular to the major faces 26. In this embodiment, there are twenty subarrays 16a-16t. Three subarrays 16q, 16r, 16s are depicted at higher magnification in an inset view in the lower portion of FIG. 27. Each subarray 16 comprises a plurality of plates 11 disposed in a linear array 15; in the embodiment of FIG. 27, each linear array 15 comprises three plates 11. The high-level array (one-dimensional array 17) is acoustically coupled to the plurality of transducers 13. Transducer array 105 is similar to that described in connection with FIG. 13.

Each subarray 16 has a subarray position within the high-level array (one-dimensional array 17), subarray 16a having the first position and subarray 16t having the twentieth position. As described in connection with FIG. 13, beam steering is possible when there are differences in group delays (differential delays) between the acoustic energy pulses that propagate in individual plates 11a-1 it. If the plates 11 are grouped in subarrays 16, with differences in group delays between subarrays 16, this is another way to achieve beam steering. A difference in group delays between subarrays 16 means that the group delay for plates 11 in one subarray 16 differs from the group delay for plates 11 in another subarray 16.

Differences in group delays (differential delays) may occur where a frequency or a timing or a mode for acoustic energy propagating in plates 11 differs among the subarrays 16 in coordination with the subarray position within the high-level array (one-dimensional array 17). In one embodiment, the frequency of acoustic energy emitted by the individual transducers 13 may differ among the transducers 13, resulting in differential delays between subarrays 16. In another embodiment, individual transducers 13 may be excited with controlled delays so that the timing of acoustic energy emitted by the transducers 13 differs among the transducers 13, resulting in differential delays between subarrays 16. Differential delays based on differences in frequency or timing are described in connection with FIG. 13. The embodiments of FIGS. 13 and 27 are similar, except that the group delay for FIG. 27 applies to a set of plates 11 within a subarray 16 rather than individual plates 11 as in FIG. 13. As described in connection with FIG. 21, a mode for acoustic energy may differ between subarrays 16, resulting in differential delays and beam steering.

Within a subarray 16, the frequency is the same for each plate 11, resulting in coherence of waves emitted from individual plates 11 within a subarray 16. Coherence of the overall beam radiated from distal ends 22 is reduced to the extent that frequency differs between subarrays 16. Multifrequency receiving electronics may be used to determine characteristics in a target 50 as a function of frequency.

Figure 28:
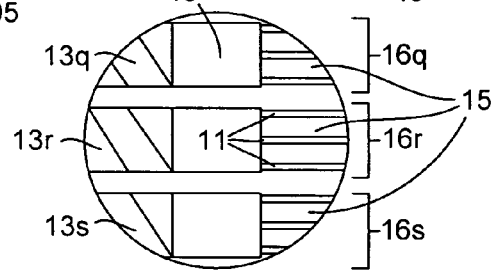
FIG. 28 is a cross-section view of an apparatus comprising a plurality of subarrays disposed in a a high-level array that is two-dimensional array, in accordance with an embodiment.
Figure 29:
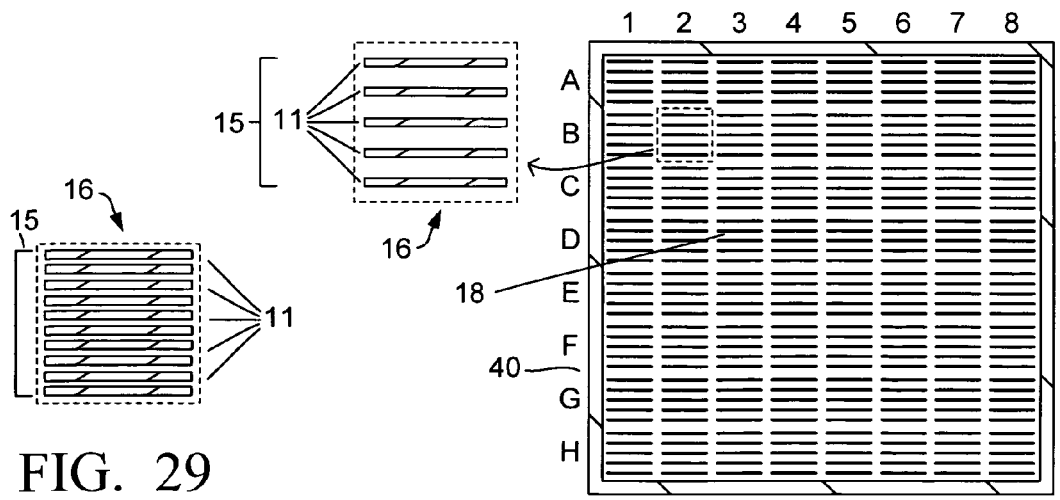
FIG. 29 is a cross-section view of a subarray with small gaps between the plates, in accordance with an embodiment.

As described in connection with Tables 2-4, grating lobes can occur if the pitch 33 for plates 11 in a linear array 15 is greater than one-half wavelength in a target 50. Similarly, if the subarray pitch exceeds one-half wavelength in the target 50, grating lobe interference may occur. The subarray pitch is the center-to-center distance between subarrays 16. If the pitch 33 of plates 11 within each subarray 16 is less than one-half wavelength, and if the subarray pitch is less than one wavelength, grating lobes may be absent. Grating lobes may also arise in an embodiment that comprises a two-dimensional array 18, as depicted in FIG. 28. In practice, it may suffice in some two-dimensional embodiments to use different pitches for the two dimensions. In one example, pitch 33 is one-half wavelength for a first dimension of the array, and the subarray pitch in the second dimension exceeds one wavelength, resulting in some degree of grating lobes in the second dimension.

FIG. 28 is a cross-section view of an apparatus 10 comprising a plurality of subarrays 16 disposed in a high-level array that is a two-dimensional array 18, in accordance with an embodiment. In FIG. 28, the plane of section is perpendicular to the longitudinal axis 52 of the apparatus 10. The embodiment of FIG. 28 comprises 64 subarrays 16 arranged in an eight by eight two-dimensional array 18 (a high-level array). Each subarray 16 has a subarray position within the high-level array (two-dimensional array 18). Subarray position is denoted using two array indices, a horizontal index or dimension having values 1-8 and a vertical index or dimension having values A-H. The subarray 16 having subarray position 2B is shown at higher magnification in an inset view. In this embodiment, each subarray 16 comprises five plates 11 disposed in a linear array 15. In another embodiment depicted in cross-section view in FIG. 29, a subarray 16 comprises ten plates 11 packed fairly closely together in a linear array 15.

The embodiment of FIG. 28 comprises a plurality of acoustic transducers 13, the high-level array (two-dimensional array 18) being acoustically coupled to the plurality of transducers 13 at the distal ends 21. The plurality of transducers 13 is out of the plane of section of FIG. 28. Transducers 13 are disposed in a two-dimensional transducer array in which the spacing and positioning of individual transducers 13 is the same as the spacing and positioning of individual subarrays 16. The two-dimensional transducer array may include a backing layer 104 and segmented proximal coupling layer 45 as in the one-dimensional transducer array 105 of FIG. 27.

Beam steering in two directions, which may be orthogonal directions, is possible when there are differences in group delays (differential delays) between subarrays 16 within two-dimensional array 18 (high-level array). In one embodiment, individual transducers 13 may be excited with controlled delays so that the timing of acoustic energy emitted by the transducers 13 differs among the transducers 13, resulting in differential delays between subarrays 16. In another embodiment, the frequency of acoustic energy emitted by the individual transducers 13 may differ among the transducers 13, resulting in differential delays between subarrays 16. The direction of beam steering may be independent of the major dimensions (indices) of the two-dimensional array 18. For example, diagonal steering is possible using a gradient of group delay from the upper left (subarray 1A) to the lower right (subarray 8H). In such an embodiment, subarrays 1H, 2G, 3F, 4E, 5D, 6C, 7B, 8A have a group delay that is intermediate between the group delays of subarrays 1A and 8H.

Within a subarray 16, the plates 11 may have a uniform group delay or may differ in group delays. Note that for the diagonal steering described in the previous paragraph each subarray 16 may be considered a point source having an internally uniform group delay. In the embodiment depicted in FIG. 28, the plates 11 have the same orientation within all of the subarrays 16. In another embodiment, the orientations of plates 11 within subarrays 16 may differ. For example, the orientation of plates 11 may alternate for adjacent subarrays 16, so that the orientation for subarray positions 1A and 2B is different from the orientation for subarray positions 1B and 2A. The relative orientations may be oblique rather than perpendicular. The cross-sectional shape of the two-dimensional array 18 may be square, as in the embodiment of FIG. 28, or it may be circular or hexagonal or some other shape. The mode may differ among subarrays 16 within a high-level array. In one embodiment, alternate subarrays 16 may be excited in the $A_0$ or $S_0$ mode; the mode excitations may be applied in other patterns as well.

For convenience in fabrication of a high-level array, plates 11 comprising an individual subarray 16 may be held together using a mesh, wire harness, or other means for securing the plates 11. The means for securing may be a thin sleeve, so that apparatus 10 comprises a main sleeve 40 that surrounds a plurality of sleeved subarrays 16. To prevent acoustic coupling between individual subarrays 16, the individual subarrays 16 may be separated from one another by spaces. Subarrays 16 may be secured in specific positions using, for example, support members that span the interior of sleeve 40. The spaces between subarrays 16 may be filled with material having high attenuation and low sound speed.

FIG. 30A is a cross-section view of a plate 11, with the plane of section perpendicular to the longitudinal axis 52 of the plate 11, which has flanges 35 near the longitudinal edges 27, in accordance with an embodiment. FIG. 30B is a cross-section view of a plate 11, with the plane of section perpendicular to the longitudinal axis of the plate 11, which is corrugated across the width 24 of the plate, in accordance with an embodiment. In the embodiment of FIG. 30B, the corrugations 36 are symmetrical about a plate midplane 37.

FIG. 30C is a cross-section view of an adjacent pair of plates 11, with the plane of section perpendicular to the longitudinal axis of the plates 11, in which the adjacent pair of plates 11 is made by flattening a tube, in accordance with an embodiment. In the embodiment of FIG. 30C, the plurality of plates 11 comprises a plurality of segments 38 joined at longitudinal folds 39, and the plurality of segments 38 comprises flattened tube segments. In a related embodiment depicted in FIG. 22, the plurality of plates 11 comprises a plurality of segments 38 joined at longitudinal folds 39, and the plurality of segments 38 comprises folded sheet segments. FIG. 30D is a perspective view of an apparatus 10 in which the plurality of plates 11 comprises flattened tube segments. In the embodiment of FIG. 30D, linear array 15 comprises two segments 38 joined at longitudinal folds 39, corresponding to a single flattened tube. Linear array 15 is acoustically coupled to a transducer 13. In another embodiment, the plurality of plates 11 may comprise a larger number of segments 38 corresponding to more than one flattened tube.

In many of the embodiments depicted herein, transducers 13 are butted against proximal ends 21 of plates 11. In other embodiments, a transducer 13 may be coupled to a major face 26 at or near proximal end 21. FIG. 31A depicts a portion of a linear array 15 in which a transducer 13 is coupled to one major face 26 of each plate 11, in accordance with an embodiment. FIG. 31B depicts a portion of a linear array 15 in which transducers 13 are coupled to both major faces 26 of each plate 11, in accordance with an embodiment. Fabrication of ceramic films suitable for use as relatively thin transducers 13 may use methods such as those described in U.S. Pat. No. 5,585,136, which is incorporated by reference herein.

As described in connection with FIGS. 13-21, differential delays may be used for beam steering. The differential delays may result from differences in timing, frequency or mode, or from differences in physical attributes of plates 11. The spacing of plates 11 offers another means of modifying the beam angle 53. If other factors are kept constant, then increasing the spacing of plates 11 tends to reduce the beam angle 53, which is the angle between the beam axis 51 and the longitudinal axis 52. Reducing the spacing tends to increase the beam angle 53. Differential spacing alone does not cause an acoustic beam to radiate at an angle 53 that is oblique to the longitudinal axis 52. Rather, if the plates 11 within a linear array 15 differ in an attribute that causes differential delays, resulting in radiation of a beam at an oblique angle 53, then changing the spacing of plates 11 can change the magnitude of the angle 53.

FIG. 32 is a side view of an axial path offset style flowcell 120 that includes a flow inlet 122, a flow outlet 123, elbows 124, and tees 125, and a conduit 121 having a wall 113. A fluid target 50 enters flowcell 120 at inlet 122, passes through conduit 121, and exits at outlet 123. Apparatuses 10a and 10b are mounted on tees 125. Each apparatus 10a, 10b comprises a transducer 13, an enclosure 12, and a linear array 15 within the enclosure 12. In the embodiment of FIG. 32, the longitudinal axis 52 of each apparatus 10 is parallel to the longitudinal axis of conduit 121. The cross-sectional shape of each linear array 15 may be congruent to the cross-sectional shape of the interior passage of conduit 121, in order to facilitate 100 percent area averaging of the flow profile. In embodiments where the mounting of apparatuses 10 employs threaded tapered pipe fittings, sealing and proper rotational orientation are achieved more readily if the exterior shape of enclosures 12 and of conduit 121 are shaped the same as the interior passage, e.g., all of them square except in the threaded regions and transitions.

In this embodiment, and in other embodiments that include a conduit 121 having a wall 113, conduit 121 may have an exterior shape that is cylindrical or square or some other shape. The interior passage of conduit 121 may have a cross-sectional shape that is circular, square, hexagonal, or another shape. A non-circular interior shape reduces swirl in a fluid target 50 within conduit 121. An interior passage having a square cross-sectional shape facilitates clamp-on contra-propagation flow measurements using standard angle beam transducers, as well as measurements orthogonal to the flow axis for characteristics such as sound speed c.sub.3 and attenuation coefficient in the fluid target 50, one or both of which may be useful in analyzing fluid composition, viscosity or other characteristics of the fluid target 50. An accurate axial flow measurement may be part of a calibration for an angle beam clamp-on transducer. The clamp-on transducer may be a conventional wedge type, or it may comprise plates 11 as depicted in FIG. 20, and it may be oriented so that the radiated beam is inclined with a component along the flow axis rather than in a plane that is perpendicular to the flow axis. A conduit 121 having a non-circular interior passage may be formed by broaching, electric discharge machining or other known methods. Some shaped parts manufactured in corrosion-resistant materials, and in shapes and lengths appropriate to the presently envisioned ultrasonic flowmeter applications, are available commercially as standard parts from Study Broaching Service, Div. of The Evsson Corp., 27711 College Park Drive, Warren, Mich. Shaped pipe and shaped tubing are available commercially in various corrosion resistant metals and dimensions from suppliers such as O'Neal Steel, 3944 Valley East Industrial Drive, Birmingham, Ala.

Although we have described in detail various embodiments, other embodiments and modifications will be apparent to those of skill in the art in light of this text and accompanying drawings. The following claims are intended to include all such embodiments, modifications and equivalents.

What is claimed is:

1. An apparatus for use with acoustic energy and a target, the apparatus comprising:
   a plurality of plates, each plate having a proximal end and a distal end and a length and a width and a thickness, the plurality of plates being disposed in a linear array, each plate having a position within the linear array, wherein for adjacent pairs of the plates, each of the adjacent pairs including a first plate and a second plate, a first major face for the first plate is in proximity to a second major face for the second plate; and
   an enclosure, the enclosure comprising a sleeve and means for sealing that seals an end region for the apparatus, the means for sealing being sealed to the sleeve, wherein at least 70 percent of each plate is disposed within the enclosure;
   wherein each of at least 70 percent of the plates is substantially isolated acoustically from each other one of the plates;
   wherein each of at least 70 percent of the plates is substantially planar;
   wherein each of at least 70 percent of the plates is substantially homogeneous;
   wherein for at least 90 percent of the plates a width-thickness ratio is greater than or equal to 3; and
   wherein for the linear array a length-width ratio is greater than or equal to 3.

2. The apparatus of claim 1,
   wherein for at least 70 percent of the adjacent pairs a distance between the first major face and the second major face is less than the thickness of the first plate or the second plate.

3. The apparatus of claim 1,
   wherein the target is confined by a conduit; and
   wherein for at least 70 percent of the adjacent pairs a distance between the first major face and the second major face is less than or equal to one-half of an inner dimension for the conduit.

4. The apparatus of claim 1, further comprising:
   an acoustic transducer, the linear array being acoustically coupled to the acoustic transducer.

5. The apparatus of claim 4,
   wherein the acoustic energy propagates in the plates and wherein for at least one of the plates a mode for the acoustic energy varies over time.

6. The apparatus of claim 4,
   wherein the acoustic transducer comprises a plurality of acoustic transducers; and
   wherein the acoustic energy propagates in the plates and a timing for the acoustic energy differs among the plates in coordination with the position within the linear array.

7. The apparatus of claim 6,
   wherein for at least one of the plates the timing varies over time.

8. The apparatus of claim 1, wherein for at least 70 percent of the plates a first thickness at the distal end is less than a second thickness at the proximal end and wherein the first thickness is less than or equal to one wavelength in the target.

9. The apparatus of claim 1,
   wherein the acoustic energy propagates in the plates with a differential delay, the differential delay being coordinated with the position within the linear array, the acoustic energy propagating as a pulse packet, the pulse packet having a largest amplitude cycle; and wherein for at least 90 percent of the adjacent pairs the differential delay is less than or equal to one period for the largest amplitude cycle.

10. The apparatus of claim 1,
wherein each plate has a value for an attribute, the value differing among the plates in coordination with the position within the linear array.

11. The apparatus of claim 10, wherein the attribute is the length or the thickness.

12. The apparatus of claim 10, wherein the attribute is density or composition or microstructure or elastic moduli.

13. The apparatus of claim 10, further comprising:
an acoustic transducer, the linear array being acoustically coupled to the acoustic transducer;
wherein for at least one of the plates a frequency or a timing or a mode for the acoustic energy varies over time.

14. The apparatus of claim 1,
wherein each plate has a longitudinal offset, the longitudinal offset differing among the plates in coordination with the position within the linear array.

15. An apparatus for use with a transducer and a target that is confined by a conduit, the apparatus conveying acoustic energy between the transducer and the target, the apparatus comprising:
a plurality of plates, each plate having a proximal end and a distal end and a length and a width and a thickness, the plurality of plates being disposed in a linear array, each plate having a position within the linear array, wherein for adjacent pairs of the plates, each of the adjacent pairs including a first plate and a second plate, a first major face for the first plate is in proximity to a second major face for the second plate;
wherein each of at least 70 percent of the plates is substantially isolated acoustically from each other one of the plates;
wherein each of at least 70 percent of the plates is substantially planar;
wherein each of at least 70 percent of the plates is substantially homogeneous;
wherein for at least 90 percent of the plates a width-thickness ratio is greater than or equal to 3;
wherein for the linear array a length-width ratio is greater than or equal to 3;
wherein a longitudinal plane for the conduit intersects the linear array;
wherein an array plane for the linear array has a conduit orientation relative to the longitudinal plane; and
wherein the conduit orientation is substantially perpendicular or substantially parallel.

16. The apparatus of claim 15,
wherein the acoustic energy in the target is steered in a theta direction for the conduit.

17. The apparatus of claim 15,
wherein the conduit orientation is substantially parallel; and
wherein a distal end for the apparatus is chamfered.

18. An apparatus for use with acoustic energy and a target that is confined by a conduit, the apparatus comprising:
a plurality of plates, each plate having a proximal end and a distal end and a length and a width and a thickness, the plurality of plates being disposed in a linear array, each plate having a position within the linear array, wherein for adjacent pairs of the plates, each of the adjacent pairs including a first plate and a second plate, a first major face for the first plate is in proximity to a second major face for the second plate;
wherein each of at least 70 percent of the plates is substantially isolated acoustically from each other one of the plates;
wherein each of at least 70 percent of the plates is substantially planar;
wherein each of at least 70 percent of the plates is substantially homogeneous;
wherein for at least 90 percent of the plates a width-thickness ratio is greater than or equal to 3;
wherein for the linear array a length-width ratio is greater than or equal to 3;
wherein each plate has a distal plane and each distal plane intersects a region, a region dimension for the region being less than or equal to ten percent of an inner dimension for the conduit; and
wherein the region includes a central position for the conduit or an inner surface of an opposite wall for the conduit.

19. An apparatus for use with acoustic energy, the apparatus comprising:
a plurality of subarrays, each subarray comprising a plurality of plates, the plurality of subarrays being disposed in a high-level array, each subarray having a subarray position within the high-level array, wherein the high-level array is a one-dimensional array or a two-dimensional array; and
a plurality of acoustic transducers, the high-level array being acoustically coupled to the plurality of acoustic transducers;
wherein each plate has a proximal end and a distal end and a length and a width and a thickness, the plurality of plates within each subarray being disposed in a linear array, each plate having a position within the linear array, wherein for each adjacent pair of the plates, the adjacent pair including a first plate and a second plate, a first major face for the first plate is in proximity to a second major face for the second plate; and
wherein each of at least 70 percent of the plates is substantially isolated acoustically from each other one of the plates;
wherein each of at least 70 percent of the plates is substantially planar;
wherein each of at least 70 percent of the plates is substantially homogeneous;
wherein for at least 90 percent of the plates a width-thickness ratio is greater than or equal to 3; and
wherein for the linear array a length-width ratio is greater than or equal to 3.

20. The apparatus of claim 19,
wherein the acoustic energy propagates in the plates and a frequency for the acoustic energy differs among the subarrays in coordination with the subarray position within the high-level array.

21. The apparatus of claim 19,
wherein the acoustic energy propagates in the plates and a timing for the acoustic energy differs among the subarrays in coordination with the subarray position within the high-level array.

22. The apparatus of claim 19,
wherein the acoustic energy propagates in the plates and a mode for the acoustic energy differs among the subarrays in coordination with the subarray position within the high-level array.

23. An apparatus for use with acoustic energy and a target, the apparatus comprising:
a plurality of plates, each plate having a proximal end and a distal end and a length and a width and a thickness, the plurality of plates being disposed in a linear array, each plate having a position within the linear array, wherein for adjacent pairs of the plates, each of the adjacent pairs including a first plate and a second plate, a first major face for the first plate is in proximity to a second major face for the second plate; and an acoustic transducer, the linear array being acoustically coupled to the acoustic transducer;

wherein each of at least 70 percent of the plates is substantially isolated acoustically from each other one of the plates;

wherein each of at least 70 percent of the plates is substantially planar;

wherein each of at least 70 percent of the plates is substantially homogeneous;

wherein for at least 90 percent of the plates a width-thickness ratio is greater than or equal to 3;

wherein for the linear array a length-width ratio is greater than or equal to 3; and wherein the plurality of plates comprises a plurality of segments joined at longitudinal folds.

24. The apparatus of claim 23, wherein the plurality of segments comprises flattened tube segments.

25. The apparatus of claim 23, wherein the plurality of segments comprises folded sheet segments.

26. A method comprising:
(a) providing a plurality of plates disposed in a linear array and a plurality of acoustic transducers, the linear array being acoustically coupled to the plurality of acoustic transducers, each plate having a position within the linear array, wherein a value for an attribute or a longitudinal offset differs among the plates in coordination with the position within the linear array; wherein each of at least 70 percent of the plates is substantially isolated acoustically from each other one of the plates and is substantially planar and is substantially homogeneous; wherein for at least 90 percent of the plates a width-thickness ratio is greater than or equal to 3; and wherein for the linear array a length-width ratio is greater than or equal to 3;
(b) exciting the plates with acoustic energy emitted from the plurality of acoustic transducers, the acoustic energy having one of N states, each of the N states corresponding to a combination of values for three parameters for the acoustic energy, the parameters being frequency, mode, and timing difference, each of the N states having one of M values for the mode, each of the N states having one of F values for the frequency, each of the N states having one of T values for the timing difference, wherein M, F, and T are integers, wherein M equals one or two, wherein F equals two or three, wherein T equals two or three, and wherein N is greater than or equal to eight and less than or equal to M multiplied by F multiplied by T;
(c) changing the state for the acoustic energy by resetting at least one of the parameters for the acoustic energy;
(d) repeating step (c) until the acoustic energy has cycled through each of the N states.

27. The method of claim 25, further comprising:
(e) continuing to repeat steps (c) and (d).

* * * * *